United States Patent [19]
Odaka

[11] Patent Number: 5,614,985
[45] Date of Patent: Mar. 25, 1997

[54] CAMERA WITH DEVICE FOR DETECTING LINE OF SIGHT

[75] Inventor: Yukio Odaka, Yokohama, Japan

[73] Assignee: Canon Kabushiki Kaisha, Tokyo, Japan

[21] Appl. No.: 636,627

[22] Filed: Apr. 23, 1996

Related U.S. Application Data

[63] Continuation of Ser. No. 141,615, Oct. 27, 1993.

[30] Foreign Application Priority Data

| Oct. 28, 1992 | [JP] | Japan | 4-312847 |
| Oct. 28, 1992 | [JP] | Japan | 4-312848 |
| Oct. 30, 1992 | [JP] | Japan | 4-314413 |

[51] Int. Cl.$^6$ .................................................. G03B 7/00
[52] U.S. Cl. ............................................................ 396/51
[58] Field of Search ..................................... 354/400, 402, 354/407, 408, 432, 410, 195.1

[56] References Cited

U.S. PATENT DOCUMENTS

| 4,812,869 | 3/1989 | Akashi et al. | 354/408 |
| 5,036,347 | 7/1991 | Tsunekawa et al. | 354/400 |
| 5,126,777 | 6/1992 | Akashi et al. | 354/402 |
| 5,245,371 | 9/1993 | Nagano et al. | 354/62 |
| 5,262,807 | 11/1993 | Shindo | 351/209 |
| 5,291,234 | 3/1994 | Shindo et al. | 354/402 |
| 5,296,888 | 3/1994 | Yamada | 354/402 |
| 5,311,004 | 5/1994 | Kusaka | 354/408 |
| 5,327,191 | 7/1994 | Shindo et al. | 354/402 |
| 5,333,029 | 7/1994 | Uchiyama et al. | 354/410 |

FOREIGN PATENT DOCUMENTS

| 61-61135 | 3/1986 | Japan . |
| 63-18314 | 1/1988 | Japan . |
| 2-64517 | 3/1990 | Japan . |

*Primary Examiner*—Russell E. Adams
*Attorney, Agent, or Firm*—Fitzpatrick, Cella, Harper & Scinto

[57] ABSTRACT

This invention relates to a camera having
  sight line detection means for detecting the line of sight of an observer,
  focus detection means having plural focus detection areas and capable of focus detection in each focus detecting area, and
  selection means for selecting at least one of the plural focus detecting areas, based on the information of the line of sight detected by the sight line detection means, wherein the selection means is adapted to select the focus detecting area based on the result of focus detection by the focus detection means, according to the state of detection of the line of sight by the sight line detection means.

27 Claims, 34 Drawing Sheets

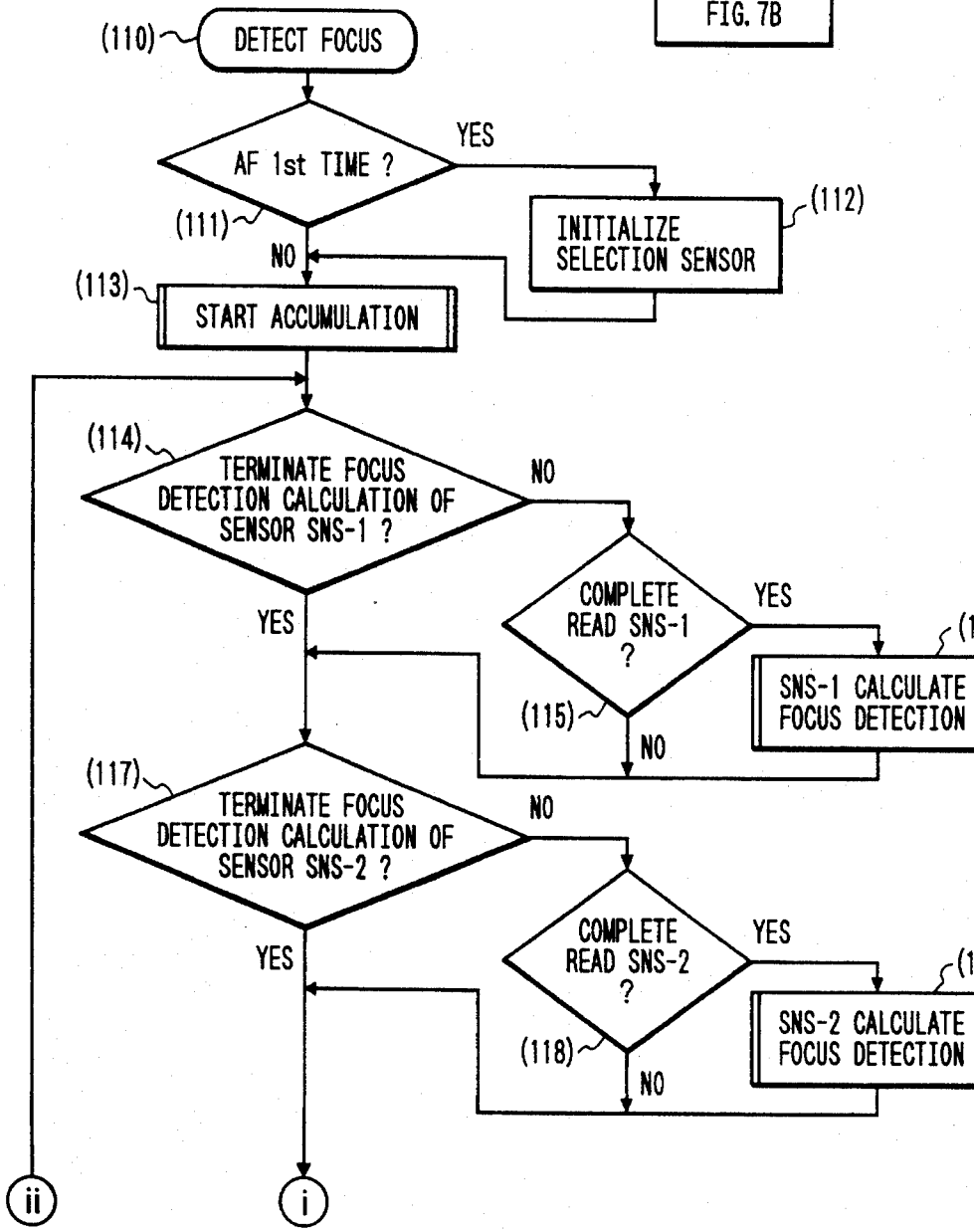

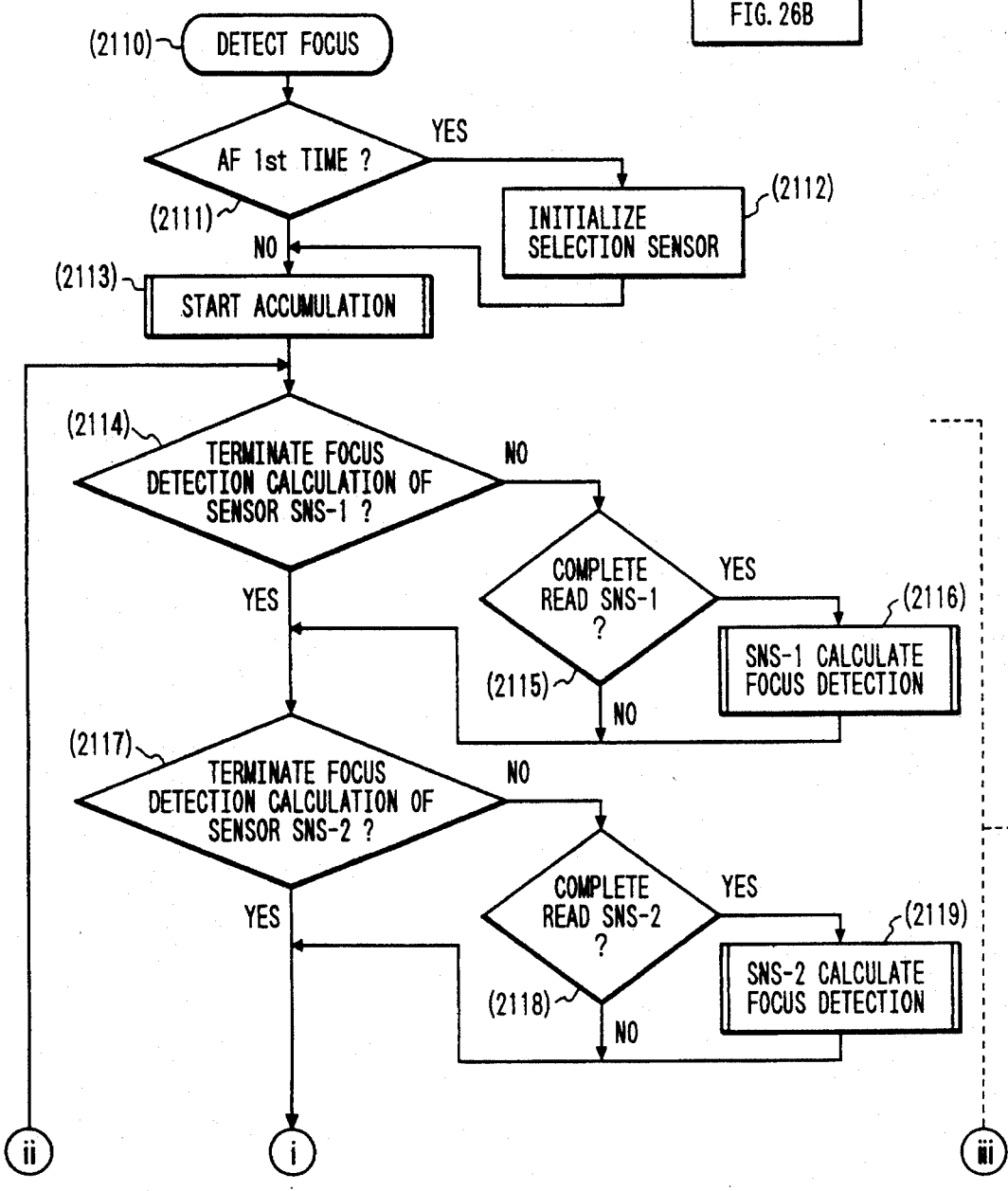

CAMERA WITH DEVICE FOR DETECTING LINE OF SIGHT

This application is a continuation of application Ser. No. 08/141,615, filed Oct. 27, 1993.

BACKGROUND OF THE INVENTION

1. Field of the Invention

The present invention relates to a camera equipped with a device for detecting the line of sight.

2. Related Background Art

There are already proposed various cameras in which the direction of the line of sight of the photographer, or the position looked at by the photographer within the viewing field of the view finder, is detected by means for detecting the line of sight provided in a part of the camera, and various phototaking functions such as auto focusing or auto exposure are controlled according to the signal from said detecting means.

For example, the Japanese Patent Laid-Open Application No. 61-61135 proposes a camera in which the focus detecting direction of a focus state detecting device is mechanically controlled, based on an output from the sight line detecting means, whereby the focus state of the phototaking system is regulated.

Also the U.S. patent application Ser. No. 003,954 proposes a camera provided with sight line detecting means for detecting the line of sight of the photographer, focus detecting means having plural focus detecting areas, and auto exposure control means having plural photometry sensitivity distributions, wherein the focus detection means and the auto exposure control means are functionally controlled according to the output signal of said sight line detecting means.

The auto focusing operations provided in a camera can be generally classified into a one-shot operation in which the focus state detection is repeated until the phototaking lens is brought to the in-focus state but is not conducted after said in-focus state is reached, and a servo operation in which the focus state detection is continued regardless of the focus state of the phototaking lens.

The above-mentioned one-shot mode is principally used when the object is stopped. The operations of the one-shot mode, in an auto focusing camera, utilizing the output signal from the sight line detecting means are conducted in the following manner.

At first, when the power supply is turned on, prior to the focus state detecting operation, the sight line detecting means determines the watching point of the photographer within the finder viewing field. This is achieved by effecting charge accumulation in light receiving means (image sensor) for detecting an eyeball image, then reading the eyeball image signal, and determining the direction of the line of sight of the photographer from said image signal.

Then, from said direction of the line of sight, there is determined the watching point of the photographer (observer) within the finder viewing field. Said watching point is represented by the coordinates within said finder viewing field. Then, based on the coordinates of the watching point within the finder viewing field, there is determined a corresponding focus detecting point (area).

The focus detection means detects the focus state at the focus detecting point determined by the sight line detecting means in this manner, and the phototaking lens is driven to the in-focus state according to thus obtained focus information. In these operations, once the focus detecting point is determined by the sight line detecting means, the focusing operation thereafter is repeated solely based on the focus state of said focus detecting point, until the in-focus state is reached.

On the other hand, the servo mode is principally employed when the object is in motion. The operations of said servo mode are conducted in the following manner, in an auto focusing camera without the sight line detecting means.

At first, when the power supply is turned on, there is executed focus state detection, employing signals from all the light receiving means corresponding to plural focus detecting points. As a result, if the focus state detection is possible at a focus detecting point at the center of the image field, the focusing lens is driven according to the information of focus detection at said central focus detecting point. If the focus state detection is not possible at said central focus detecting point, the focusing lens is driven according to the information on the focus state detection at a focus detecting point of shortest distance among those points where the focus detection is possible. This is based on a fact that the main object is usually positioned at the central part of the finder viewing field, in case of the servo mode.

The operations of the servo mode, in an auto focusing camera equipped with the sight line detecting means, are conducted in the following manner. After the power supply is turned on, as in the one-shot mode, the focus detecting point in the finder viewing field is determined according to the signal from the sight line detecting means. Thereafter the focusing lens continues to be driven according to the information on the focus detection of said focus detecting point.

In the servo mode, however, since the object is often in motion, the object may be displaced from the selected focus detecting point. Also in the servo mode, the photographer may wish to vary the configuration of the object within the image field, even during the focusing operation. For these reasons, it is necessary to continue extraction of the watching point of the photographer at a certain interval, to detect the focus state of an area corresponding to said watching point, and to drive the focusing lens based on the obtained focus information.

However, in case of phototaking a moving object, the sight line detection may become difficult depending on the mode of movement of the line of sight, or the sight line information may not be obtained in stable manner due to a lowered precision of detection of the line of sight if the detection system is subjected to noises caused by strong external light. Also the watching point may be positioned on the background by an expected movement of the eye of the photographer.

For these reasons, if the focusing lens is driven according to the focus signal of a focus detecting point selected by the sight line information at each detection of the line of sight, there may result a focusing operation to an erroneous object other than the main object, eventually leading to an unexpected lens drive or a poor response in the focus detection.

Also in such a camera as explained above, the sight line detecting means requires a considerable time in the execution of steps of the charge accumulation in the sight line detecting image sensor, signal readout therefrom, calculation of the direction of line of sight, extraction of the watching point etc. Consequently, particularly in a continuous phototaking mode, the interval of frames becomes inevitably longer.

In recent cameras having the focus detecting means, said means does not necessarily cover the entire image frame but often has plural focus detecting points in a part of the image frame. Since the main object is rarely positioned at the edge part of the image frame, the focus detecting areas are usually provided in a central area, excluding the four edge parts of the image frame, occupying about 1/10 to 1/2 of the entire image frame.

FIG. 19 is a schematic view of an example of the arrangement of the focus detecting areas in a finder viewing field 7a, wherein said field is divided into 13 areas in the horizontal direction and 9 areas in the vertical direction, and said divided areas are indicated by coordinates, for example (1, 1) at the lower left corner, (13, 1) at the lower right corner, (1, 9) at the upper left corner and (13, 9) at the upper right corner.

In FIG. 19, the focus detecting areas are indicated by 142a, 142b, 142c, 142d and 142e. If the watching point of the photographer is at (3, 5), the focus detecting area 142, positioned at (3, 5), is selected. In this manner, if a focus detecting area is positioned at said watching point, said area is selected for focus detection.

SUMMARY OF THE INVENTION

An aspect of the present invention is to provide a camera capable of stable and satisfactory focus detection, by selecting at least a focus detecting area from plural areas, based on the states of detection of the line of sight and of focus detection.

Another aspect of the present invention is to provide a camera capable of sight line detection without sacrificing the phototaking speed in a continuous phototaking operation, by effecting the detection of the line of sight during a preparatory operation for phototaking in the course of the continuous phototaking operation.

DETAILED DESCRIPTION OF THE PREFERRED EMBODIMENTS

Figure 1:
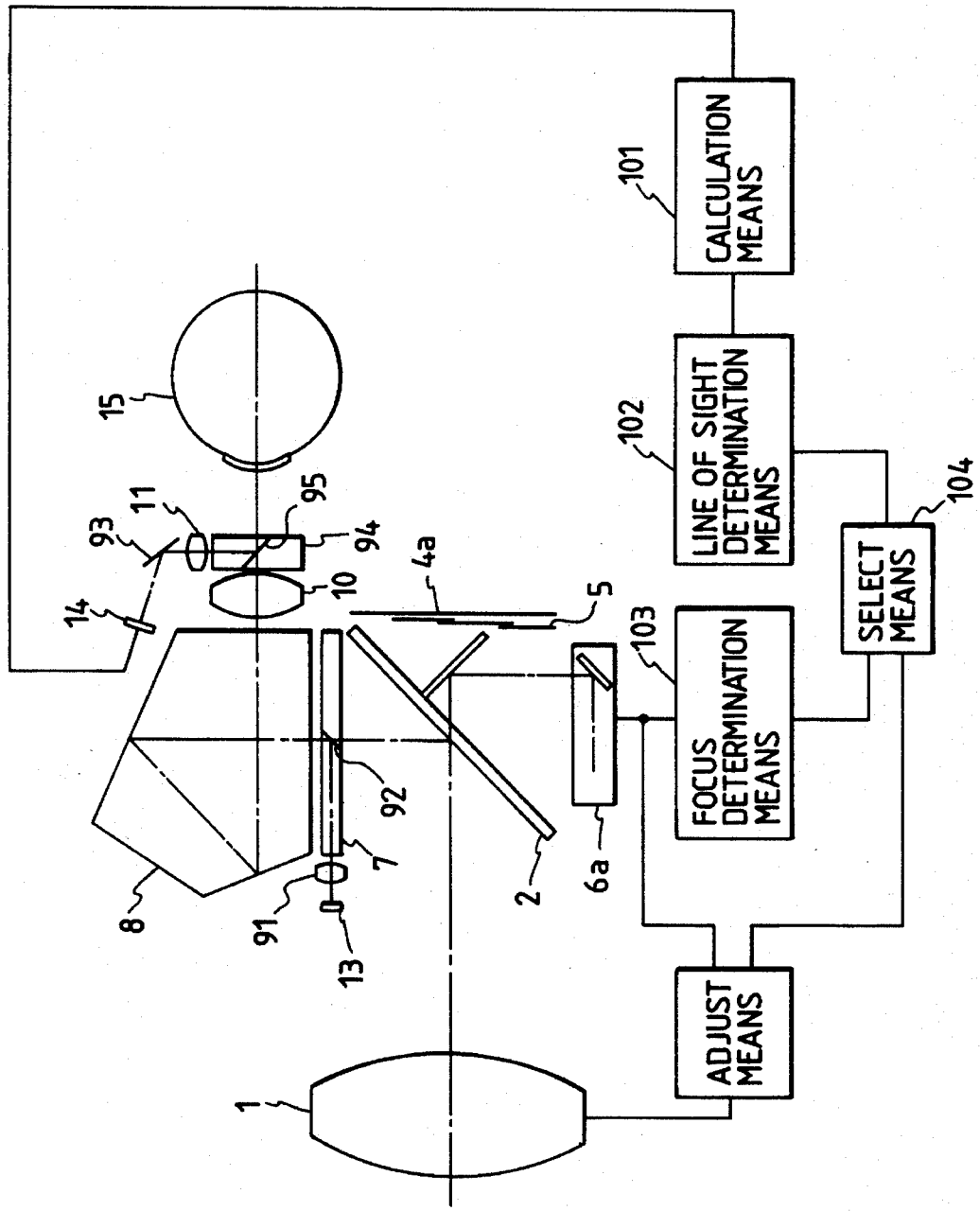
FIG. 1 is a partial schematic view of an embodiment 1 of the present invention, applied to a single lens reflex camera.
Figure 2:
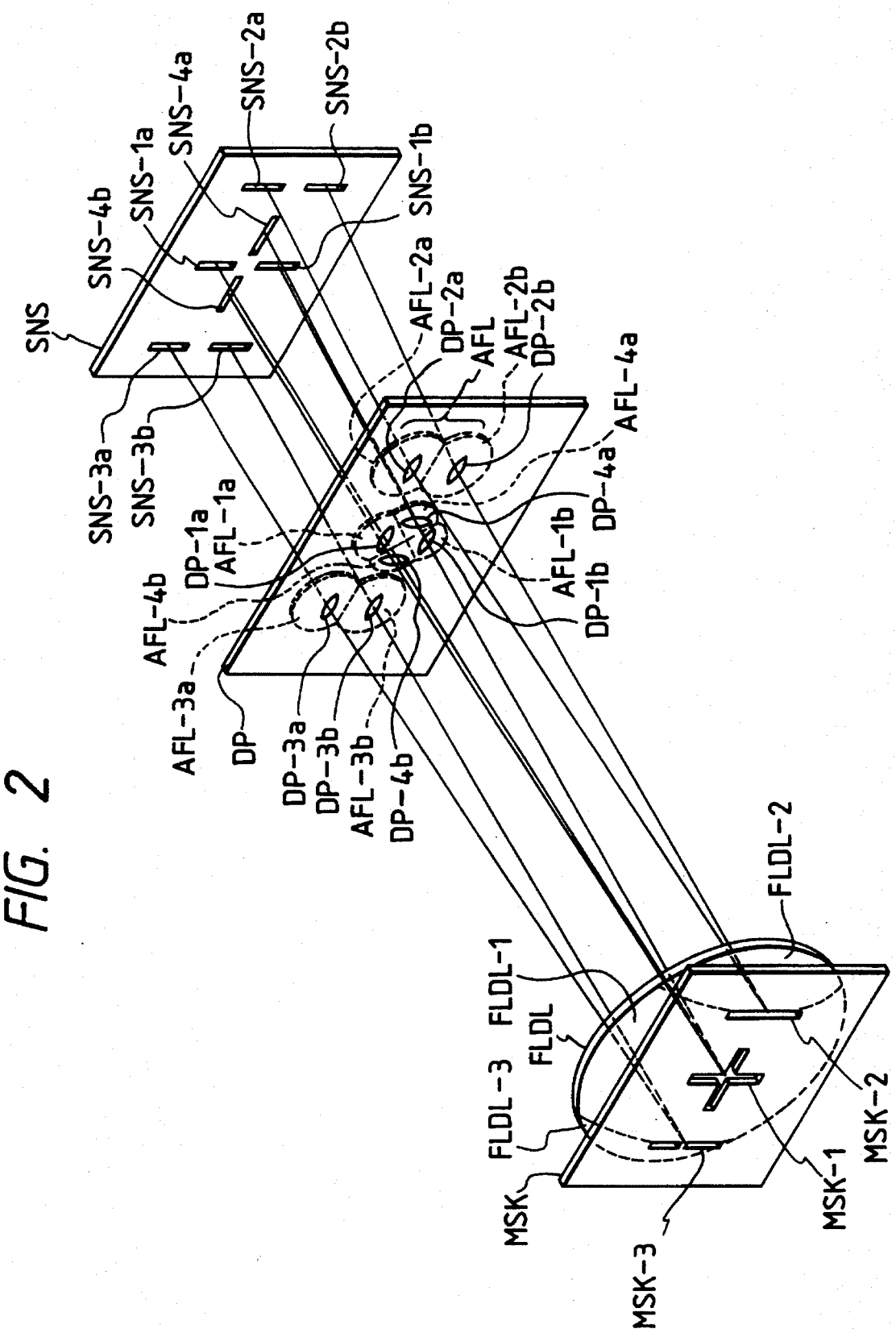
FIG. 2 is a partial schematic view of focus detecting means shown in FIG. 1.

FIG. 1 is a partial schematic view of an embodiment 1 of the present invention applied to a single lens reflex camera, and FIG. 2 is a partial schematic view of FIG. 1.

In these drawings, there are shown an eyepiece lens 10; an optical block 94 serving as a light beam splitter and provided therein with an oblique dichroic mirror 95 transmitting the visible light but semi-transparent to the infrared light; a light receiving lens 11; a mirror 93; and a photosensor array 14, wherein the light receiving lens 11 and photosensor array 14 constitute a part of the light receiving means. The photosensor array 14 is usually composed of a device in which plural photoelectric elements are one-dimensionally arranged perpendicularly to the plane of the drawing, but it may also be composed of a device in which the photoelectric elements are arranged two-dimensionally, according to the necessity.

There are further provided a light source 13 composed for example of an infrared light-emitting diode; a projecting lens 91; and a focusing screen 7 provided therein with an oblique light-splitting face 92, which is composed of a half mirror or a dichroic mirror.

The infrared light from the light source 13 is condensed by the projecting lens 91, then introduced into the focusing screen 7, reflected by the light splitting face 92 and enters the eyepiece lens 10 through a pentagonal prism 8. The infrared light emerging from the eyepiece lens 10 is transmitted by the dichroic mirror 95 and illuminates an eyeball of the observer, positioned in the vicinity of an eye point E.

The infrared light reflected by the eyeball 15 is reflected by the dichroic mirror 95, then condensed by the light receiving lens 11, reflected by the mirror 93 and forms, on the photosensor array 14, an image including a Pulkinye's image based on the reflection from said eyeball.

Calculation means 101 determines the direction of the line of sight of the eyeball 15 of the photographer, and the watching direction and point within the finder viewing field, utilizing the signal from the photosensor array 14.

The method of detecting the line of sight in the present embodiment will not be explained further, as it is already described in detail in the U.S. patent application Ser. No. 003,954, and also as it not the essential feature in the present invention.

In the present embodiment, the above-mentioned components 10, 11, 13, 14, 91, 94 and 101 constitute a part of the sight line detecting means. There are further provided a phototaking system (phototaking lens) 1; a quick return mirror 2; a sub mirror 3 fixed to said quick-return mirror 2; a photosensitive member (image plane) 4; a shutter 5; focus detecting means 6a, capable of so-called multi-point focus detecting function for detecting the focus state in plural positions (areas) in the finder viewing field.

There are further provided sight line determination means 102 for judging the state of a sight line signal from the calculation means 101; focus determination means 103 for judging the state of a focus signal from the focus detection means 6a; and selection means 104 for selecting at least one among plural focus detecting areas, based on the signals from the sight line determination means 102 and the focus determination means 103.

Adjustment means 105 effects focusing by axially driving a focusing lens of the phototaking system 1, according to a focusing signal from the focus detection means 6a, corresponding to the focus detecting area selected by the selection means 104.

The focus detecting means 6a in the present embodiment employs a known focus detecting method, which will be outlined in the following with reference to FIG. 2.

FIG. 2 is a partial schematic view of the optical path of the focus detecting means 6a in a developed state. A field mask MSK is positioned so as to be substantially equivalent to the photosensitive plane 4a, and is provided with a cross-shaped aperture MSK-1 at the center and vertically oblong apertures MSK-2, MSK-3 in peripheral areas on both sides. A field lens FLDL is composed of three parts FLDL-1, FLDL-2, FLDL-3 respectively corresponding to the three apertures MSK-1, MSK-2, MSK-3 of the field mask MSK.

A diaphragm DP is provided, at the central part thereof, with four apertures DP-1a, DP-1b, DP-1c, DP-1d in pairs in the vertical and horizontal directions, and, in the lateral peripheral areas thereof, with two pairs of apertures DP-2a, DP-2b and DP-3a, DP-3b. The areas FLDL-1, FLDL-2, FLDL-3 of said field lens FLDL respectively focus said paired apertures DP-1, DP-2, DP-3 in the vicinity of the exit pupil of an unrepresented objective lens.

A secondary imaging lens AFL is provided with eight lenses AFL-1a, AFL-1b, AFL-4a, AFL-4b, AFL-2a, AFL-2b, AFL-3a, AFL-3b in four pairs, which are positioned behind the diaphragm DP, respectively corresponding to the apertures thereof.

A sensor SNS is provided with eight sensor arrays SNS-1a, SNS-1b, SNS-4a, SNS-4b, SNS-2a, SNS-2b, SNS-3a, SNS-3b in four pairs, which are so positioned as to receive object images formed by the secondary imaging lenses AFL.

In the focus detecting system shown in FIG. 2, if the focal point of the phototaking lens is positioned in front of the film plane, the object images formed on the paired sensor arrays are mutually close, and, if said focal point is positioned behind the film plane, the object images become mutually separated. The amount of mutual displacement of said object images is correlated by a specified function with the defocus amount of the phototaking lens, so that the defocus amount of said phototaking lens can be detected by applying a suitable calculation to the outputs of the sensors.

The above-explained configuration allows focus detection, in the vicinity of the center of a field taken or observed by the unrepresented objective lens, even for an object of which light amount distribution varies solely in the vertical or horizontal direction, and also allows focus detection even for an object present in a peripheral position corresponding to the aperture MSK-2 or MSK-3 of the field mask MSK.

Figure 3:
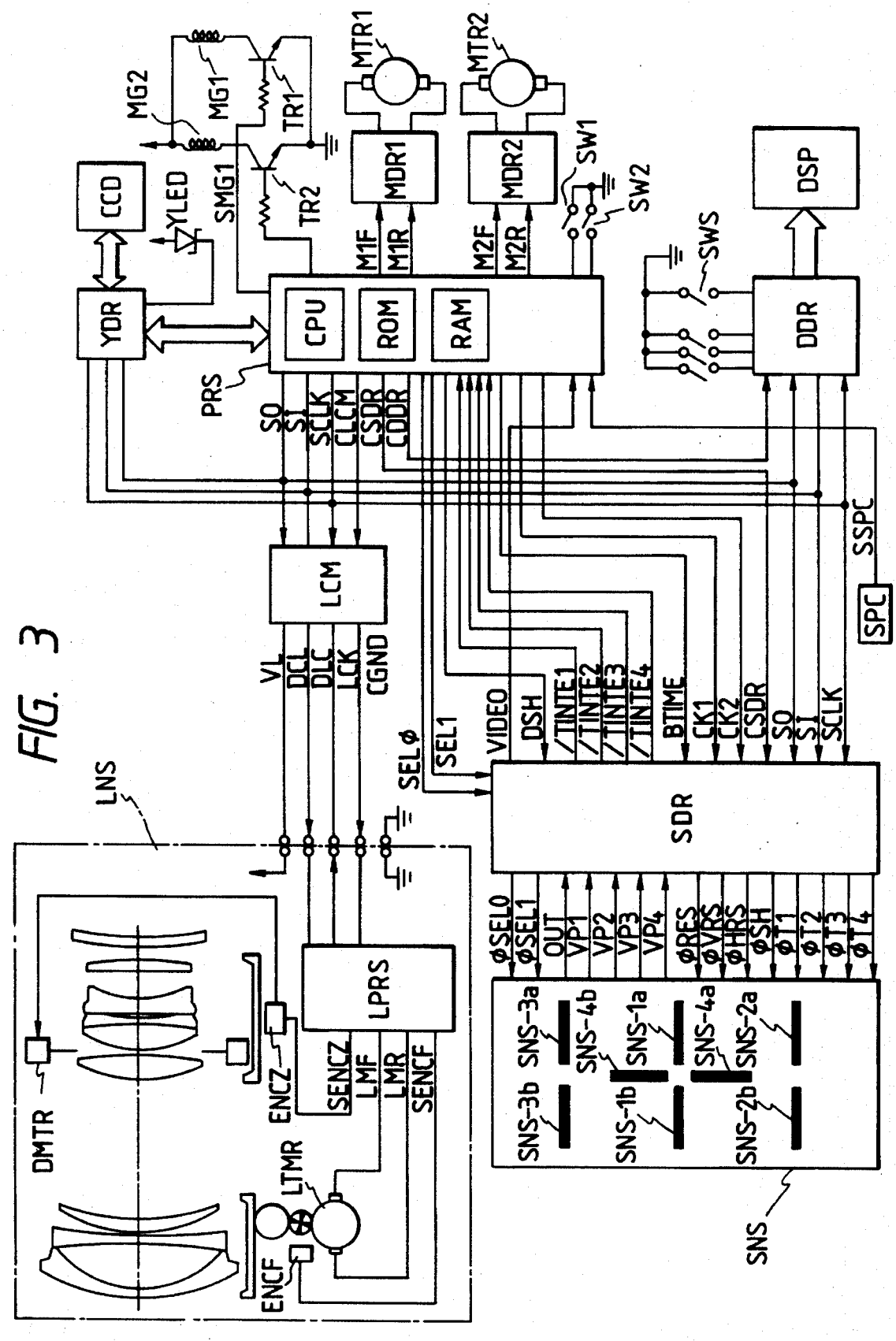
FIG. 3 is a circuit diagram of the camera shown in FIG. 1.

FIG. 3 is a circuit diagram showing an example of the specific structure of the camera equipped with the focus detecting means as shown in FIG. 2.

A camera control device PRS is composed of a one-chip microcomputer provided therein with a CPU (central processing unit), a ROM, a RAM and an A/D converter.

The microcomputer PRS executes camera operations such as auto exposure control, auto focusing control, film advancing and rewinding etc. according to a sequence program stored in the ROM. For this purpose, the microcomputer PRS communicates with the peripheral circuits within the camera body and with the control device in the phototaking lens, utilizing communication signals SO, SI, SCLK and communication selection signals CLCM, CSDR, CDDR, thereby controlling the functions of said circuits and lens.

There are shown a data signal SO released from the microcomputer PRS, a data signal SI entered to the microcomputer PRS, and a synchronization clock signal SCLK for the signals SO, SI. A lens communication buffer circuit LCM supplies electric power to a power supply terminal VL for the lens when the camera is in function, and serves as a communication buffer between the camera and the lens when a selection signal CLCM from the microcomputer PRS is at the high ("H") level state.

When the microcomputer PRS shifts the selection signal CLCM to the H-level state and releases predetermined data as the signal SO in synchronization with the clock signal SCLK, the buffer circuit LCM sends buffered signals LCK, DCL of the clock signal SCLK and the signal SO to the lens LNS through camera-lens communication contacts. At the same time it releases, as the signal SI, buffered signal of the signal DCL from the lens LNS, and the microcomputer PRS receives said signal SI as lens data, in synchronization with the clock signal SCLK.

A switch selection and display circuit DDR is selected when the signal CDDR is at the H-level state, and is controlled by the microcomputer PRS by the signals SO, SI and the clock signal SCLK. It serves to switch the display on a display unit DSP of the camera based on the data supplied from the microcomputer PRS, and informs the microcomputer PRS of the on-off state of various operation members of the camera, by communication.

Switches SW1, SW2 linked with an unrepresented shutter release button, are respectively turned on by a first stroke depression and a second stroke depression of said button. The microcomputer PRS executes light metering and auto focusing when the switch SW1 is turned on, and executes exposure control and the film advancing thereafter when triggered by the turning-on of the switch SW2.

The switch SW2 is connected to an interruption input port of the microcomputer PRS, so that, when the switch SW2 is turned on, the control is immediately shifted to a predetermined interruption program even when a program in response to the turning-on of the switch SW1 is in execution.

A film advancing motor MTR1 and a motor MTR2 for up-down motion of the mirror and shutter spring charging are driven in forward and reverse directions by respective drive circuits MDR1, MDR2. Motor control signals M1F, M1R, M2F, M2R are supplied to said drive circuits MDR1, MDR2 from the microcomputer PRS.

Magnets MG1, MG2 for releasing the leading and trailing shutter curtains are energized by signals SMG1, SMG2 and amplifying transistors TR1, TR2, whereby the shutter is controlled by the microcomputer PRS.

The switch detection and display circuit DDR, the motor drive circuits MDR1, MDR2 and the shutter control will not be explained further, as they are not directly related to the present invention.

An in-lens control circuit LPRS receives the signal DCL, entered in synchronization with the buffer signal LCK and constituting a command from the camera to the phototaking lens LNS, and the function of lens is determined in advance for each command.

The control circuit LPRS analyzes the command according to a predetermined sequence, and executes a focusing or diaphragm controlling operation, or releases the function status of the lens (drive status of the focusing optical system or of diaphragm) or various parameters (fully-open F-number, focal length, or coefficient of the defocus among versus the amount of movement of focusing optical system) as an output signal DLC.

The present embodiment employs a zoom lens, and, if a focusing command is sent from the camera body, a focusing motor LMTR is driven by signals LMF, LMR according to the amount and direction of drive transmitted at the same time, to achieve focusing by axial movement of the focusing optical system.

The amount of movement of the optical system is controlled by detecting patterns of a pulse disk rotating in linkage with said optical system by means of a photocoupler, monitoring pulse signals SENCF of an encoder circuit ENCF releasing pulses of a number corresponding to the amount of movement, counting said pulses with a counter provided in the circuit LPRS, and controlling the motor LMTR by shifting signals LMF, LMR from said circuit LPRS to the L-level state when the obtained count coincides with the amount of movement instructed to the circuit LPRS.

Consequently, once the focusing command is sent from the camera body, the microcomputer PRS therein need not be involved at all in the lens drive until it is terminated. Also, if requested from the camera body, the count of the above-mentioned counter can be sent to the camera body.

When a diaphragm control command is sent from the camera body, a stepping motor DMTR known for diaphragm control is driven according to a number of diaphragm stops transmitted at the same time. Since the stepping motor can be open-loop controlled, a monitoring encoder is not required.

An encoder circuit ENCZ is associated with the zoom optical system, and the zoom position thereof can be detected by the control circuit LPRS, by means of a signal SENCZ from said encoder circuit ENCZ. The control circuit LPRS stores lens parameters corresponding to different zoom positions, and, when requested by the microcomputer PRS of the camera body, sends the parameters corresponding to the current zoom position to the camera.

An exposure controlling photosensor SPC receives the light coming from the object through the phototaking lens LNS, and an output SSPC thereof is supplied to an analog input port of the microcomputer PRS and used, after A/D conversion, in auto exposure control according to a predetermined program.

A drive circuit SDR for the focus detecting sensor device SNS is selected when the signal CSDR is at the H-level state, and is controlled by the microcomputer PRS through the signals S0, SI and the synchronization clock signal SCLK.

Signals φSEL0, φSEL1 supplied from the drive circuit SDR to the sensor SNS are identical with the signals SEL0, SEL1 from the microcomputer PRS, and select:

paired sensor arrays SNS-1a, SNS-1b if φSEL0="L" and φSEL1="L";

paired sensor arrays SNS-4a, SNS-4b if φSEL0="H" and φSEL1="L";

paired sensor arrays SNS-2a, SNS-2b if φSEL0="L" and φSEL1="H"; or paired sensor arrays SNS-3a, SNS-3b if φSEL0="H" and φSEL1="H".

After the charge accumulation, the signals SEL0, SEL1 are suitably set and clock signals φSH, φHRS are supplied, whereby image signal of the sensor arrays selected by the signals SEL0, SEL1 (φSEL0, φSEL1) are serially released from an output terminal VOUT.

Monitor signals VP1, VP2, VP3, VP4 are supplied from object luminance monitoring sensors respectively positioned close to the paired sensor arrays SNS-1a, SNS-1b; SNS-2a, SNS-2b; SNS-3a, SNS-3b; SNS-4a, SNS-4b, and are elevated in voltage simultaneous with the start of signal accumulation, thereby controlling the signal accumulation of said sensor arrays.

There are also shown sensor resetting clock signals φRES, φVRS; image signal reading clock signals φHRS, φSH; and clock signals φT1, φT2, φT3, φT4 for terminating the signal accumulation of the paired sensor arrays.

The output VIDEO of the sensor drive circuit SDR is an image signal, obtained as the difference between the image signal VOUT from the sensor SNS and the dark current output, followed by amplification with a gain determined by the object luminance. Said dark current output is the output of a shielded pixel in the sensor array. The drive circuit SDR retains said dark current output in a capacitor in response to the signal DSH from the microcomputer PRS, and effects differential amplification of the image signal, utilizing said retained output. The output VIDEO is supplied to the analog input port of the microcomputer PRS, which executes A/D coversion and stores the obtained digital values in succession in predetermined addresses of the RAM.

Signals /TINTE1, /TINTE2, /TINTE3, /TINTE4 indicate that the charge accumulations respectively in the paired sensor arrays SNS-1a, SNS-1b; SNS-2a, SNS-2b; SNS-3a, SNS-3b; SNS-4a, SNS-4b have reached appropriate levels and have been terminated. In response to said signals, the microcomputer PRS executes the image signal readout.

A signal BTIME defines the timing of determining the readout gain of the amplifier for the image signal from the sensor drive circuit SDR, which determines the readout gain for the paired sensor arrays, according to the voltages of the monitor signals VP0–VP3 when said signal BTIME is shifted to the H-level state.

Reference clock signals CK1, CK2 are supplied from the microcomputer PRS to the sensor drive circuit SDR for generating the above-mentioned clock signals φRES, φVRS, φHRS, φSH. The accumulation of the sensor SNS is initiated when the microcomputer PRS shifts the communication selection signal CSDR to the H-level state and sends a predetermined accumulation start command to the drive circuit SDR.

Thus the four pairs of the sensor arrays effect photoelectric conversion of the object image formed on said sensor arrays, and charges are accumulated in the photoelectric conversion elements of the sensors. At the same time, the voltages of the signals VP1–VP4 of the luminance monitoring sensors are elevated, and when said voltages reach a predetermined level, said signals /TINTE1–/TINTE4 are individually shifted to the L-level.

In response, the microcomputer PRS releases a clock signal CK2 of a predetermined form, and the sensor drive circuit SDR generates clock signals φSH, φHRS, based on said clock signal CK2, for supply to the sensor SNS, which in response releases the image signal. The microcomputer PRS effects A/D conversion of the output signal VIDEO entered at the analog input port, by the internal A/D conversion function, in synchronization with the clock signal CK2 released from said microcomputer PRS, and stores the converted digital signals in succession into the predetermined addresses of the RAM.

The functions of the sensor drive circuit SDR and the sensor SNS will not be explained further, since they were already disclosed, for example in relation to a focus detecting device having two pairs of sensor arrays, in the U.S. Pat. No. 5,126,777.

The microcomputer PRS receives the image information of the object image formed on the sensor arrays as explained above, and thereafter effects the predetermined calculation for focus detection, thereby determining the defocus amount of the phototaking lens.

An image sensor CCD is provided for detecting the position of the line of sight of the photographer, looking at the finder viewing field. A light source YLED for the detection of the line of sight is composed of plural light-emitting diodes (LED). Said light emitting diodes illuminate the eyeball of the observer looking into the viewing field of the view finder of the camera, and the reflected light is focused on the image sensor, CCD and the position of the line of sight of the observer is detected based on the information of the image position.

An interface circuit YDR for sight line detection effects signal accumulation and signal readout of the image sensor CCD and drives the light source YLED, according to the commands of the microcomputer PRS.

Figure 4:
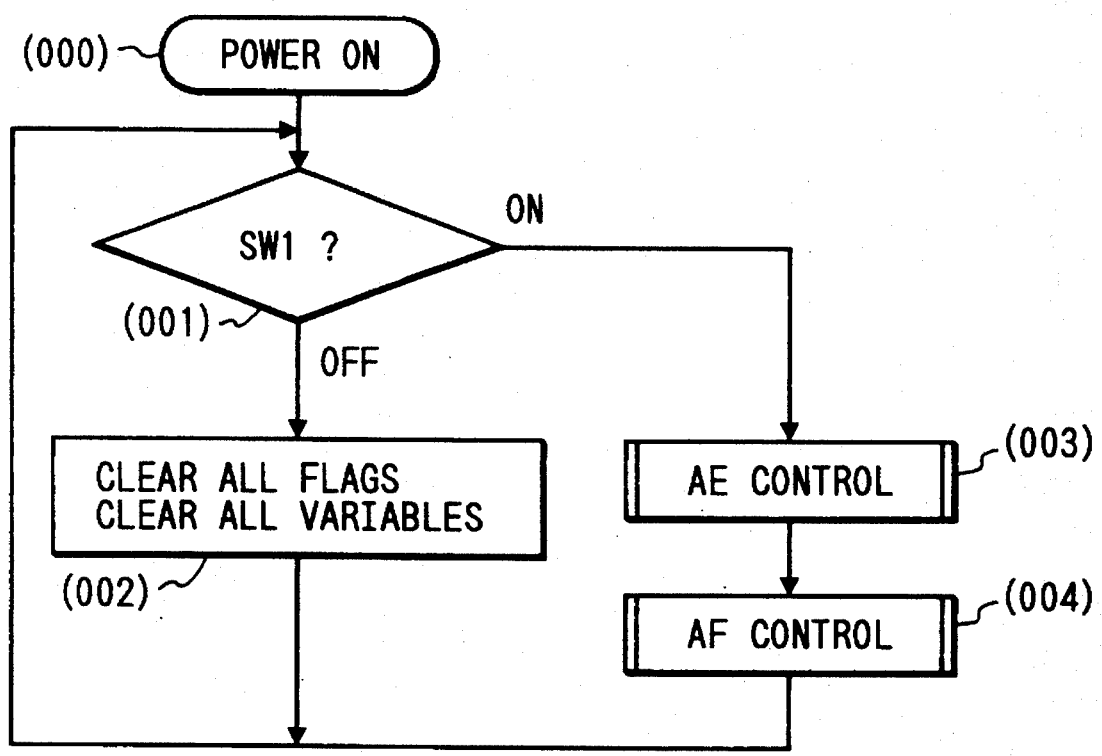
FIG. 4 is a schematic flow chart of the control sequence of the entire camera shown in FIG. 1.

In the following there will be explained the auto focusing device of the camera of the present embodiment, with reference to the attached flow charts. FIG. 4 is a schematic flow chart showing the control sequence of the entire camera of the present embodiment. When the power supply to the circuits shown in FIG. 3 is initiated, the microcomputer PRS starts execution from a step (000) shown in FIG. 4.

At first a step (001) detects the state of the switch SW1 to be turned on by a first stroke depression of the shutter release button, and, if it is off, the sequence proceeds to a step (002) to initialize all the flags and variables. On the other hand, if the switch SW1 is on, the sequence proceeds to a step (003) to initiate the functions of the camera.

The step (003) executes an "AE control" subroutine, including light metering, detection of the states of various switches and display. Said AE control will not be explained further, as it is not directly related to the present invention. After said "AE control" subroutine, the sequence proceeds to a step (004).

The step (004) executes an "AF control" subroutine, including sensor signal accumulation, focus detecting calculation and lens drive, thus achieving auto focusing. After the "AF control" subroutine, the sequence returns to the step (001), and the steps (003) and (004) are repeatedly executed until the power supply is turned off.

The present flow chart does not include the shutter releasing operation, which is intentionally omitted because it is not directly related to the present invention.

Figure 5:
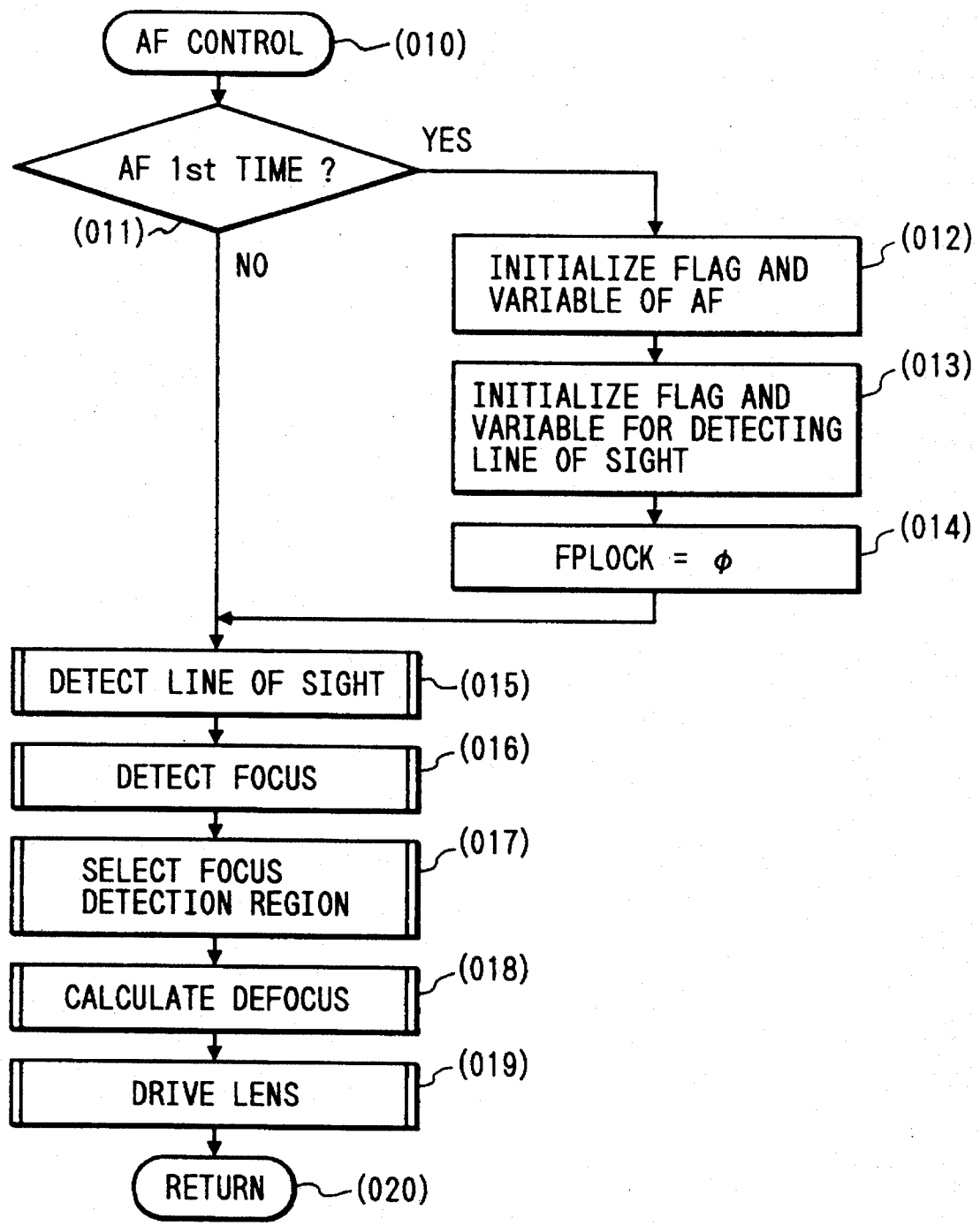
FIG. 5 is a flow chart of an AF control subroutine shown in FIG. 4.

FIG. 5 is a flow chart of the "AF control" subroutine to be executed in the step (004) in FIG. 4. When said subroutine is called, the microcomputer PRS proceeds to a step (010) shown in FIG. 5 and executes the AF control starting from a step (011).

At first the step (011) discriminates whether this is the first AF control after the switch SW1 is turned on, and, if it is the first time, the sequence proceeds to a step (012) to initialize the variables and flags for AF control. Then a step (013) initializes the flags and variables for the sight line detection.

Then a step (014) clears a flag FPLOCK, to be employed in the sight line detection to be explained later, and indicating that the focus detecting point was already set by the sight line detecting means.

Then the sequence proceeds to a step (015). Also if the step (011) identifies that this is not the first AF control after the switch SW1 is turned on, the sequence proceeds to the step (015).

The step (015) executes "sight line detection" subroutine, including signal accumulation in the sensor for sight line detection (sensor 14 in FIG. 1), signal readout therefrom, extraction of the watched point and determination of the focus detecting point based on the detected line of sight.

Figure 6:
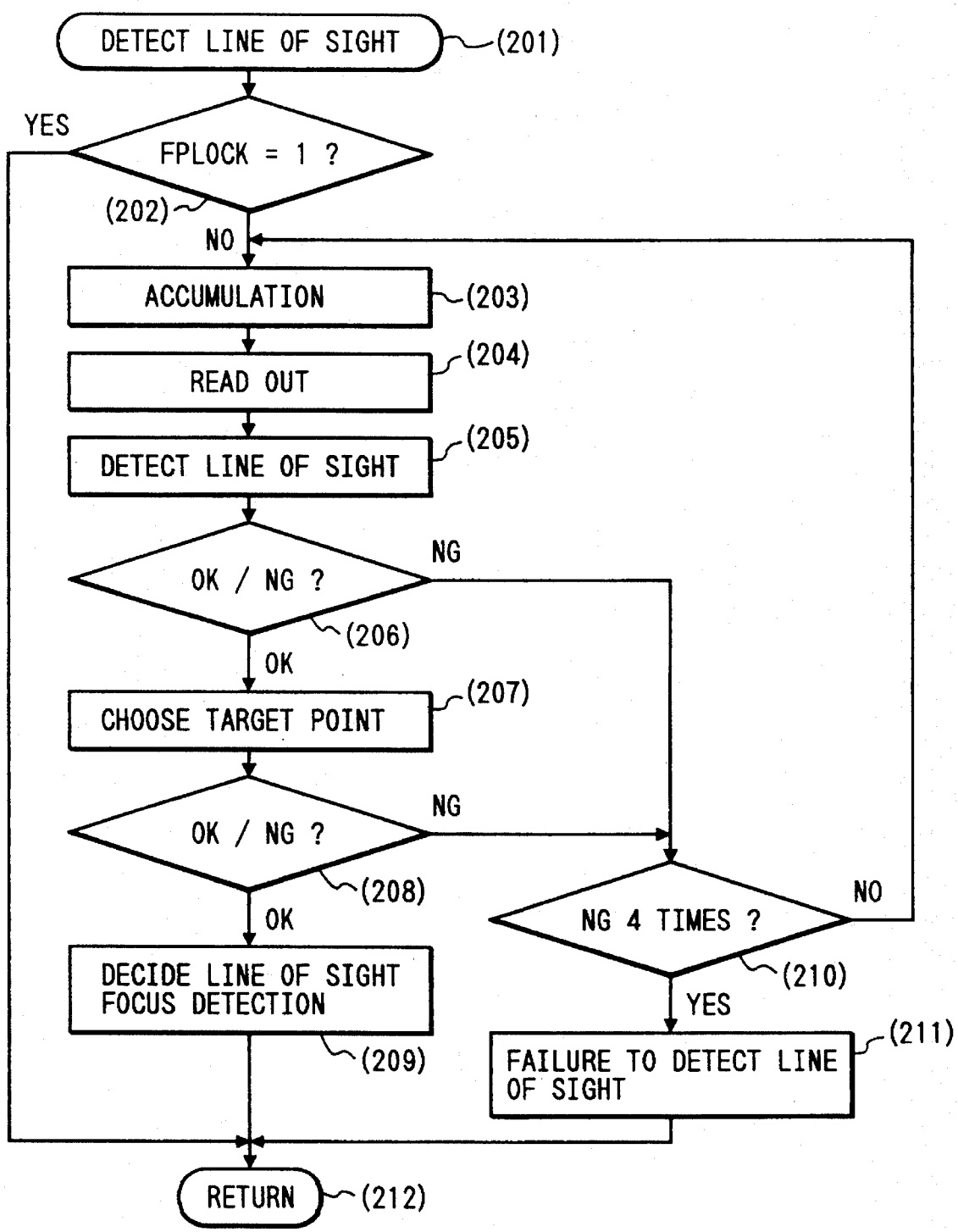
FIG. 6 is a flow chart of a sight line detection subroutine in FIG. 5.

Flow chart of the detection of the line of sight is shown in FIG. 6.

Now, referring again to FIG. 5, a step (016) executes a "focus detection" subroutine, including signal accumulation in the sensors for focus detection, signal readout therefrom, calculation for focus detection and determination of the focus detecting point where the main object is assumed to be present.

Figure 7B:
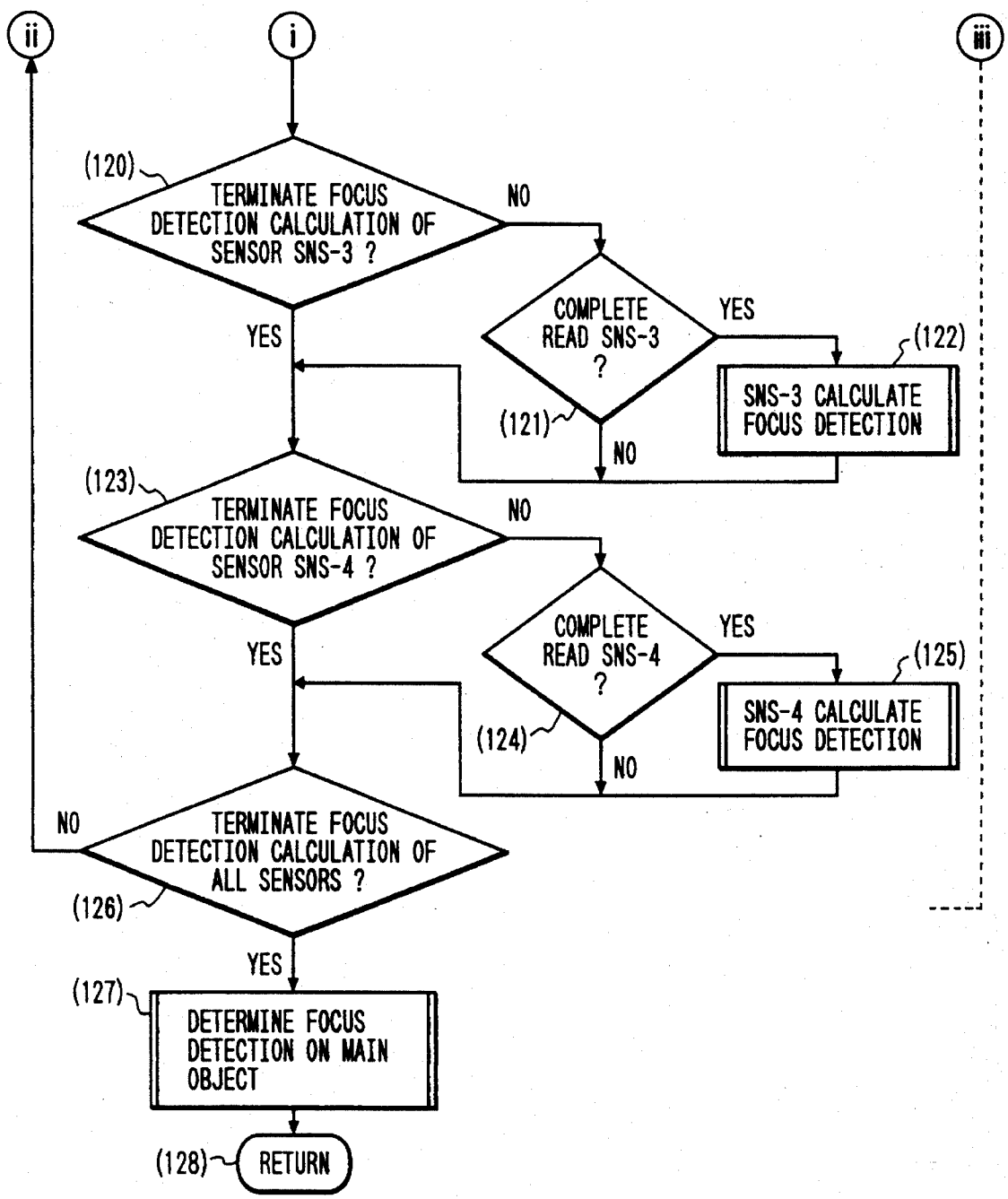
FIG. 7, which consists of FIGS. 7A and 7B, and 8 are flow charts of a focus detecting subroutine in FIG. 5.
Figure 8:
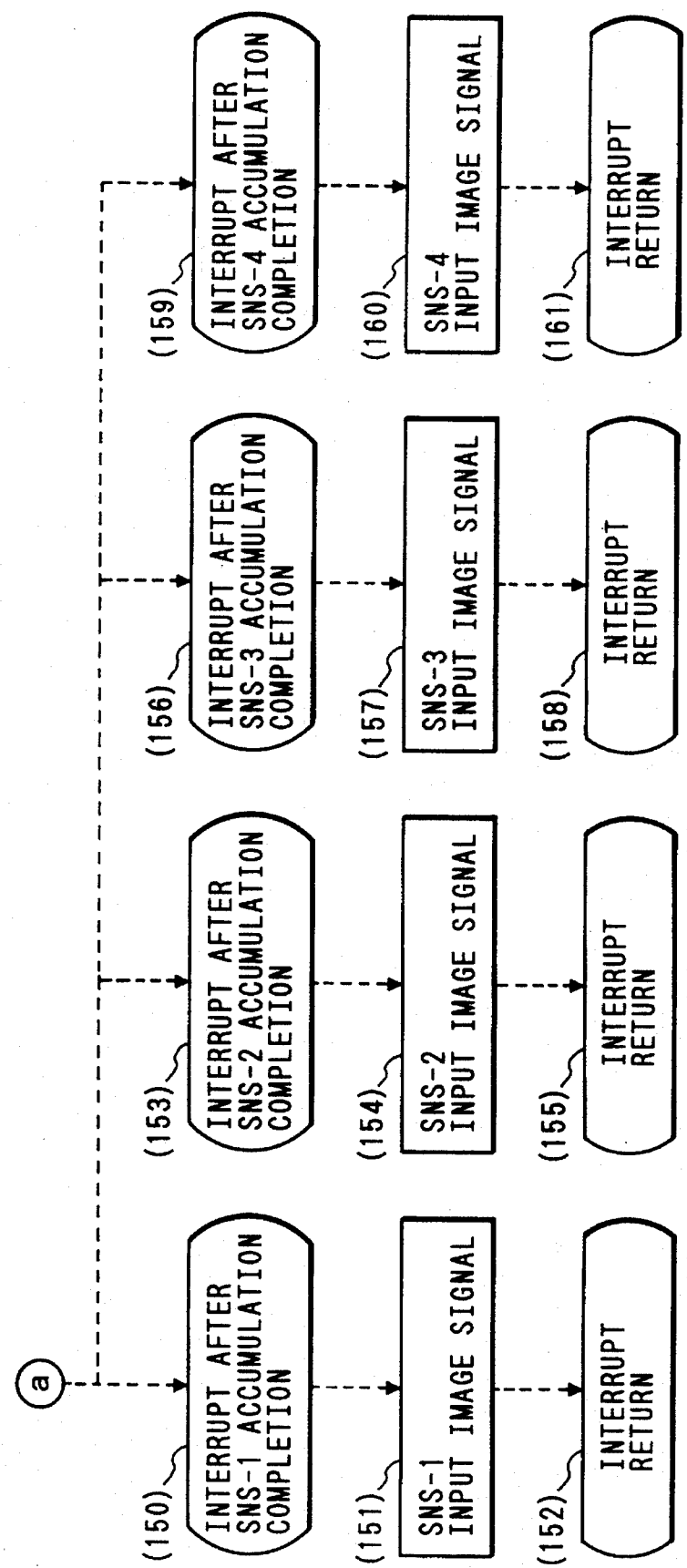

Flow charts of the focus detection are shown in FIGS. 7A, 7B and 8.

Again referring to FIG. 5, a step (017) executes a "focus detecting area selection" subroutine, in which determined is the actually employed focus detecting point, based on the information on the focus detecting point obtained in the "focus detection" subroutine executed in the step (016) and on the information based on the watched point obtained from the "sight line detection" subroutine executed in the step (015).

Figure 9:
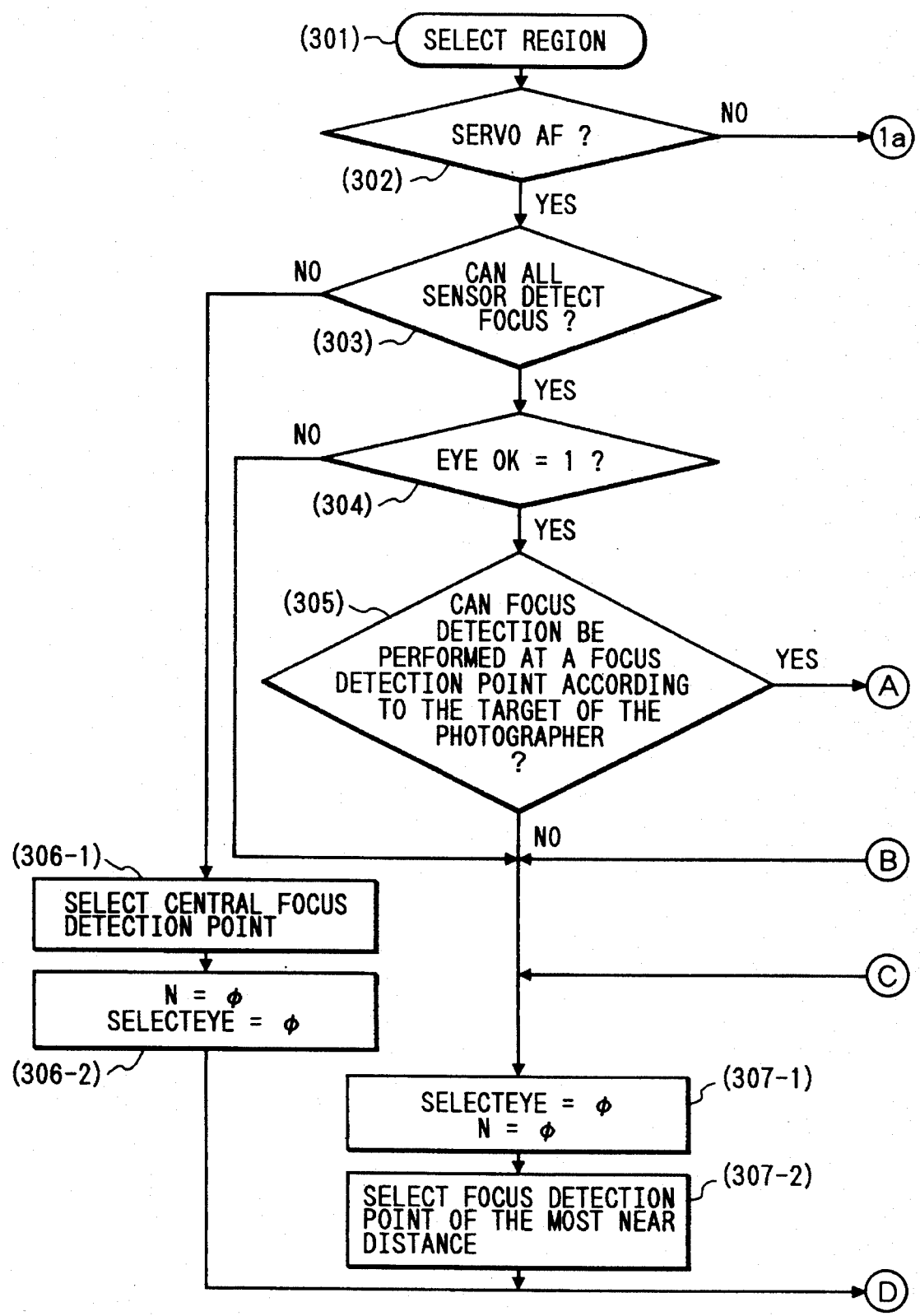
FIGS. 9 to 11 are flow charts of a subroutine for selecting the focus detecting area, shown in FIG. 5.
Figure 10:
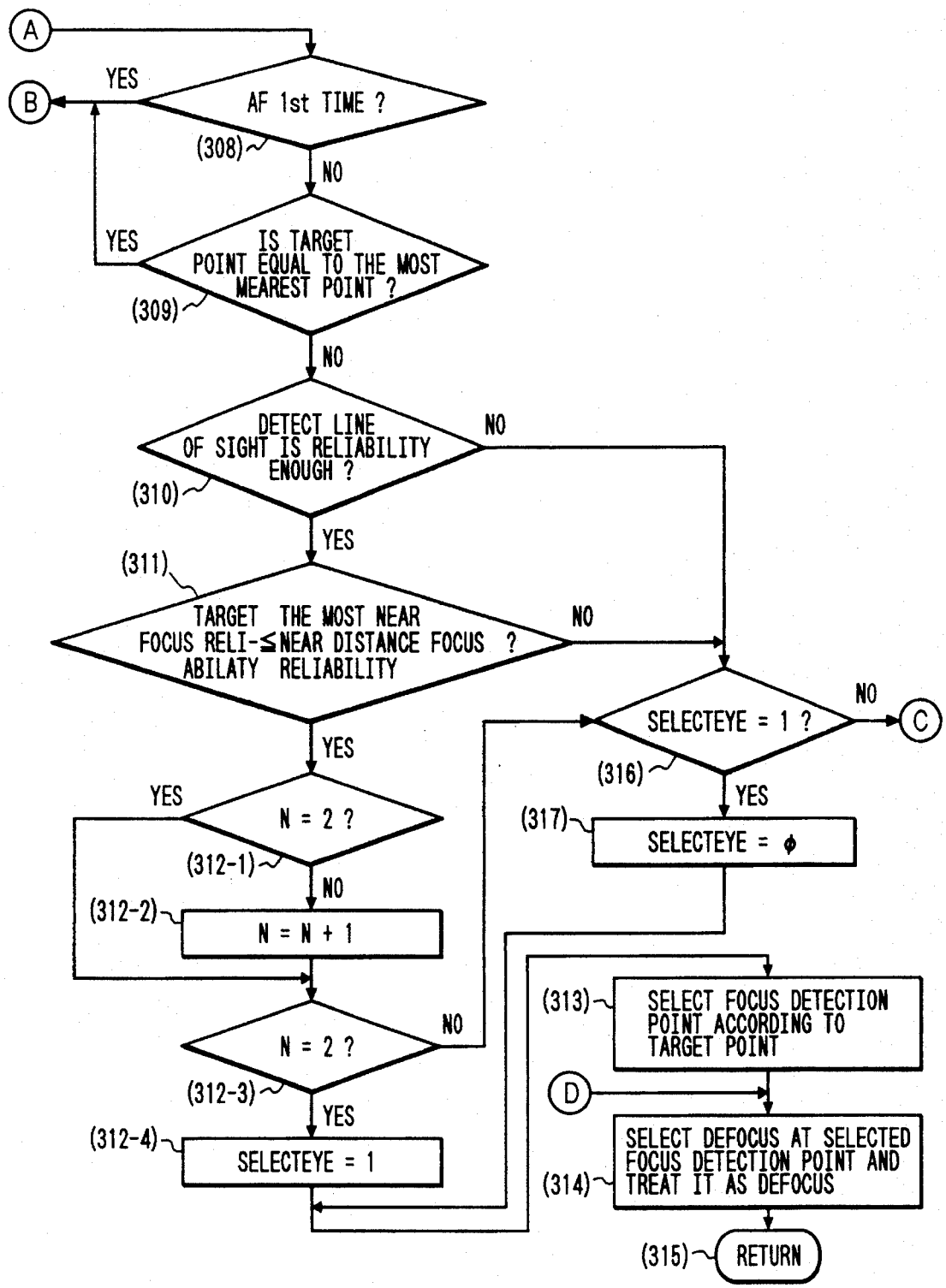
Figure 11:
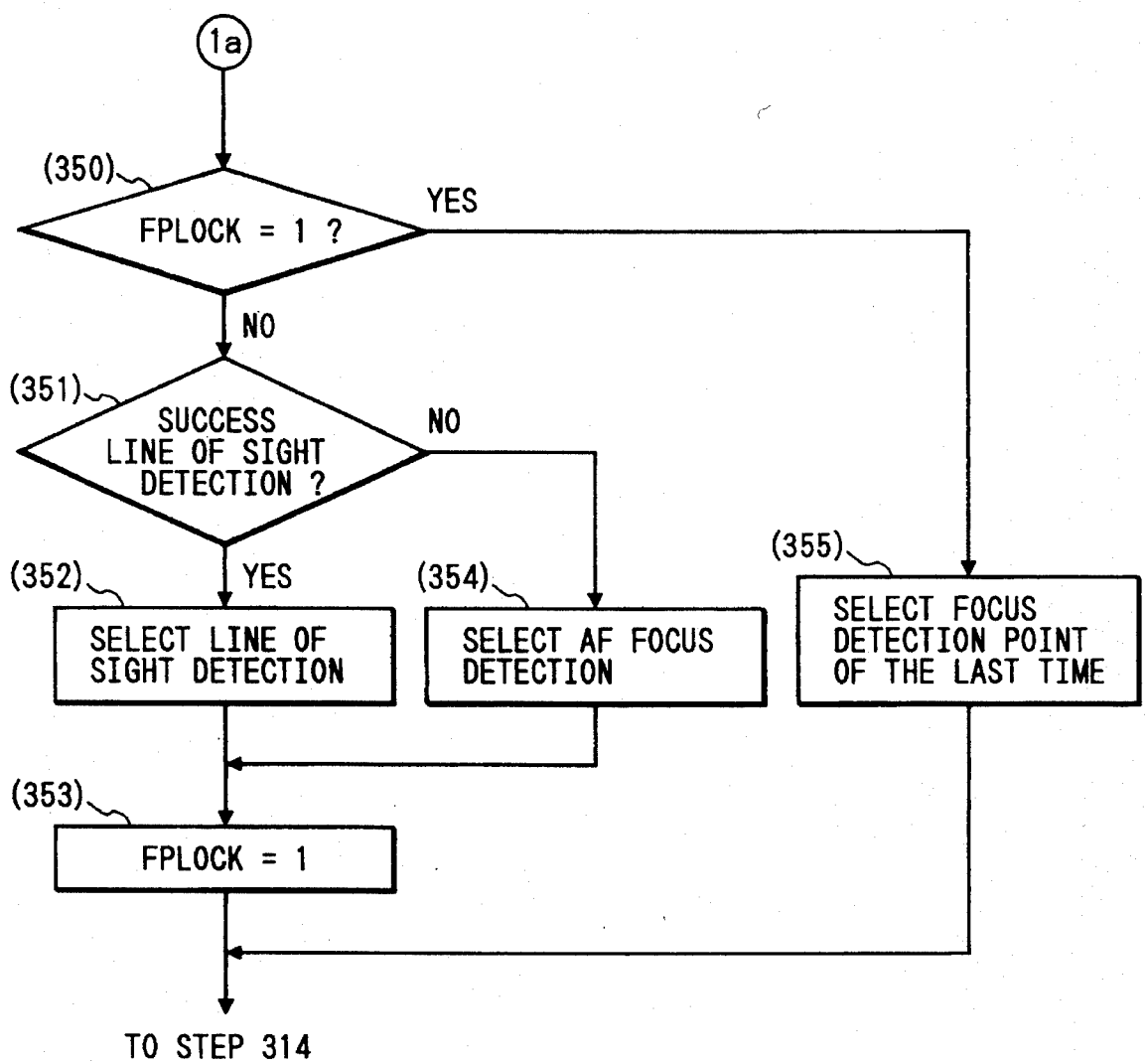

Flow chart for selecting the focus detecting area is shown in FIGS. 9, 10 and 11.

Again referring to FIG. 5, a step (018) calculates the defocus amount, from the focus information of the focus detecting point, obtained in the step (017).

A succeeding step (019) executes a "lens drive" subroutine, for determining the amount of actual lens drive from the defocus amount, and driving the lens if necessary. After the completion of lens drive, the sequence returns to the main routine from the "AF control" subroutine through a step (020).

In the following there will be explained the "focus detection" subroutine of the step (016) in FIG. 5, with reference to the flow charts shown in FIGS. 7A, 7B and 8. When this subroutine is called, the microcomputer PRS proceeds to a step (110) and executes the focus detecting operation starting from a step (111).

At first the step (111) discriminates whether this is the first AF control after the switch SW1 is turned on, and, if it is the first time, the sequence proceeds to a step (112) to initialize the selection sensor.

Then a step (113) executes an "accumulation start" subroutine for initiating the signal accumulation of the sensor, by sending an accumulation start command to the sensor drive circuit SDR to initiate the signal accumulation of the sensor SNS and simultaneously enabling the interruption in order that the microcomputer PRS can executes an "accumulation completion interruption" subroutine in response to the accumulation end signals /TINTE1–/TINTE3 from said sensor drive circuit SDR.

Thus the interruption procedure is executed when each of four sensors SNS-1 to SNS-3 completes the signal accumulation.

The completion of signal accumulation in each sensor can be detected by the downshift of each of the signals /TINTE1–/TINTE3, which are supplied to the interruption input port of the microcomputer PRS.

In FIGS. 7A and 7B, a portion (a) indicated by a broken line indicates the interruption control. When an interruption is generated by the signals TINTE1–/TINTE3, the control proceeds, through (a), to the interruption subroutines shown in FIG. 8.

Consequently, for example, when the charge in the sensor SNS-1 reaches an appropriate accumulation level, the signal /TINTE1 from the sensor drive circuit SDR is shifted down, whereby the control moves to the interruption-subroutine starting from a step (150) in FIG. 8, for entering the image signal from the sensor SNS-1.

After the step (151) enters the image signal of the sensor SNS-1, a step (152) terminates the interruption subroutine. Said image signal input is achieved by effecting serial A/D conversion on the output signal VIDEO supplied to the analog input port of the microcomputer PRS, and storing obtained digital data in succession in a predetermined RAM area.

Also when the signal accumulation of the sensor SNS-2, SNS-3 and SNS-4 is completed, there is executed a similar interruption control for proceeding to a step (153), (156) or (159) thereby entering the image signal of said sensor.

The "accumulation start" subroutine and the detailed method of image signal input will not be explained further, as they are disclosed in the Japanese Patent Application No. 63-216905.

Now reference is made again to FIGS. 7A and 7B. Since the input of the image signal of each sensor is executed by an interruption control, it is preferentially executed at the completion of charge accumulation, even in the course of execution of the focus detecting operation in steps (114) to (126).

After the step (113) initiates the signal accumulation of the sensors, a step (114) discriminates whether the focus detecting calculation of the sensor SNS-1 has been completed, and, if not, the sequence proceeds to a step (115).

The step (115) discriminates whether the interruption procedure for entering the image signal of the sensor SNS-1 has been completed, and, if completed, a step (116) executes the focus detecting calculation based on the image signal of the sensor SNS-1.

The detailed method of calculation of the defocus amount will not be explained as it is described for example in the U.S. Pat. No. 4,812,869.

If the step (114) identifies that the focus detecting calculation for the sensor SNS-1 has not been completed, or if the step (115) identifies that the image signal input for the sensor SNS-1 has not been completed, or if the focus detecting calculation in the step (116) has been completed, the sequence proceeds to a step (117).

Steps (117), (118) and (119) execute the above-explained process on the sensor SNS-2. Also steps (120), (121) and (122) execute the above-explained process on the sensor SNS-3, and steps (123), (124) and (125) execute the above-explained process on the sensor SNS-4.

Then a step (126) discriminates whether the focus detecting calculations for all the sensors have been completed, and, if completed or not, the sequence respectively proceeds to a step (127) or (114).

In summary, after the signal accumulation is started in the step (113), the input of the image signal of each sensor by the interruption procedure is awaited, and the steps (114) to (126) are repeated to execute the focus detecting calculations in succession on the image signals entered from the sensors.

Then a step (127) selects the focus detecting point where the main object is assumed to be present, based on the result of the focus detecting calculations for said sensors. The main object is assumed to be present at a focus detecting point of the shortest object distance, among those where the focus detection is possible. After the determination of the focus detecting point, a step (128) terminates the "focus detection" subroutine.

In the following there will be explained the "sight line detection" subroutine in the step (015) shown in FIG. 5, with reference to a flow chart shown in FIG. 6. When this subroutine is called, the microcomputer PRS proceeds to a step (201) and executes the sight line detecting operation starting from a step (202).

At first the step (202) discriminates whether the flag FPLOCK is "1", namely whether the focus detecting point has been set by the line of sight in a one-shot auto focusing operation.

When the flag FPLOCK is "1", namely when the focus detecting point has been set by the sight line detection in the one-shot AF, the sight line detecting sequence is skipped and the sequence proceeds to a step (212). On the other hand, if the flag FPLOCK is "0", namely if the focus detecting point has not been set by the sight line detection in the one-shot AF, or in case of servo AF mode, the sequence proceeds to a step (203) for executing the sight line detecting sequence.

Steps (203) and (204) execute signal accumulation of the sight line detecting sensors, and signal readout therefrom.

A succeeding step (205) determines the direction of the line of sight of the photographer, based on the sight line data read in the step (204). If a next step (206) identifies that the detection is impossible in the course of calculation of the line of sight in the step (205), the sequence proceeds to a step (210), but, if the detection is identified as possible, the sequence proceeds to a step (207).

The step (207) determines the point watched by the observer in the viewing field, based on the direction of the line of sight obtained in the step (205). A next step (208) discriminates whether the result obtained in the step (207) is reliable for use in the camera control. If it is reliable, the sequence proceeds to a step (209).

The step (209) determines the focus detecting point, corresponding to the watched point determined in the step (207), then sets a flag EYEOK, indicating the success of the sight line detection, and the sequence proceeds to a step (212). On the other hand, if the step (208) identifies that the result is not reliable, the sequence proceeds to a step (210).

The step (210) checks the number of the unreliable results obtained. If said number is 3 or less, the sequence returns to the step (203) to again execute the signal accumulation and readout of the sensor. If said number is 4, the detection is considered as impossible for some reason, and the sequence proceeds to a step (211).

The step (211) executes a process for the failed detection of the line of sight, and clears the flag EYEOK, indicating the success of detection. Then a step (212) terminates the "sight line detection" subroutine.

In the following there will be explained the selection of the focus detecting area in the step (017) shown in FIG. 5, with reference to flow charts of the "area selection" subroutine shown in FIGS. 9, 10 and 11. When this subroutine is called, the microcomputer PRS proceeds to a step (301) and executes the area selecting operation starting from a step (302).

At first the step (302) discriminates whether the AF mode of the camera is the servo AF mode, and, if not, the sequence proceeds to a step (350) in FIG. 11. The control in this case will be explained later. If the step (302) identifies the servo AF mode, the sequence proceeds to a step (303).

The step (303) discriminates whether the focus detection is impossible in all the sensors, based on the results of focus detections of the sensors, obtained in the "focus detection" subroutine executed in the step (016) in FIG. 5, and, if impossible, the sequence proceeds to a step (306-1) which selects the central focus detecting point, as the focus detection is impossible in all the sensors.

A next step (306-2) clears a variable N, indicating the number of consecutive generations of the condition for selecting the focus detecting point corresponding to the watched point, as such condition is currently not satisfied. Said step also clears a flag SELECTEYE, indicating that the condition for selecting the focus detecting point corresponding to the watched point is satisfied in the current area selecting operation. Then the sequence proceeds to a step (314).

On the other hand, if the step (303) identifies that any of the sensors is capable of focus detection, the sequence proceeds to a step (304).

The step (304) discriminates whether the sight line detection has been successful in the step (015) in FIG. 5. If the flag EYEOK indicating the success of the sight line detection is "0", namely if the detection has failed, the sequence proceeds to a step (307-1), but, if the flag EYEOK=1, namely if the detection has been successful, the sequence proceeds to a step (305).

The step (305) discriminates whether the focus detection is possible at the focus detecting point corresponding to the watched point in the view finder obtained in the step (207), and, if impossible, the sequence proceeds to a step (307-1).

The step (307-1) clears the flag SELECTEYE indicating that the condition for selecting the focus detecting point corresponding to the watched point is satisfied in the current area selecting operation, since such condition is currently not satisfied, and also clears the variable N indicating the number of consecutive generations of said condition.

A next step (307-2) selects a focus detecting point of the shortest object distance among the focus detecting points, where the focus detection is possible, obtained in the step (127), and the sequence proceeds to a step (314).

If the step (305) identifies that the focus detection is possible at the focus detecting point corresponding to the watched point in the finder viewing field obtained in the step (207), the sequence proceeds to a step (308).

The step (308) discriminates whether the current operation is the first AF control after the switch SW1 is turned on, and, if it is the first time, the sequence proceeds to the step (307-1). Thus, in the first AF control, there is selected the focus detecting point of the shortest object distance, among the focus detecting points where the focus detection is possible. On the other hand, if the step (308) identifies that the current operation is not the first AF control, the sequence proceeds to a step (309).

The step (309) discriminates whether the focus detecting point corresponding to the watching point of the photographer in the finder viewing field is same as the focus detecting point of the shortest object distance, and, if same, the sequence proceeds to the step (307-1), but, if different, the sequence proceeds to a step (310).

The step (310) discriminates whether the sight line detection executed in the step (015) in FIG. 5 is highly reliable, and, if highly reliable or not, the sequence respectively proceeds to a step (311) or (316).

The reliability of the detection of the line of sight is evaluated by the eyeball image data obtained in the steps (203), (204) shown in FIG. 6 and the number of edge data, diameter and horizontal rotation angle of the pupil.

More specifically, the evaluation is based on certain criteria, for example whether the number of the pupil edges exceeds a predetermined value, whether the pupil diameter is not excessively large beyond a predetermined value, and whether the horizontal rotation angle is not too large for looking into the viewing field.

A next step (311) compares the reliabilities of the focus detecting point of the shortest object distance among those where the focus detection is possible, obtained in the step (127), and of the focus detecting point corresponding to the watching point of the photographer in the finder viewing field, obtained in the step (207).

The reliability value indicates the level of coincidence of the two images on the paired sensor arrays of the sensor SNS, and becomes smaller in the present embodiment as the reliability increases. If the focus detecting point corresponding to the watching point of the photographer is more reliable than the focus detecting point obtained in the step (127), the sequence proceeds to a step (316), but otherwise the sequence proceeds to a step (312-1).

The step (312-1) discriminates whether the variable N, indicating the number of consecutive generations of the condition for selecting the focus detecting point corresponding to the watching point, is "2", and, if it is "2", the sequence proceeds to a step (312-3), in order not to increase said variable N to "3" or higher.

If the step (312-1) identifies that said variable N is not "2", namely when said condition is generated for the first or second time, the sequence proceeds to a step (312-2) for adding "1" to said variable N.

A next step (312-3) discriminates whether said variable N is "2", namely whether the above-mentioned condition has been consecutively generated at least twice, and, if said condition has been generated for the first time, the sequence proceeds to a step (316).

The above-mentioned discrimination whether said condition has been consecutively generated twice or more is to give emphasis on the selection of the focus detecting point obtained in the step (127). In the present embodiment, therefore, the focus detecting point corresponding to the watching point is not selected unless said condition is consecutively satisfied twice.

If the step (312-3) identifies N=2, namely that the condition for selecting the focus detecting point corresponding to the watching point is consecutively satisfied twice, the sequence proceeds to a step (312-4).

The step (312-4) sets the flag SELECTEYE indicating that the condition for selecting the focus detecting point corresponding to the watching point is satisfied in the current area selecting operation. A next step (313) selects the focus detecting point, corresponding to the watching point obtained in the step (207).

A next step (314) takes the defocus amount of the focus detecting point, selected in the sequence after the step (301), as a selected defocus amount, to be employed in the actual drive of the focusing lens.

On the other hand, if the step (310) identifies that the reliability of the sight line detection is not sufficiently high and if the step (311) identifies that the focus detecting point obtained in the step (127) is more reliable than the focus detecting point corresponding to the watching point, the sequence proceeds to a step (316).

The step (316) discriminates whether the flag SELECTEYE, indicating that the condition for selecting the focus detecting point corresponding to the watching point has been satisfied in the preceding area selecting operation, is "1", and, if it is "1", namely if the focus detecting point corresponding to the watching point has been selected in the preceding cycle, the sequence proceeds to a step (317). On the other hand, if SELECTEYE="0", the sequence proceeds to a step (307-1).

The step (317) clears the flag SELECTEYE, and the sequence proceeds to the step (313).

When the focus detecting point corresponding to the preceding watching point is selected by the steps (316) and (317), the current sight line detecting operation may become not sufficiently reliable, or the focus detecting point corresponding to the watching point may become less reliable than the focus detecting point of the shortest object distance, obtained in the step (127), so that the condition for selecting the focus detecting point corresponding to the watching point may not be satisfied.

Even in such case, the focus detecting point corresponding to the watching point is selected in the first cycle according to the discrimination of the step (316), but, if said condition is consecutively not satisfied twice, there is selected the focus detecting point of the shortest object distance obtained in the step (127), thereby realizing a hysteresis.

After the execution of the step (314), a step (315) terminates the "area selection" subroutine.

In the following there will be explained the control sequence starting from a step (350), to be executed when the aforementioned step (302) identifies that the AF mode of the camera is the one-shot mode.

The step (350) discriminates whether the flag FPLOCK is "1", and, if it is "1", or namely if the focus detecting point has been selected by the area selecting operation in a one-shot operation, the sequence proceeds to a step (355).

The step (355) selects again the focus detecting point selected previously, namely in the sight line detecting operation executed in the first AF control after the switch SW1 was turned on, and the sequence then proceeds to the step (314).

If the step (350) identifies that FPLOCK="0", indicating the first area selecting operation in the one-shot mode, the sequence proceeds to a step (351).

The step (351) discriminates whether the sight line detecting operation in the step (015) in FIG. 5 has been successful, and, if not, the sequence proceeds to a step (354).

The step (354) selects the focus detecting point which is obtained in the step (127), where the main object, selected by the focus detecting calculations on the sensors, is assumed to be present, and the sequence then proceeds to a step (353).

On the other hand, if the step (351) identifies that the sight line detection has been successful, a next step (352) selects the focus detecting point obtained in the step (209), corresponding to the watching point of the photographer in the finder viewing field.

Then a step (353) sets the flag FPLOCK at "1", indicating that the focus detecting point has already been selected in an area selecting operation in the one-shot mode, and the sequence then proceeds to a step (314).

The selecting means in the above-explained embodiment preferentially selects the focus detecting point according to the results of focus detecting calculations for the sensors.

Figure 12:
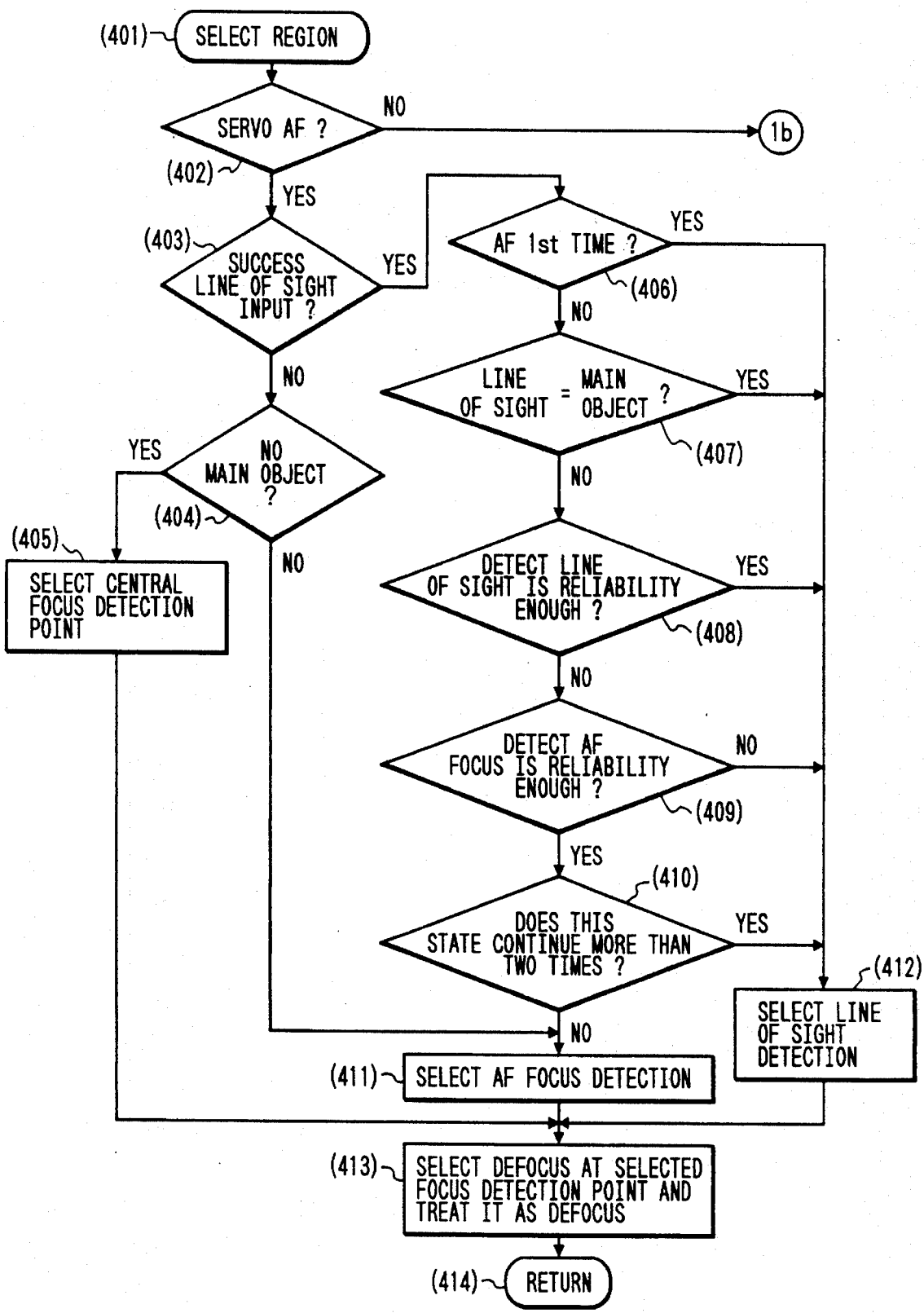
FIGS. 12 and 13 are flow charts of an area selecting subroutine in an embodiment 2 of the present invention.
Figure 13:
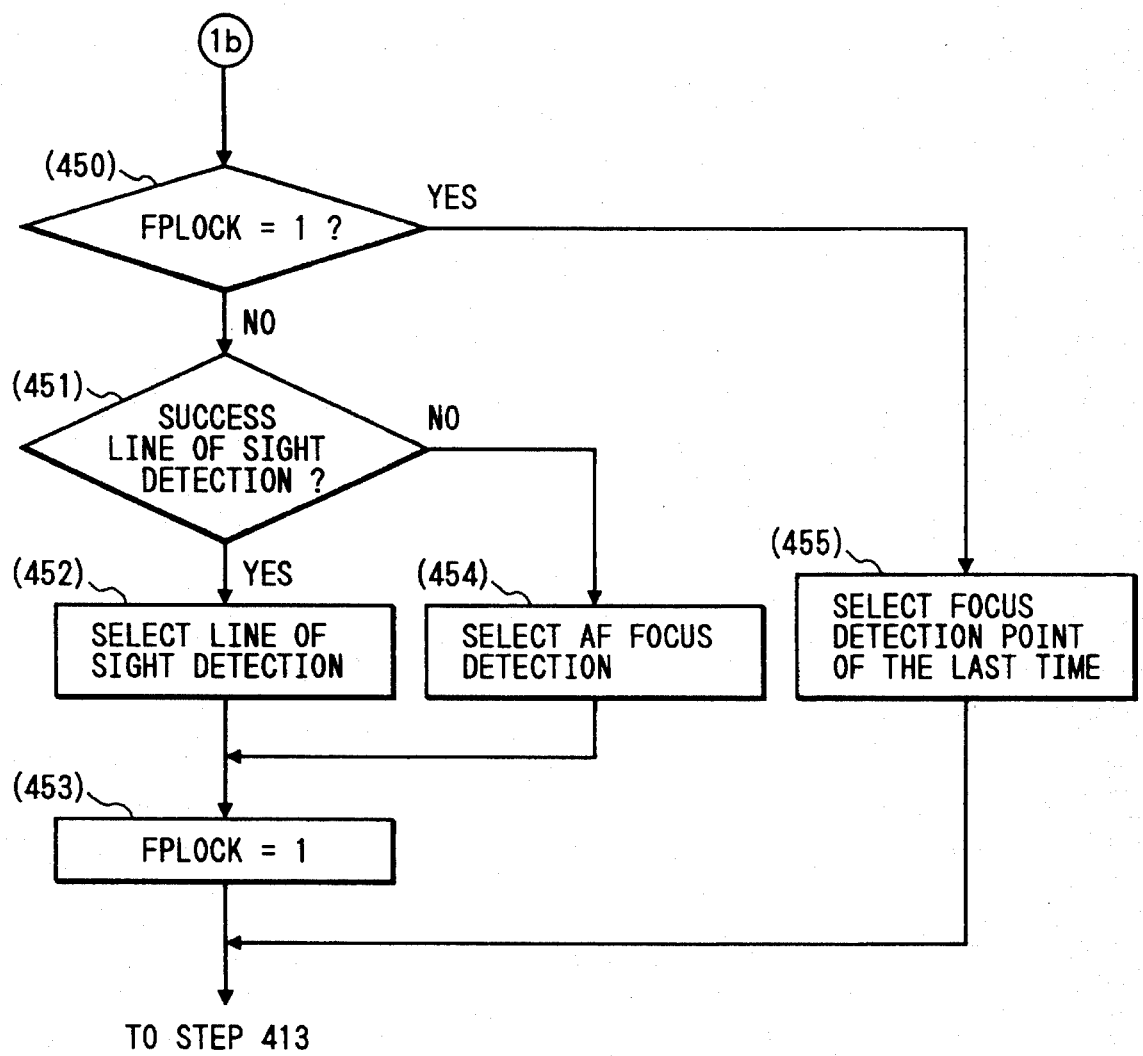

FIGS. 12 and 13 are flow charts of an "area selection" subroutine, for selecting the focus detecting area in an embodiment 2 of the present invention.

This embodiment is different from the foregoing embodiment 1 in that the selecting means preferentially selects the focus detecting point corresponding to the watching point obtained by the sight line detection, but is same as said embodiment 1 in other parts. For this reason there will only be explained the "area selection" subroutine shown in FIGS. 12 and 13.

FIGS. 12 and 13 show the "area selection" subroutine of the embodiment 2, to be executed in the step (017) shown in FIG. 5. When this subroutine is called, the area selecting operation is executed, starting from a step (401).

At first a step (402) discriminates whether the AF mode of the camera is the servo mode, and, if not, the sequence proceeds to a step (450) shown in FIG. 13, and the control sequence in this case will be explained later.

If the step (402) identifies the servo mode, a step (403) discriminates whether the sight line detection in said step (015) has been successful. If not, the sequence proceeds to a step (404).

The step (404) discriminates whether there exists the focus detection point obtained by the step (127), where the main object is assumed to be present according to the focus detecting calculations of the sensors, namely whether the focus detection is impossible at all the sensors. If the main object is judged not present, the sequence proceeds to a step (405).

The step (405) selects the central focus detecting point, as the main object is absent.

If the step (404) identifies the presence of the main object, the sequence proceeds to a step (404), and the subsequent sequence will be explained later. Also if the step (403) identifies successful sight line detection, the sequence proceeds to a step (406).

The step (406) discriminates whether the current cycle is the first AF control after the switch SW1 is turned on, and, if it is the first AF control, the sequence proceeds to a step (412).

The step (412) selects the focus detecting point obtained in the step (209) in FIG. 6, corresponding to the watching point of the photographer in the finder viewing field, and the sequence then proceeds to a step (413). Also if the step (406) identifies that the current cycle is not the first AF control, the sequence proceeds to a step (407).

The step (407) discriminates whether the focus detecting point obtained in said step (209) in FIG. 6 is same as the focus detecting point obtained in the step (127) in FIGS. 7A and 7B.

Stated differently, there is discriminated whether the focus detecting point corresponding to the watching point of the photographer in the finder viewing field is same as the focus detecting point which is selected according to the focus detecting calculations of the sensors and at which the main object is assumed to be present. If said focus detecting points are judged same or different, the sequence respectively proceeds to a step (412) or (408).

The step (408) discriminates whether the reliability of the image signal is sufficiently high, according to the focus detecting calculation of the focus detecting point corresponding to the watching point of the photographer in the finder viewing field. The reliability value indicates the level of coincidence of the two images on the paired sensor arrays in said sensor SNS, and, in the present invention, becomes smaller as the reliability increases.

If the step (408) identifies that the reliability is sufficiently high or not (including a situation where the focus detection is impossible), the sequence respectively proceeds to a step (412) or (409).

The step (409), based on the focus detecting calculation of the focus detecting point obtained in the step (127), namely the point which is selected according to the focus detecting calculations of the sensor and at which the main object is assumed to be present, discriminates whether the reliability of the image signal is sufficient high, and, if not, the sequence proceeds to a step (412). On the other hand, the reliability is judged sufficiently high, the sequence proceeds to a step (410).

The step (410) discriminates whether this situation has consecutively been generated twice or more, and the sequence proceeds to the step (412) or a step (411) respectively if the result is negative or affirmative.

The step (411) selects the focus detecting point obtained by the step (127), namely the point which is selected according to the focus detecting calculations of the sensors and at which the main object is assumed to be present.

Then a step (413) sets the defocus amount at the focus detecting point selected in the control sequence starting from the step (401) as the selected defocus amount which is used for actual drive of the focusing lens. After said step (413), a step (414) terminates the area selection subroutine.

In the following there will be explained the control sequence starting from the step (450), to be executed when the step (402) identifies that the AF mode of the camera is one-shot mode, with reference to a flow chart shown in FIG. 13.

The step (450) discriminates whether the flag FPLOCK is "1". If it is "1", indicating that the focus detecting point has already been selected by the area selecting operation in the one-shot mode, the sequence proceeds to a step (455).

The step (455) again selects the focus detecting point obtained in the sight line detection executed in the first AF control after the switch SW1 is turned on, and the sequence proceeds to a step (413). If the step (450) identifies that the flag FPLOCK="0", indicating the first area selecting operation in the one-shot mode, the sequence proceeds to a step (451).

The step (451) discriminates whether the sight line detection executed in the step (015) in FIG. 5 has been successful, and, if not, the sequence proceeds to a step (454).

The step (454) selects the focus detecting point obtained in the step (127) in FIGS. 7A and 7B, namely the point which is selected according to the focus detecting calculations for the sensors and at which the main object is assumed to be present, and the sequence proceeds to a step (453). On the other hand, if the step (451) identifies successful sight line detection, the sequence proceeds to a step (452).

The step (452) selects the focus detecting point obtained in the step (209), namely the point corresponding to the watching point of the photographer in the finder viewing field.

Then the step (453) sets the flag FPLOCK at "1", indicating that the focus detecting point has already been selected in the area selecting operation in the one-shot mode, and the sequence proceeds to a step (413).

Figure 14:
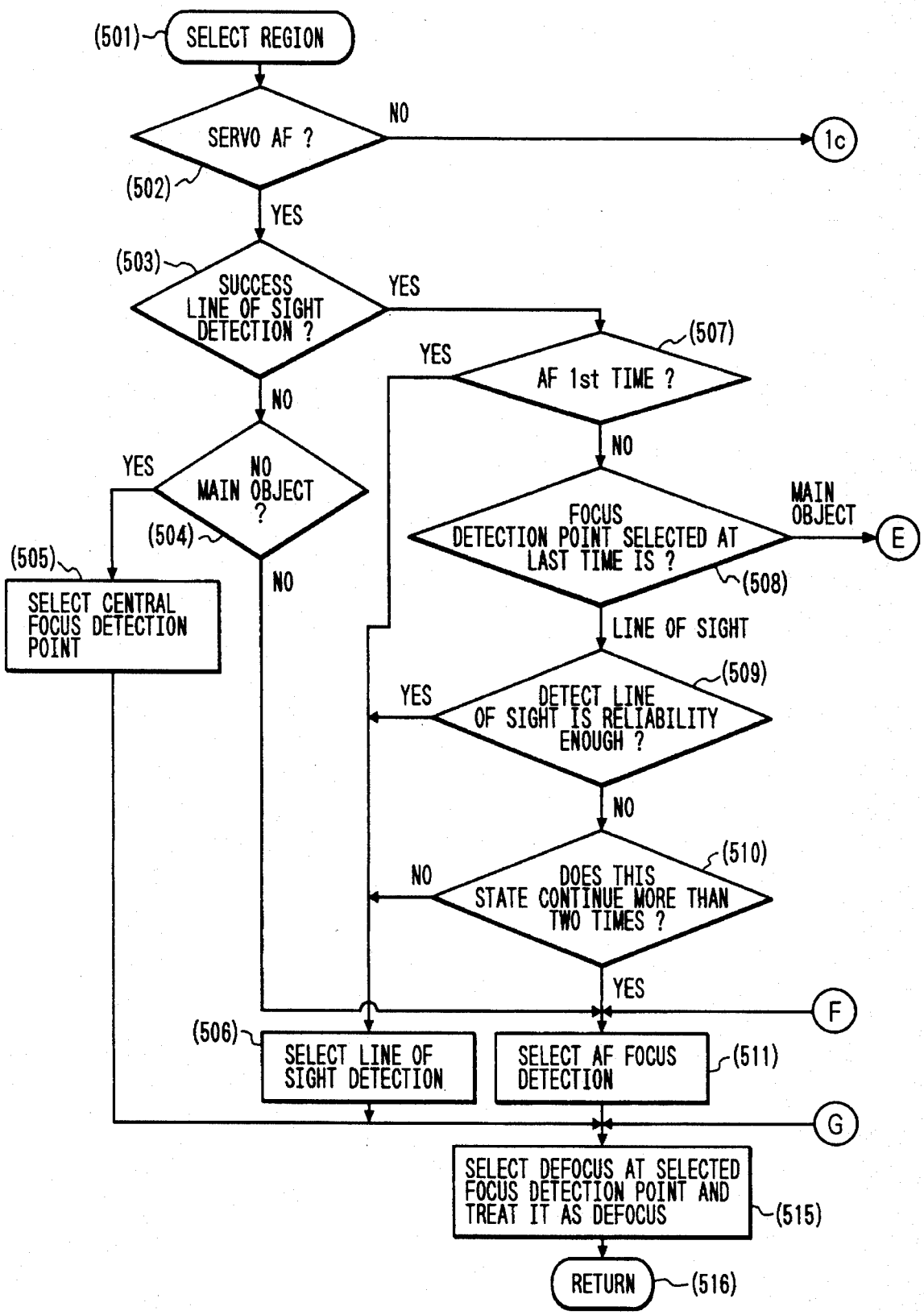
FIGS. 14 to 16 are flow charts of an area selecting subroutine in an embodiment 3 of the present invention.
Figure 15:
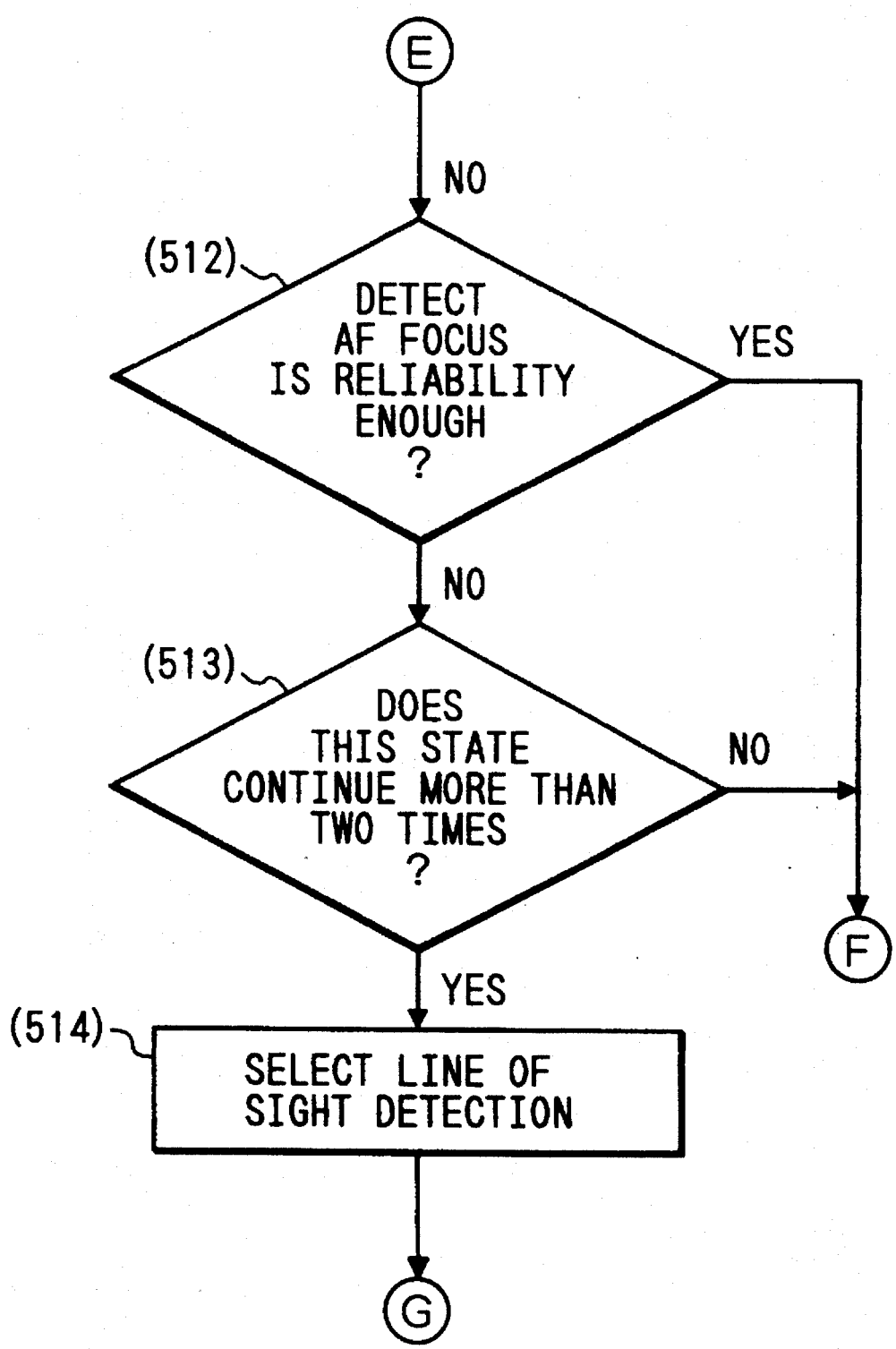
Figure 16:
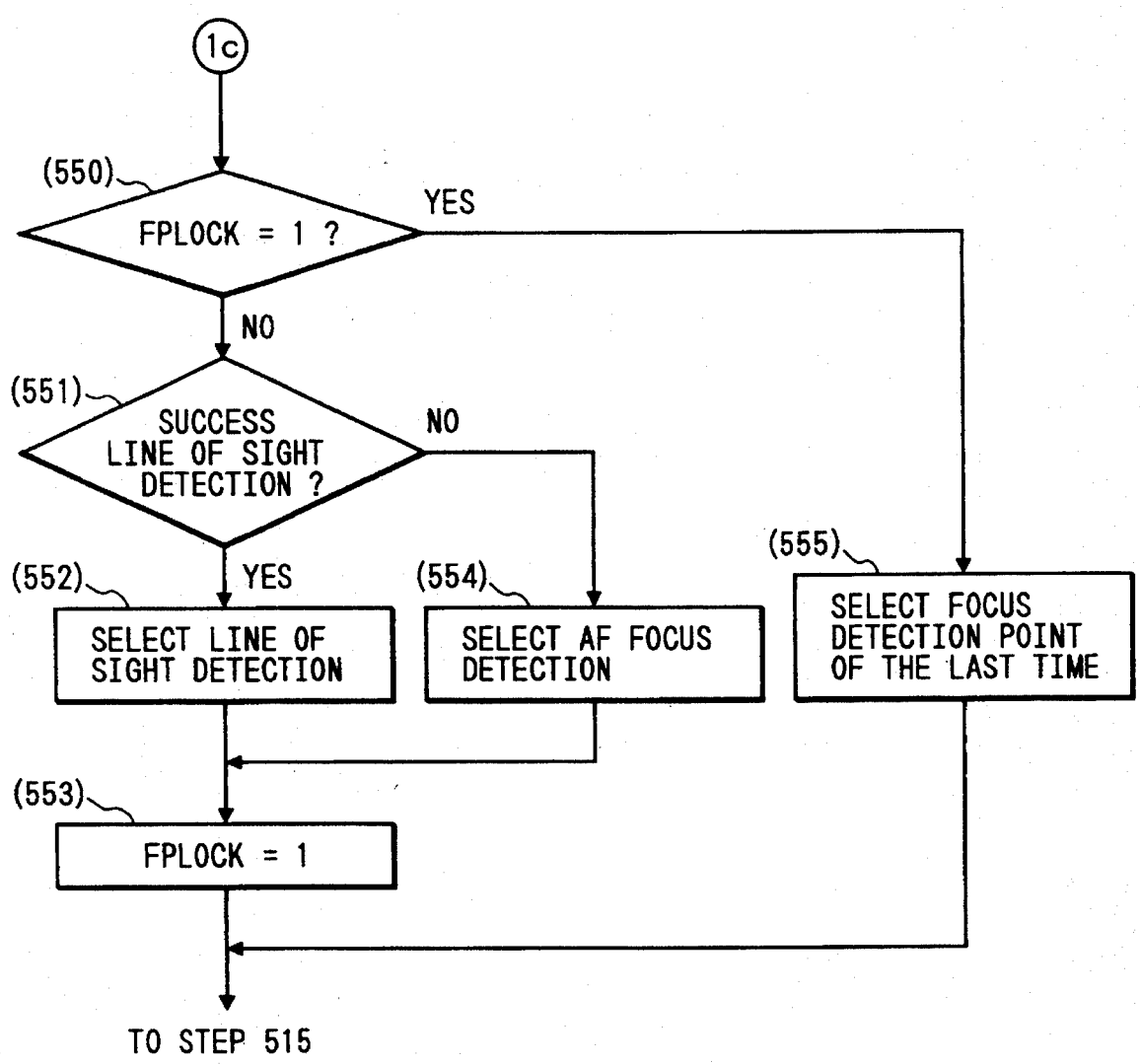

FIGS. 14 to 16 are flow charts of an "area selection" subroutine for selecting the focus detecting area, in an embodiment 3 of the present invention.

This embodiment is different from the foregoing embodiments 1 and 2 in that the selecting means equally selects the focus detecting point based on the focus detecting calculations and that obtained by the sight line detection, but is same as the foregoing embodiments in other aspects.

For this reason there will only be explained the "area selection" subroutine shown in FIGS. 14 to 16.

FIGS. 14 to 16 show the area selection subroutine of the embodiment 3, to be executed in the step (017) shown in FIG. 5. When this subroutine is called, the area selecting operation is executed, starting from a step (501).

At first a step (502) discriminates whether the AF mode of the camera is the servo mode, and, if not, the sequence proceeds to a step (550) shown in FIG. 16. The control in this case will be explained later.

Then a step (503) discriminates whether the sight line detection in the step (015) in FIG. 5 has been successful, and, if not, the sequence proceeds to a step (504).

The step (504) discriminates whether there exists a focus detecting point which is selected according to the focus detecting calculations for the sensors in the step (127) shown in FIGS. 7A and 7B and at which the main object is assumed to be present, namely whether the focus detection is impossible in all the sensors. If the main object is judged absent, the sequence proceeds to a step (505).

The step (505) selects the central focus detecting point, since the main object is not present. On the other hand, if the step (504) identifies the presence of the main object, the sequence proceeds to a step (511). The control sequence after the step (511) will be explained later.

If the step (503) identifies that the sight line detection has been successful, the sequence proceeds to a step (507).

The step (507) discriminates whether the current operation is the first AF control after the switch SW1 is turned on, and, if so, the sequence proceeds to a step (506).

The step (506) selects the focus detecting point obtained in the step (209) in FIG. 6, namely the point corresponding to the watching point of the photographer in the finder viewing field. On the other hand, if the step (507) identifies that the current operation is not the first AF control, the sequence proceeds to a step (508).

The step (508) discriminates whether the focus detecting point, selected in the previously executed "area selection" subroutine, was obtained by the sight line detection or by the focus detecting calculations. In case of the former, the sequence proceeds to a step (509).

The step (509) discriminates, based on the focus detecting calculation on the focus detecting point obtained by the sight line detection, whether the image signal is sufficiently reliable. The reliability value of the image signal indicates the level of coincidence of two images on the paired sensor arrays of the sensor SNS, and becomes smaller in the present invention as the reliability becomes higher.

If the step (509) identifies that the reliability is sufficiently high or not, the sequence respectively proceeds to a step (506) or (510).

The step (510) discriminates whether the current situation has consecutively been generated twice or more, if so generated or not, the sequence respectively proceeds to a step (511) or (506).

The step (511) selects the focus detecting point obtained in the step (127) in FIGS. 7A and 7B, namely the point which is selected according to the focus detecting calculations for the sensors and at which the main object is assumed to be present, and the sequence then proceeds to a step (515).

The step (515) sets the defocus amount of the focus detecting point, selected by the control sequence starting from the step (501), as the selected defocus amount to be employed for actual drive of the focusing lens. After the execution of the step (515), a step (516) terminates the "area selection" subroutine.

When the step (508) identifies that the focus detecting point, selected in the previously executed "area selection" subroutine was obtained by the focus detecting calculation, the sequence proceeds to a step (512).

The step (512) discriminates whether the image signal of the focus detecting point obtained from the focus detecting calculation is sufficiently reliable, and, if the reliability is sufficiently high or not, the sequence respectively proceeds to a step (511) or (513).

The step (513) discriminates whether the current situation has consecutively been generated twice or more, and, if generated or not, the sequence respectively proceeds to a step (514) or (511).

The step (514) selects the focus detecting point obtained in the step (209) in FIG. 6, corresponding to the watching point of the photographer in the finder viewing field, and the sequence then proceeds to a step (515).

In the following there will be explained the control sequence starting from the step (550) in FIG. 16, to be executed when the step (502) identifies that the AF mode of the camera is the one-shot mode.

The step (550) discriminates whether the flag FPLOCK is "1". If FPLOCK=1, indicating that the focus detecting point has already been selected by the area selecting operation in the one-shot mode, the sequence proceeds to a step (555).

The step (555) again selects the focus detecting point selected previously, in the sight line detection executed in the first AF control after the switch SW1 is turned on, and the sequence proceeds to a step (515). If the step (550) identifies that FPLOCK=1, indicating the first area selecting operation in the one-shot mode, the sequence proceeds to a step (551).

The step (551) discriminates whether the sight line detection in the step (015) in FIG. 5 has been successful, and, if not, the sequence proceeds to a step (554).

The step (554) selects the focus detecting point obtained in the step (127) in FIGS. 7A and 7B, namely the point which is selected according to the focus detecting calculations for the sensors and at which the main object is assumed to be present, and the sequence then proceeds to a step (553). On the other hand, if the step (551) identifies successful sight line detection, the sequence proceeds to a step (552).

The step (552) selects the focus detecting point obtained in the step (209) in FIG. 6, corresponding to the watching point of the photographer in the finder viewing field.

Then the step (553) sets the flag FPLOCK at "1", indicating that the focus detecting point has already been selected in the area selecting operation in the one-shot mode, and the sequence then proceeds to a step (515).

The foregoing embodiments provide a camera equipped with sight line detecting means and focus detecting means capable of stable and satisfactory focus detection even in a situation of repeating the focus detecting operations as in the case of servo operation, by suitably selecting a focus detecting point utilizing the signal from the sight line judging means for judging the state of the sight line signal obtained by the sight line detecting means and the signal from the focus judging means for judging the state of the focus signal obtained by the focus detecting means.

In particular, there is provided a camera equipped with the focus detecting means and the sight line detecting means, further comprising selection means which, in the focusing operation of the phototaking system utilizing the signals from the sight line detecting means and from the focus detecting means, selects either of said signal even when the line of sight is momentarily deviated from the main object or when the precision of the detection of the line of sight is not too good, thereby preventing an erroneous focusing operation to an object other than the main one, leading to an unexpected lens drive or poorly responsive focus detecting operation.

Figure 17:
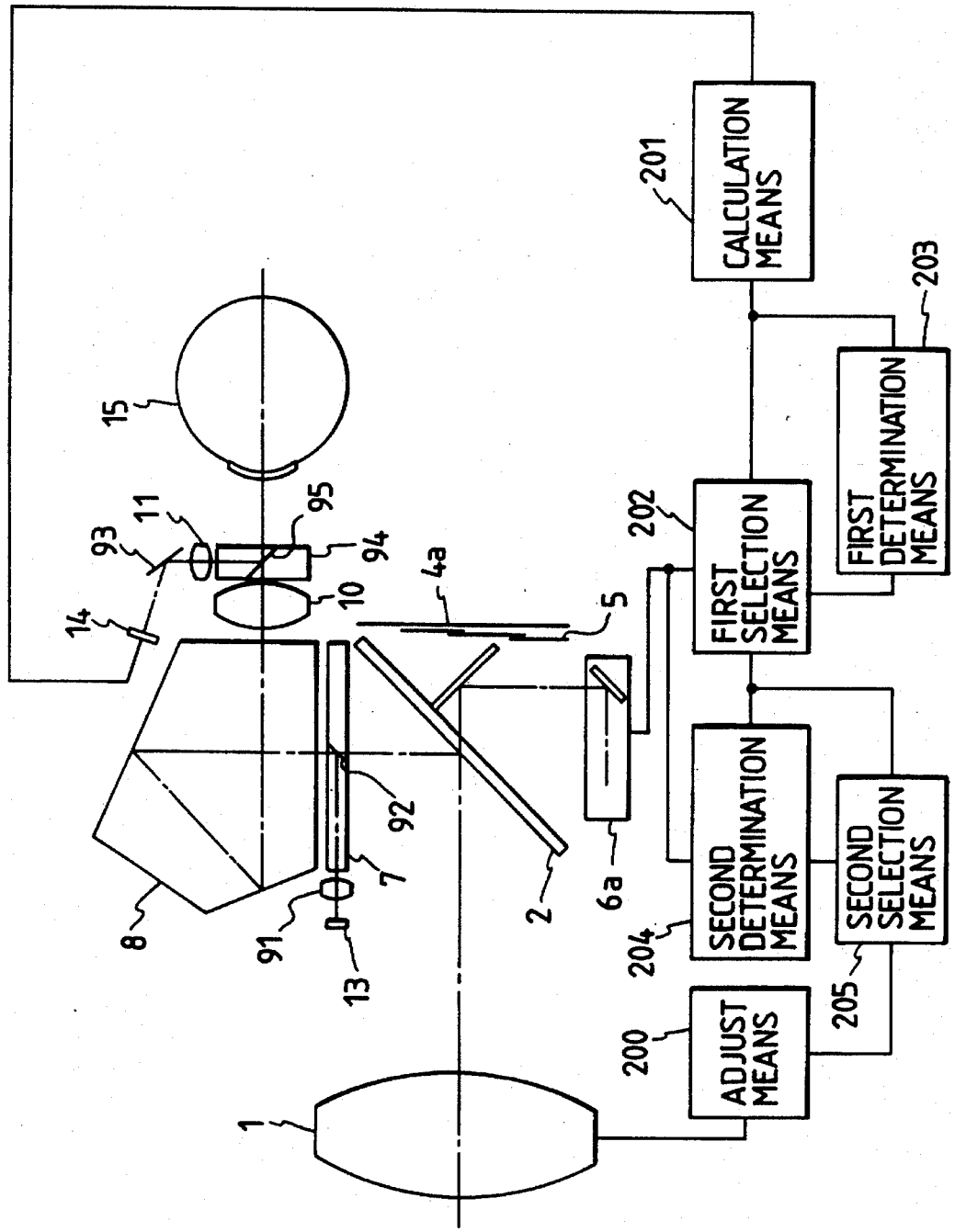
FIG. 17 is a partial schematic view of an embodiment 1 of the present invention, applied to a single lens reflex camera.
Figure 18:
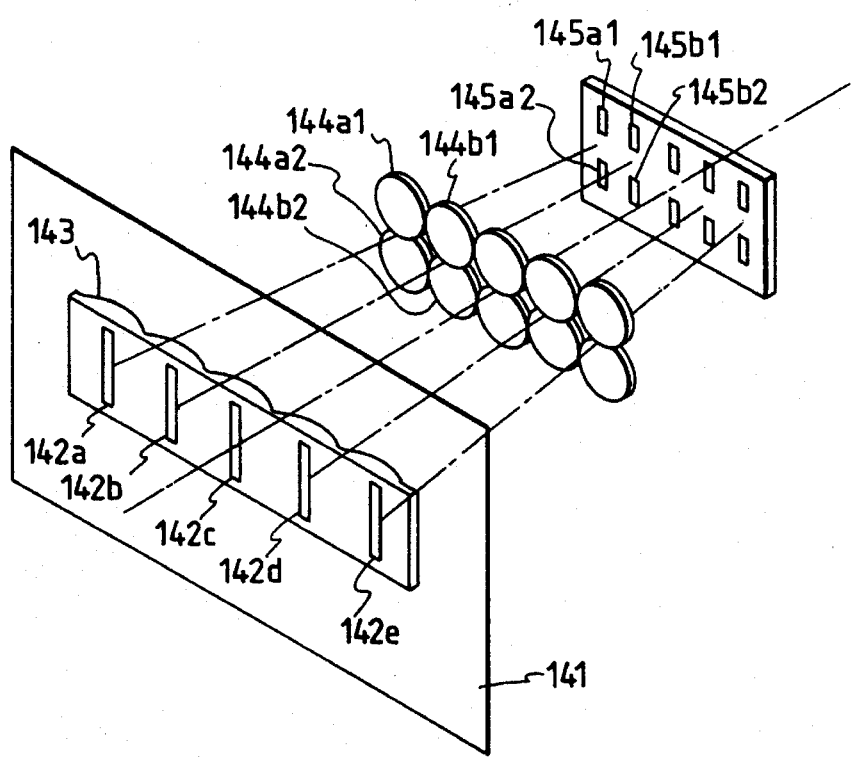
FIGS. 18 and 19 are schematic views of parts of FIG. 17.
Figure 19:
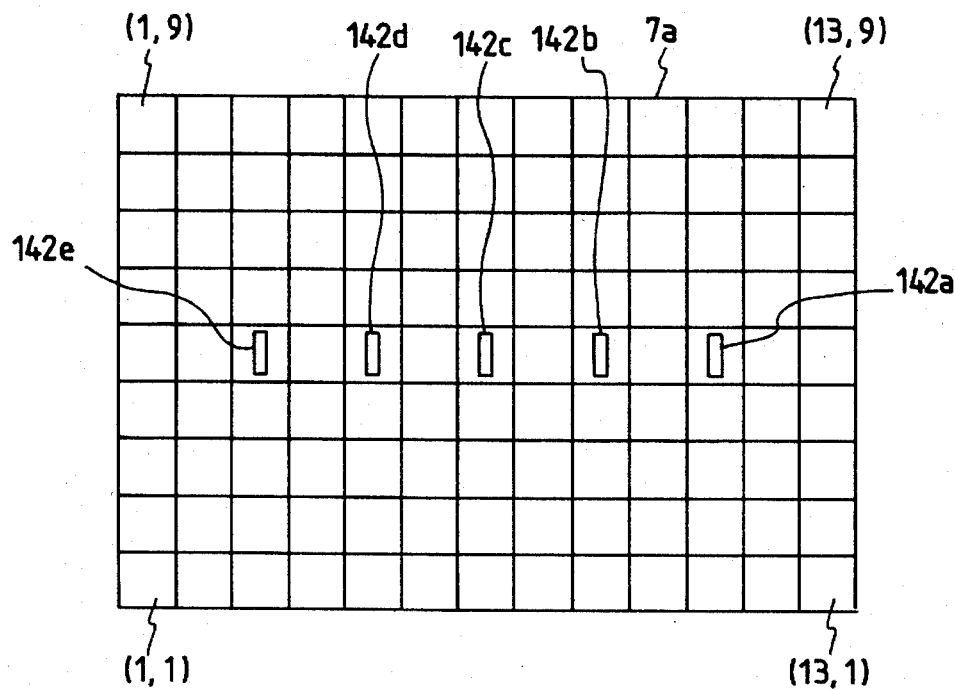

FIG. 17 is a partial schematic view of an embodiment 4 of the present invention applied to a single lens reflex camera, and FIGS. 18 and 19 are partial schematic views of FIG. 17. In the following description, the components or configurations same as those in FIG. 1 will not be explained further.

Calculation means 201 serves to determine the direction of the line of sight of the eyeball 15 of the photographer, utilizing signals from photosensor arrays 14, and to determine the direction and point of watching in the viewing field of the view finder.

The method of detecting the line of sight in the present invention will not be explained further, as it is already described in the U.S. patent application Ser. No. 003,954. of the present applicant and as it is not the feature of the present invention.

In the present embodiment, the aforementioned components 10, 11, 13, 14, 91, 94 and 201 constitute a part of the sight line detecting means.

First selection means 202 selects, based on a signal relating to the direction of the line of sight determined in the calculation means 201 constituting a part of the sight line detection means, at least one of plural focus detection signals supplied from the focus detection means 6a and corresponding to plural focus detecting areas.

First determination means 203 determines the positional relationship between the watching point of the photographer and the focus detecting area, for example whether said watching point of the photographer is in the focus detecting area or in a position adjacent thereto.

Second determination means 204 determines the state of the focus detection signal selected by the first selection means 202. Second selection means 205 selects one of the focus detection signals selected by the first selection means 202, based on a signal from the second determination means 204.

Adjustment means 206 adjusts the focus state by driving a focusing unit (not shown) of the phototaking system 1, based on the focus detection signal from the second selection means 205.

The focus detecting method of the focus detection means 6a of the present embodiment will only briefly be explained in relation to FIG. 18, since it is not the feature of the present invention but is based on the known technology.

Referring to FIG. 18, an image frame 14 positioned close to the estimated focal plane is provided with five focus detecting fields 142a to 142e, each of which is associated with a known focus detecting system. For example, in the focus detecting field 142a at the left-hand end, an imaging light beam passing a rectangular aperture of a field mask is deflected by a lens at the left-hand end of an integrally molded composite field lens 143, and enters a pair of secondary imaging lenses 144a1, 144a2.

In front of said secondary imaging lenses 144a1, 144a2, there is provided an unrepresented diaphragm. The light beam passing through said secondary imaging lens 144a1 forms the image of the field 142a on a photosensor array 145a1.

On the other hand, the light beam passing the secondary imaging lens 144a2 forms the image of the field 142a on a photosensor array 145a2. Since the above-mentioned unrepresented diaphragm in the vicinity of the secondary imaging lens is imaged approximately at the exit pupil of the phototaking lens, through the field lens, the above-explained optical system constitutes a so-called divided-pupil focus detecting device. Five units of such devices are positioned in parallel manner, and components are mutually integrated where such integration is possible.

The concept of such focus detecting device is already known, and the device shown in FIG. 18 is composed of parallel arrangement of such known technology. Also the method of calculating and judging the defocus amount of the phototaking lens 1 from the output signals of the photosensor arrays relies on a known technology.

The signals from the photosensor arrays are usually released serially, and are supplied to the A/D conversion port of the microcomputer. The microcomputer in the camera effects A/D conversion on said serial signals in succession at suitable timings, and stores the obtained data in a memory. After the completion of the serial signal readout, the defocus amount of the photo-taking lens 1 is detected by calculating the similarity of the light intensity distributions of the two images, formed by the paired secondary imaging lenses.

Figure 20:
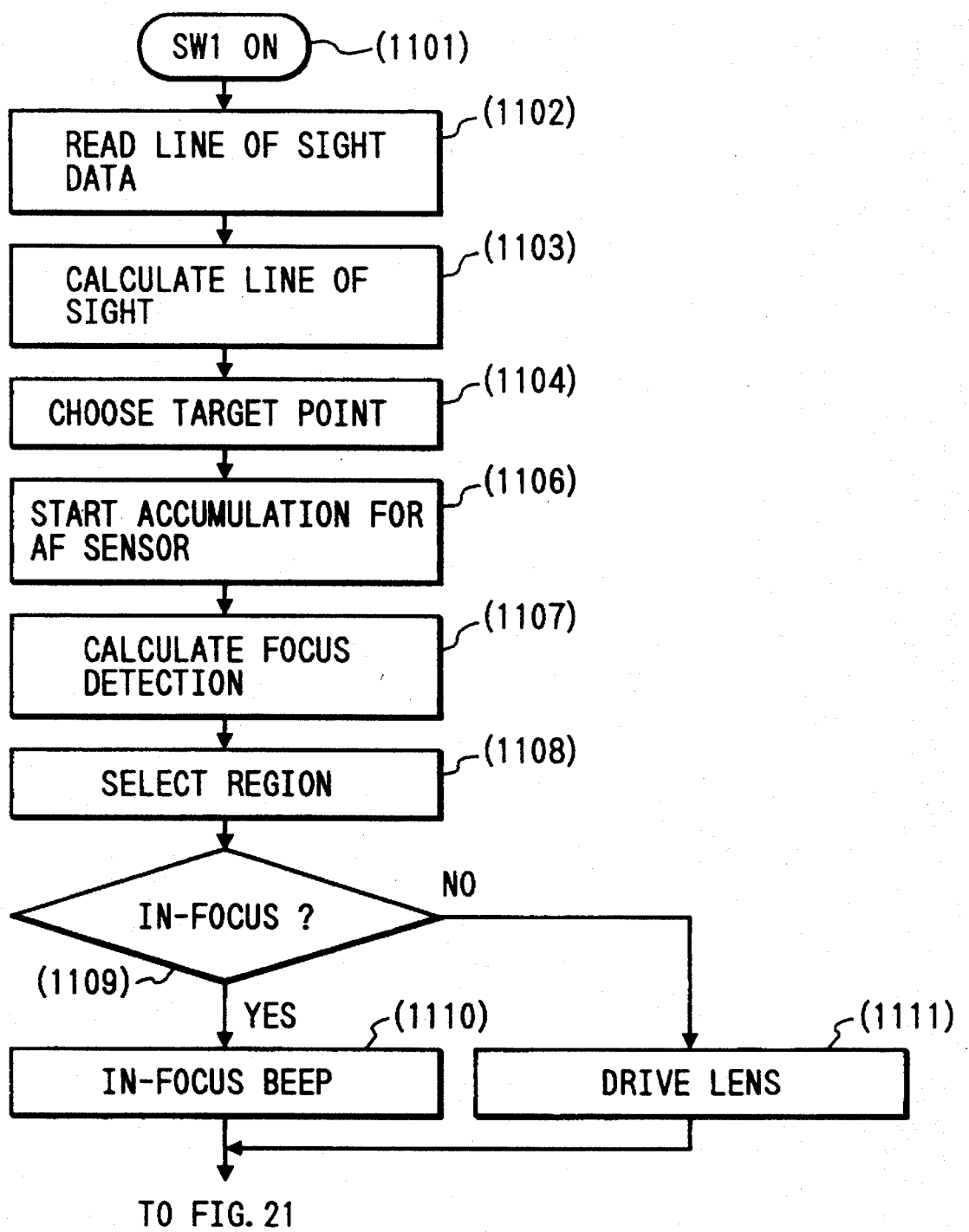
FIGS. 20 and 21 are flow charts of an embodiment 4 of the present invention.

In the following there will be explained the function of the embodiment 4 shown in FIG. 17, with reference to a flow chart shown in FIG. 20.

At first a step (1101) detects the switch status, and, upon detecting the first-stroke depression of the shutter release button, the sequence proceeds to a step (1102).

The step (1102) causes the light source 13 to emit the infrared light for detecting the direction of the line of sight, thereby accumulating signals in the photosensor array 14, and reads the sight line data, or the eyeball image signal accumulated in the photosensors 14.

A next step (1103) calculates the direction of the line of sight of the photographer, based on the sight line data obtained in said step (1102).

A next step (1104) extracts the point watched by the photographer, according to a predetermined calculation, based on the direction of the line of sight obtained in the step (1103). Said watching point is represented by the coordinates in the viewing field of the view finder.

In the following there will be explained the positional relationship between the watching point of the photographer, detected by the sight line detecting means, and the focus detecting field detected by the focus detecting means.

As shown in FIG. 19, an image area corresponding to the finder viewing field 7a is divided into a certain number of small areas, and the focus detecting field is positioned at the center of a specified small area. For example, in the example shown in FIG. 19, the image field is divided into a plurality of small fields arranged by 13 and 9 respectively in the horizontal and vertical directions, and each small field is given a coordinate, such as (1, 1) at the lower left corner, (13, 1) at the lower right corner, (1, 9) at the upper left corner and (13, 9) at the upper right corner.

In FIG. 19 there are provided focus detecting areas 142a, 142b, 142c, 142d and 142e. If the watching point of the photographer is present in a field containing a focus detecting area, the main object is assumed to be present in said field and the focus detecting area at the center of said field is extracted. Thus the focus detection signal at said focus detecting area is utilized.

On the other hand, if the watching point of the photographer is present in a field not containing the focus detecting area, the focus detecting area is selected according to a procedure to be explained later, and the focus detection signal at thus selected focus detecting area is utilized.

Succeeding steps (1106) and (1107) execute the signal accumulation of the AF photosensor, signal readout, correlation calculation and defocus calculation for all the focus detection areas, thereby detecting the focus state. In this multi-point focus detecting system, the defocus amount of each focus detecting area is calculated by a known technology. These steps also obtain information whether the focus detection is possible or not, based on the results of focus detection of the focus detecting areas.

A next step (1108) executes an "area selection" subroutine, for selecting the focus detecting area to be actually employed, based on the focus detection signals obtained in the step (1107) and the signal of the watching point obtained in the step (1104).

Figure 21:
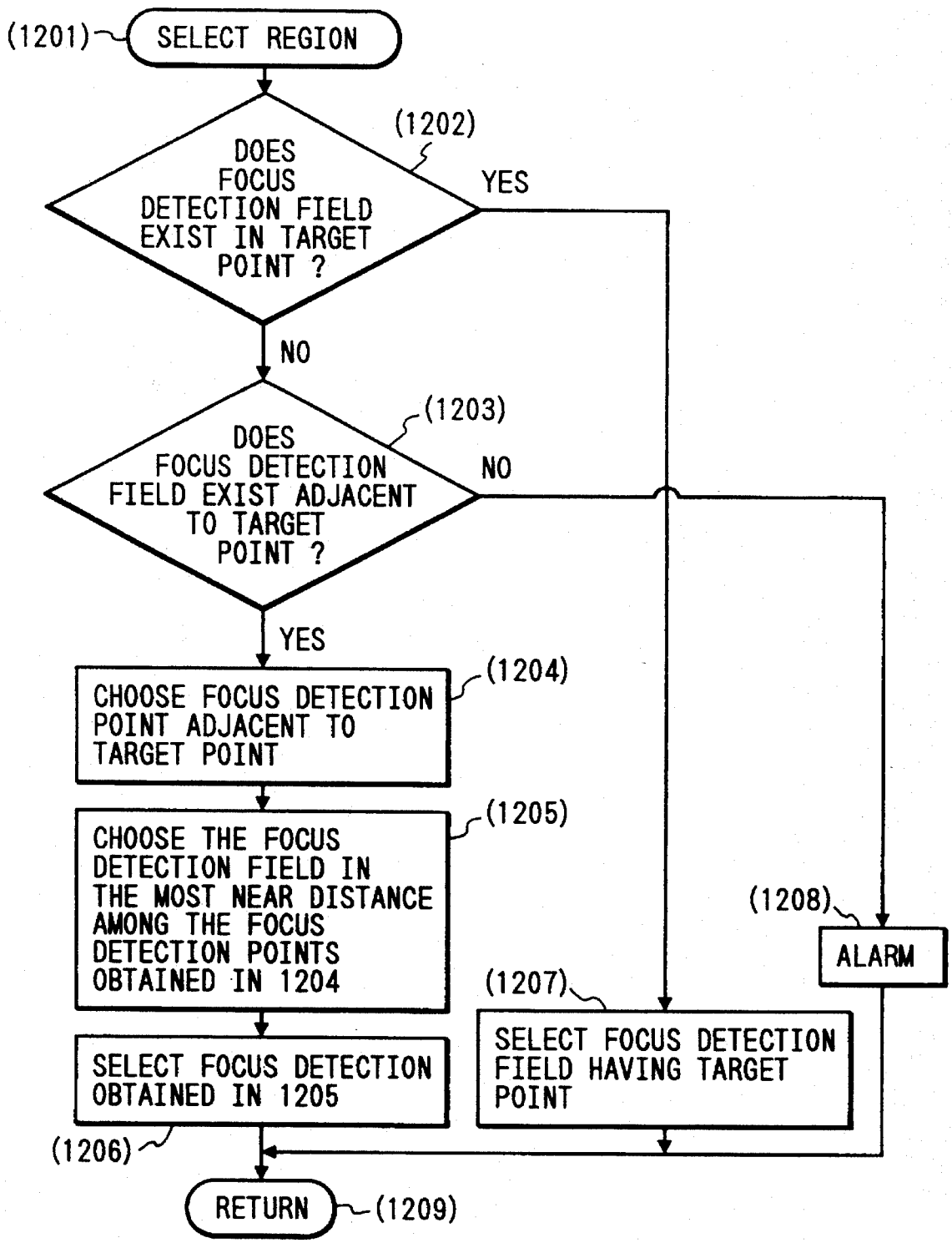

The flow chart of the area selection subroutine is shown in FIG. 21. A next step (1109) discriminates whether the in-focus state is reached, based on the focus detection signal of the focus detecting area, obtained in the step (1108). If the in-focus state is reached, a step (1110) generates an in-focus signal, and the sequence proceeds to an unrepresented succeeding sequence. If not, a step (1111) drives the focusing lens of the phototaking system 1, and the sequence proceeds to an unrepresented succeeding sequence.

In the following there will be explained the "area selection" subroutine shown in FIG. 21, to be executed in the step (1108). When said subroutined is called, the sequence proceeds to a step (1201) and there is executed the area selecting operation starting from a step (1202).

At first a step (1202) discriminates whether the watching point of the photographer, obtained in the step (1104) is in a field containing a focus detecting area, and, if the focus detecting area is present or absent, the sequence proceeds respectively to a step (1207) or (1203).

The step (1203) discriminates whether the watching point of the photographer, obtained in the step (1104) is adjacent to a field containing a focus detecting area, and, if so or not, the sequence respectively proceeds to a step (1204) or (1208).

Thus the steps (1202) and (1203) determine whether the watching point of the photographer is present in a field corresponding to or adjacent to the focus detecting area, thus constituting the first determination means.

The step (1204) selects all the focus detecting areas adjacent to the watching point of the photographer. For example, if the watching point is present between two focus detecting areas, this operation extracts all the focus detecting areas that may have been selected by the photographer, thus constituting the first selection means.

A next step (1205) selects, among the focus detecting areas selected in the step (1204), where the focus detection is possible, an area of the shortest object distance. Such area of the shortest object distance is selected because the main object is often positioned closest to the camera. This operation estimates, among the focus detecting areas that may have been selected by the photographer, a focus detecting area actually intended by the photographer (second determination means and second selection means).

A succeeding step (1206) selects the focus detecting area extracted in the step (1205) (second selection means).

A step (1207) selects the focus detecting area where the watching point is present (first selection means).

A step (1208) judges that the watching point of the photographer is present outside the focus detecting area and provides the photographer with a warning display.

Then a step (1209) terminates the area selection subroutine.

In the embodiment explained above, the first selection means selects a focus detecting area if the watching point of the photographer is present therein, or, if said watching point is present close to a focus detecting area or areas, selects such focus detecting area or areas adjacent to said watching point, and the second selection means selects a focus detecting area of the shortest object distance among such focus detecting areas.

Then, based on the focus detection signal of said focus detecting area, the focusing operation is achieved by driving the focusing lens of the phototaking system 1 through the adjustment means 206.

In the following there will be explained an embodiment 5 of the present invention, which is different from the embodiment 4 in a part of the area selection subroutine but is same as the embodiment 4 in other parts.

Figure 22:
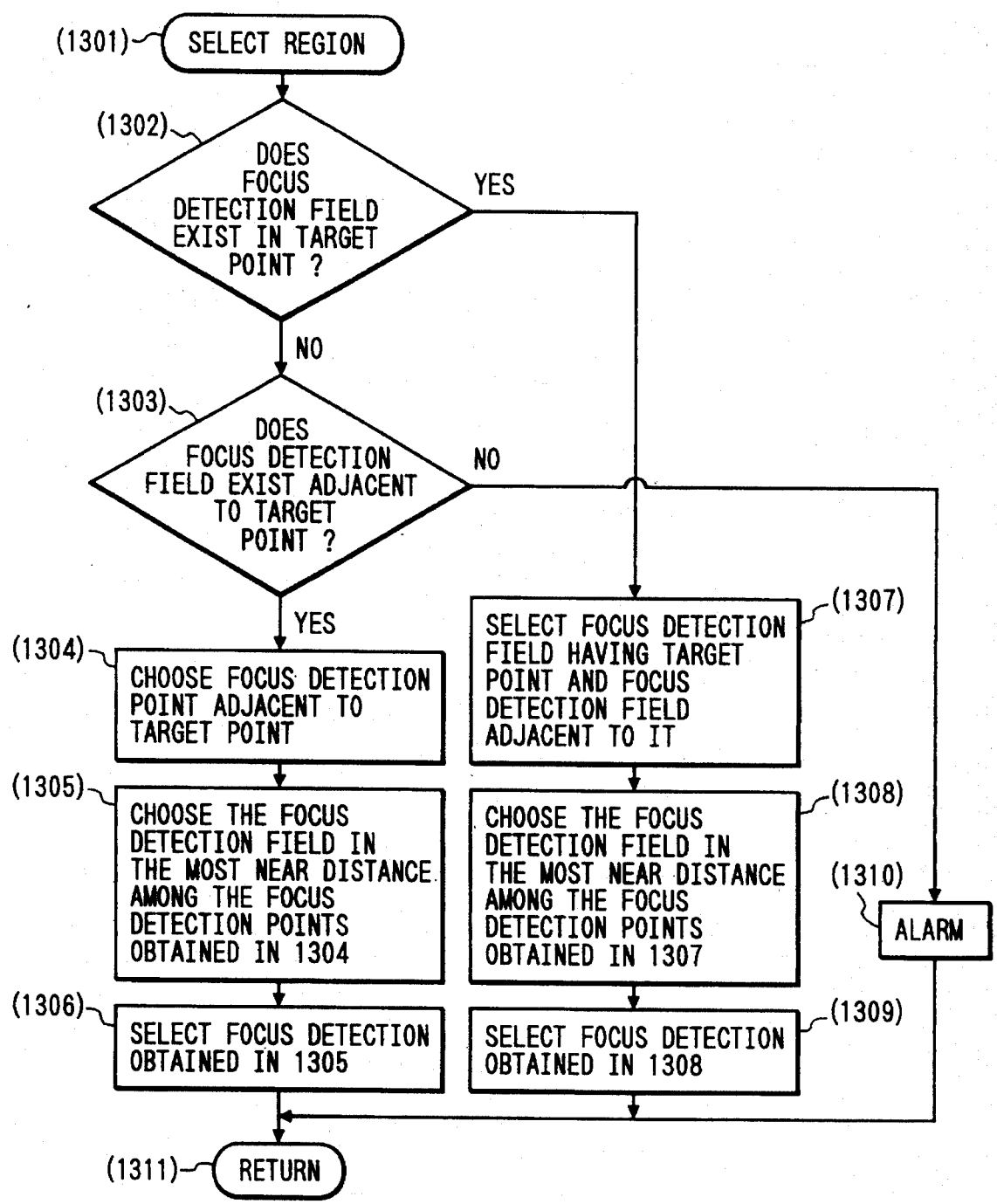
FIG. 22 is a flow chart of an embodiment 5 of the present invention.

In the embodiment 5, the adjacent focus detecting areas are also selected even if the watching point of the photographer is present at a focus detecting area, and the area of the shortest object distance is selected among such selected areas. The area selection subroutine of this embodiment 5 is shown in FIG. 22, and is to be of the step (1108) in FIG. 20. When this subroutine is called, there is executed the area selecting operation starting from a step (1301).

At first a step (1302) discriminates whether the watching point of the photographer, obtained in the step (1104), is in a field where a focus detecting area is present, and, if present or not, the sequence respectively proceeds to a step (1307) or (1303).

The step (1303) discriminates whether the watching point of the photographer, obtained in the step (1104), is adjacent to a field where a focus detecting area is present, and, if so or not, the sequence proceeds respectively to a step (1304) or (1310).

Thus the steps (1302) and (1303) judge the positional relationship whether the watching point of the photographer is in a field corresponding or adjacent to a focus detecting area (first determination means).

The step (1304) selects all the focus detecting areas adjacent to the watching point of the photographer. For example, if said watching point is positioned between two focus detecting areas, this operation extracts all the focus detecting areas that may have been selected by the photographer (first selection means).

A succeeding step (1305) selects, among the focus detecting areas selected in the step (1304) where the focus detection is possible, the area of the shortest object distance. Such area of the shortest object distance is selected because the main object is often positioned closest to the camera (second determination means and second selection means). Thus, this operation estimates the focus detecting areas actually intended by the photographer, among those that may have been selected by the photographer.

A succeeding step (1306) adopts the focus detecting area selected in the step (1305) (second selection means).

A step (1307) selects the focus detecting area where the watching point of the photographer is present and all the focus detecting areas adjacent thereto (first selection area).

A step (1308) selects, among the focus detecting areas selected in the step (1307) and where the focus detection is possible, the focus detecting area of the shortest object distance (second determination means and second selection means).

A succeeding step (1309) adopts the focus detecting area selected in said step (1308) (second selection means).

A step (1310) judges that the watching point of the photographer is present outside the focus detecting area and provides the photographer with a warning display. Then a step (1311) terminates the area selection subroutine.

In the present embodiment, as explained in the foregoing, the focusing operation of the phototaking system 1 is achieved, utilizing the focus signal based on the focus detection area corresponding to the selected watching point.

The foregoing 4th and 5th embodiments provide a camera provided with sight line detecting means and focus detecting means capable of achieving focus detection by selecting a suitable focus detection area, even in case the watching point of the photographer in the finder viewing field coincides with plural focus detecting areas or in case said watching point is positioned outside such focus detecting areas, through adequate judgement of the positional relationship between the watching point of the photographer in the finder viewing field, detected by said sight line detection means and the plural focus detecting areas of the focus detection means.

In the following there will be explained an embodiment 6 of the present invention. In the camera of said embodiment 6, the focus detecting system is same as that shown in FIG. 2 and will not, therefore, be explained further.

Figure 23:
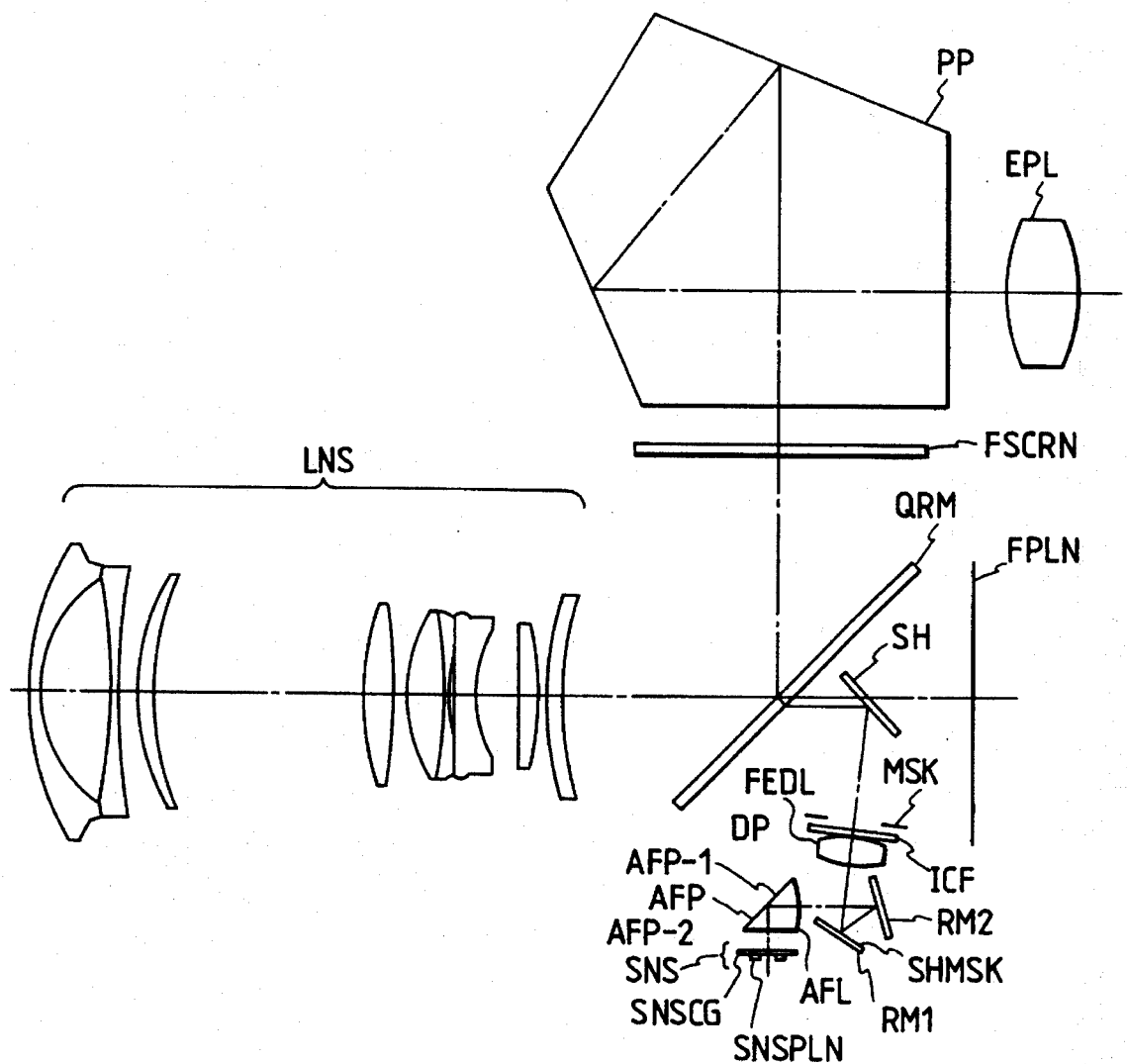
FIG. 23 is a view of the optical arrangement of a camera provided with a focusing optical system.

FIG. 23 shows the optical arrangement of a camera provided with a focus detecting device having the focus detecting system shown in FIG. 2.

Referring to FIG. 23, there are shown a zooming phototaking lens LNS; a quick-return mirror QRM; a focusing screen FSCRN; a pentagonal prism PP; an eyepiece lens EPL; a film plane FPLN; a sub mirror SM; a field mask MSK; an infrared cutting filter ICF; a field lens FLDL; first and second mirrors RM1, RM2; a shielding mask SHMSK; a diaphragm DP; a secondary field lens AFL; a prism member AFP having a reflecting plane AFP-1 and an exit face AFP-2; and a sensor SNS having a cover glass SNSCG and a light receiving plane SNSPLN.

The prism member AFP is provided with a reflecting plane AFP-1 having an evaporated reflective metal film such as of aluminum, and serves to reflect the light beam from the secondary imaging lens AFL toward the exit face AFP-2.

The circuit diagram, showing the specific configuration of the camera equipped with the focus detecting device of the embodiment 6 is same as that shown in FIG. 3, and is therefore omitted from the following description.

In the following there will be explained the function of the camera of the embodiment 6 equipped with the sight line detecting device and the focus detecting device, with reference to the attached flow charts.

Figure 24:
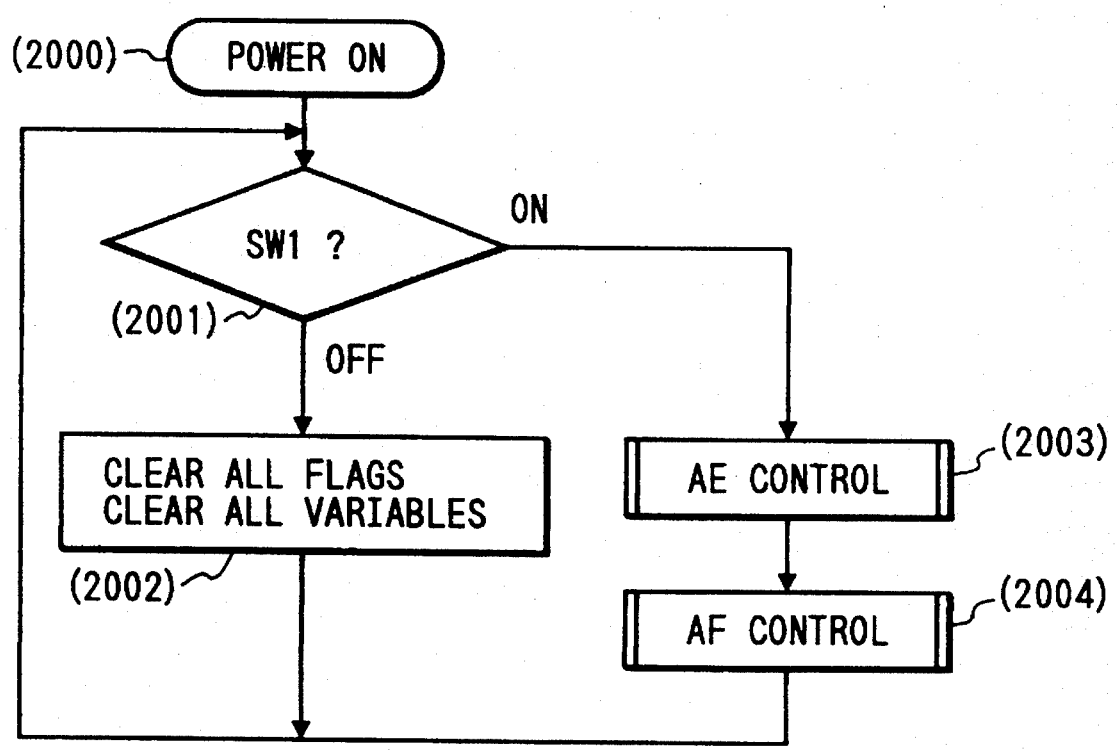
FIG. 24 is a flow chart of the operation sequence of a camera constituting an embodiment 6 of the present invention.

FIG. 24 is a schematic flow chart showing the control sequence of the entire camera.

When the circuits shown in FIG. 3 are powered, the microcomputer PRS starts execution from a step (2001).

[Step (2001)] detects the state of the switch SW1 to be turend on by the first-stroke depression of the unrepresented shutter release button, and, if it is on or off, the sequence proceeds respectively to a step (2003) or (2002);

[Step (2002)] initializes all the flags and variables;

[Step (2003)] executes an "AE control" subroutine for effecting light metering, state detection of various switches and display. This AE control will not be explained further as it is not directly related with the present invention. After said "AE control" subroutine, the sequence proceeds to a step (2004);

[Step (2004)] executes an "AF control" subroutine for effecting signal accumulation of the sensors, focus detecting calculation and lens drive, and also extracting the watching point of the photographer, as will be explained later in more details with reference to FIG. 25. After the execution of said "AF control" subroutine, the sequence returns to the step (2001), and the steps (2003) and (2004) are repeated until the power supply is turned off.

Figure 31:
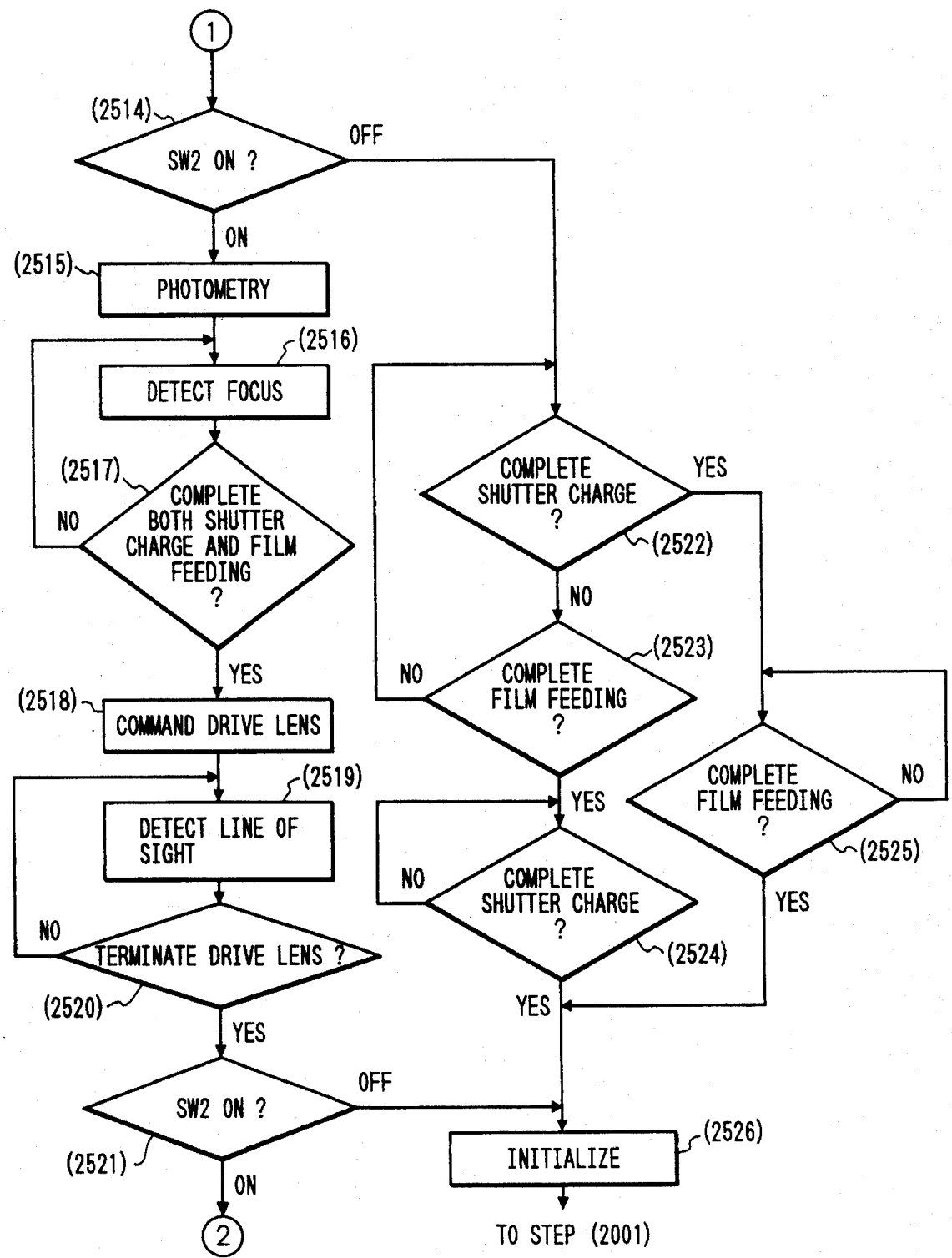
FIG. 31 is a flow chart in continuation of FIG. 30.

If the switch SW2 is turned on during the function of the microcomputer PRS after the power supply is started to the circuits shown in FIG. 3, there is initiated an interruption procedure to execute a shutter releasing operation to be explained later with reference to FIGS. 31 and 32.

Figure 25:
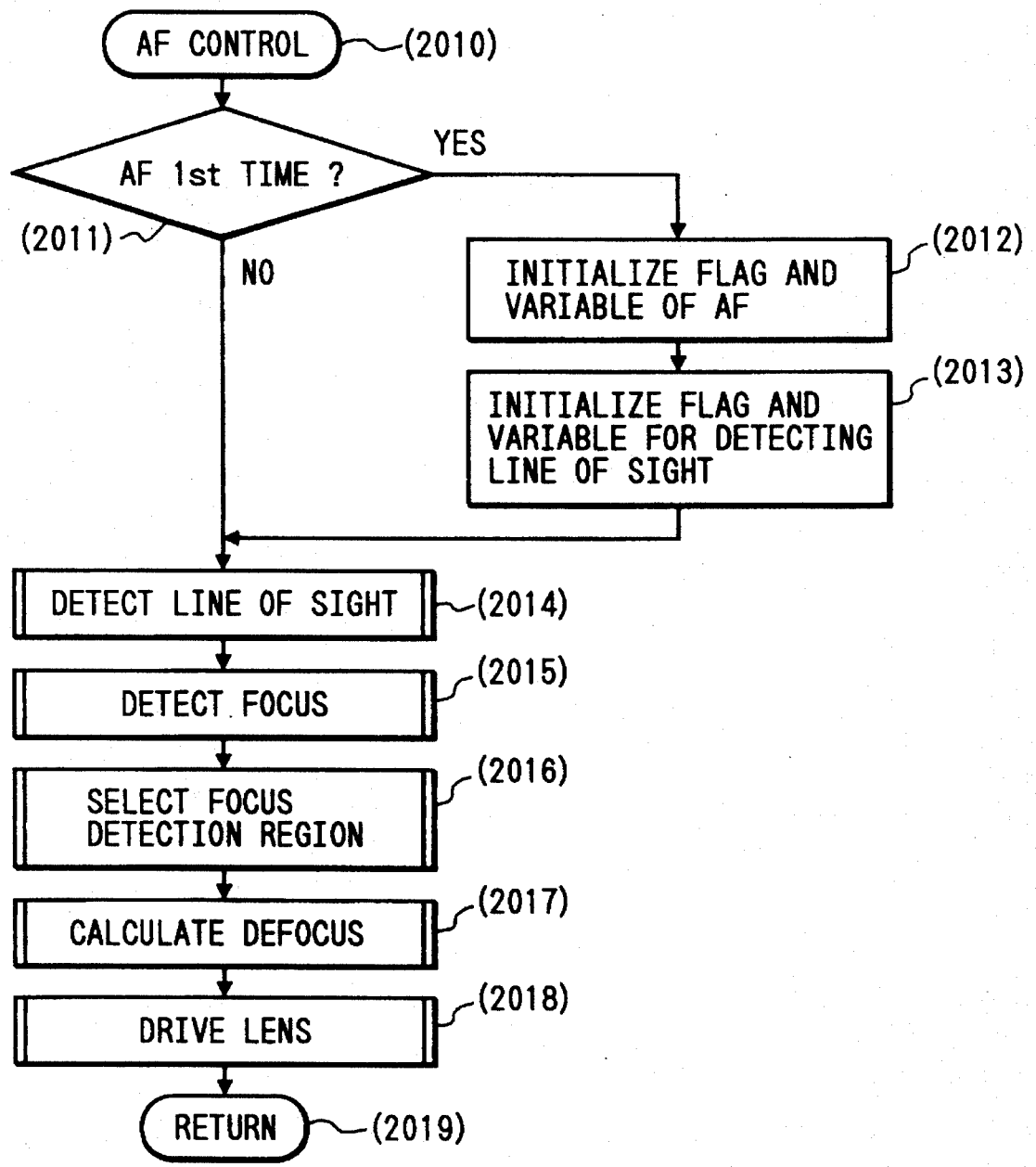
FIG. 25 is a flow chart of an AF subroutine in FIG. 24.

FIG. 25 is a flow chart of the "AF control" subroutine to be executed in the step (2004).

When this subroutine is called, the microcomputer PRS proceeds to a step (2010) and starts execution from a step (2011):

[Step (2011)] discriminates whether the current operation is the first AF control after the switch SW1 is turned on, and, if the first time or not, the sequence proceeds respectively to a step (2012) or (2014);

[Step (2012)] initializes the flags and variables for the AF control;

[Step (2013)] initializes the flags and variables for the detection of the line of sight;

[Step (2014)] executes a "sight line detection" subroutine, for effecting signal accumulation in the image sensor CCD, signal readout therefrom, extraction of the watching point and determination of the focus detecting point by the line of sight, in order to detect the line of sight, as will be explained later in more details with reference to FIG. 28;

[Step (2015)] executes a "focus detection" subroutine, for effecting signal accumulation in the paired sensors SNS-1a, SNS-1b; SNS-2a, SNS-2b; SNS-3a, SNS-3b; SNS-4a, SNS-4b, signal readout therefrom, focus detecting calculation and determination of a focus detecting point where the main object is assumed to be present, as will be explained later in more detail with reference to FIGS. 26A, 26B and 27;

[Step (2016)] executes a "focus detecting area selection" subroutine, for selecting the focus detecting point to be actually used, from the information on the focus detecting point obtained from the "focus detection" subroutine executed in the step (2015) and the information on the focus detecting point obtained from the "sight line detection" subroutine executed in the step (2014), as will be explained later in more detail in relation to FIG. 29;

[Step (2017)] calculates the defocus amount, from the focus detection information of the focus detecting point obtained in the step (2016);

[Step (2018)] executes a "lens drive" subroutine, for determining the actual drive amount of the lens from the defocus amount, and driving the lens if necessary.

After said lens drive, the sequence returns to the main routine from a step (2019).

Figure 26B:
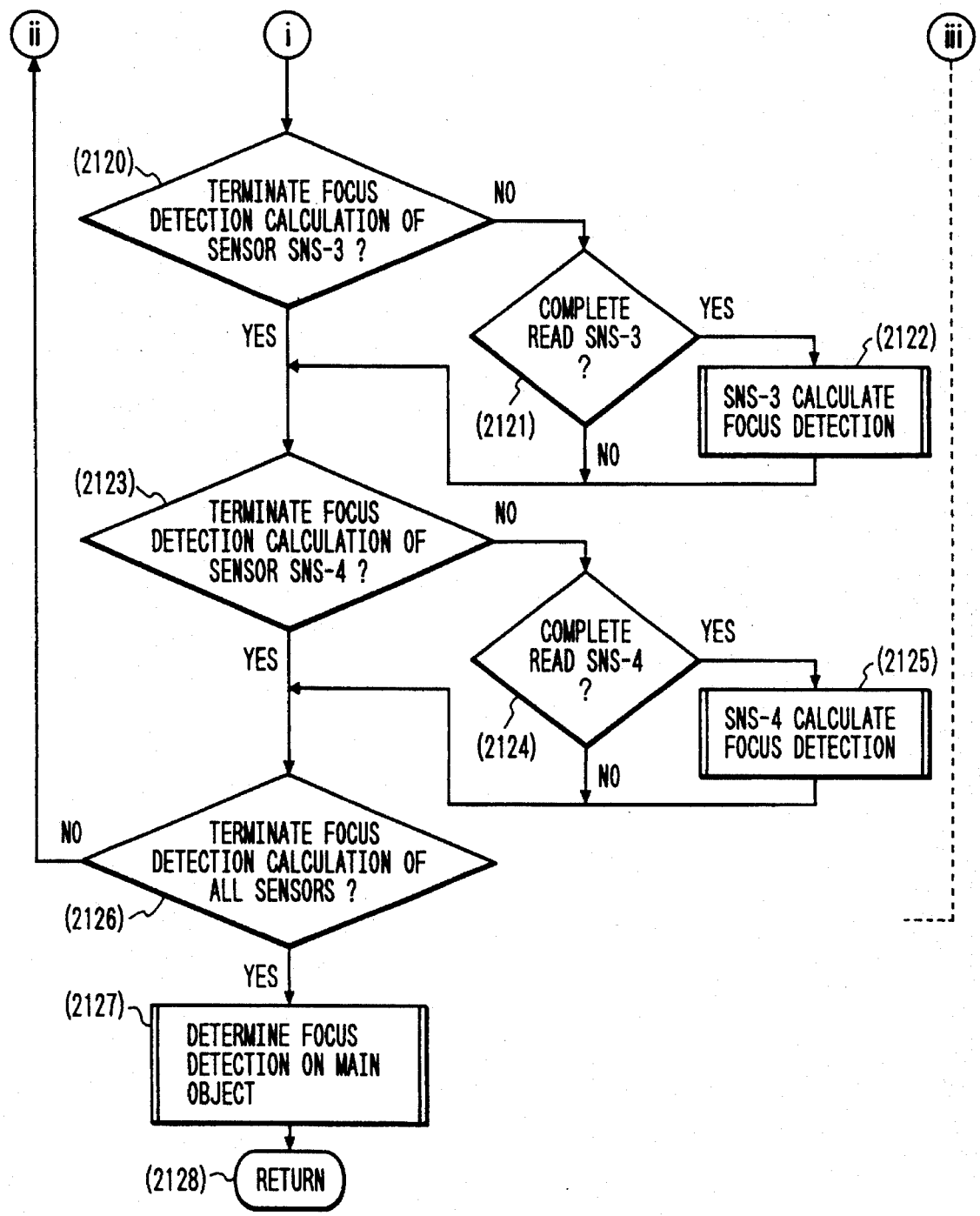
FIG. 26, which consists of FIGS. 26A and 26B, is a flow chart of a focus detecting operation in FIG. 25.
Figure 27:
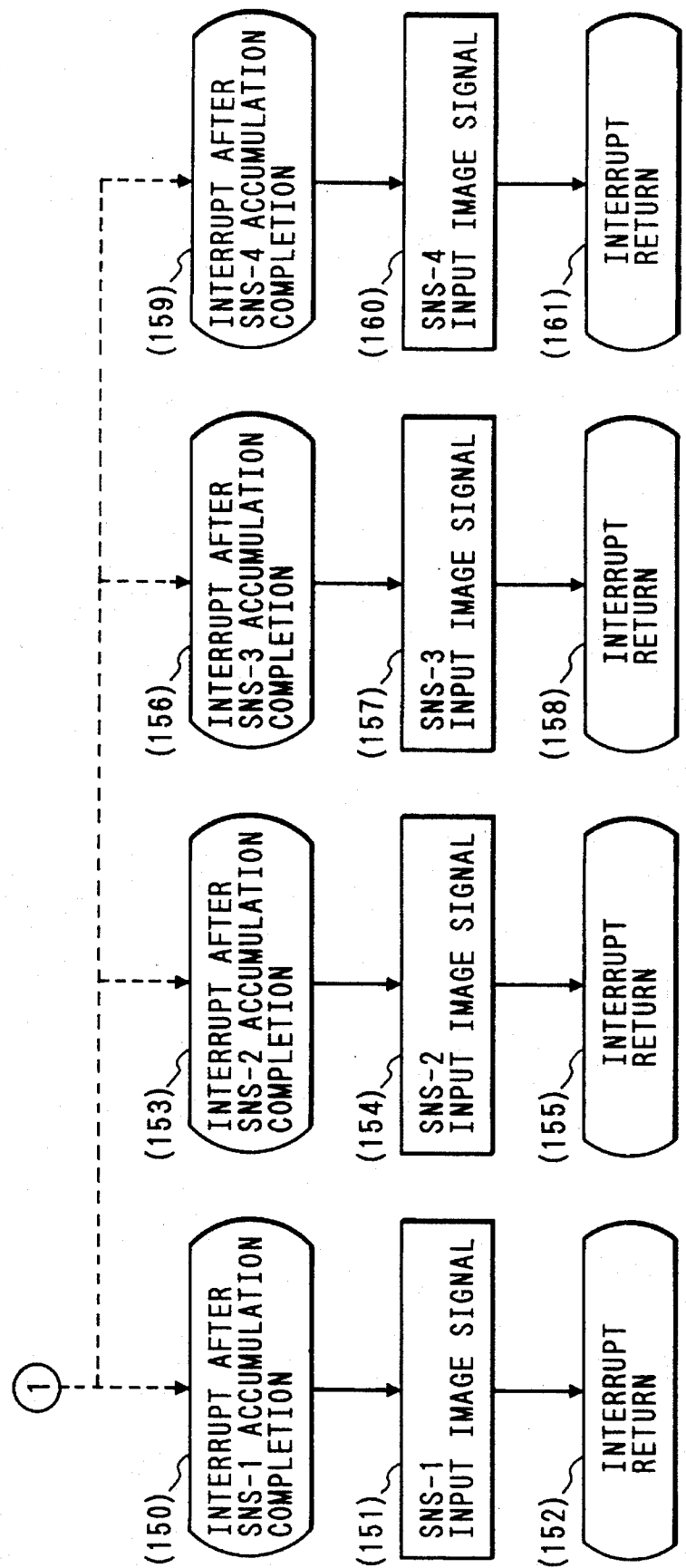
FIG. 27 is a flow chart of an interruption operation in the flow chart shown in FIGS. 26A and 26B.

FIGS. 26A, 26B and 27 are flow charts of the "focus detection" subroutine to be executed in the step (2015).

When this subroutine is called, the microcomputer PRS proceeds to a step (2110) and starts execution from a step (2111);

[Step (2111)] discriminates whether the current operation is the first AF control after the switch SW1 is turned on, and, if the first time or not, the sequence proceeds respectively to a step (2112) or (2113);

[Step (2112)] initializes the selection sensor;

[Step (2113)] executes an "accumulation start" subroutine.

Said subroutine, for starting the signal accumulating operation of the sensor, sends an accumulation start command to the sensor drive circuit SDR to initiate the signal accumulating operation of the sensor SNS, and enables the interruption in order that the microcomputer PRS can executes an "accumulation completion interruption" sequence in response to the accumulation end signals /TINTE1–/TINTE4 from said drive circuit SDR. Thus, said interruption sequence is executed when the signal accumulation is completed in each of the paired sensors SNS-1–SNS-4.

The completion of accumulation of the sensors can be detected by the downshift of the signals /TINTE1–/TINTE4, which are supplied to the interruption input port of the microcomputer PRS. In FIGS. 26A and 26B, a broken-lined bracket (1) indicates the interruption control, and, in case of the interruption induced by the signals /TINTE1–/TINTE4, the sequence moves through (1) in FIGS. 26A and 26B to interruption routines shown in FIG. 27. Thus, for example when the charge accumulation in the paired sensor arrays SNS-1 reaches an adequate level and the signal /TINTE1 from the sensor drive circuit SDR is shifted down, the sequence in response moves to the interruption routine starting from a step (2150) shown in FIG. 27.

The interruption routine starting from the step (2150) in FIG. 27 is to enter the image signals of the paired sensor arrays SNS-1.

After a step (2151) enters the image signals of the paired sensor arrays SNS-1, a step (2152) terminates the interruption routine. The input of the image signal is achieved by serial A/D conversion of the output signal VIDEO entered into the analog input port of the microcomputer PRS, and storage of the obtained digital data in succession in a predetermined RAM area.

When the charge accumulation of the paired sensor arrays SNS-2, SNS-3 or SNS-4 is completed, a similar interruption control is executed whereby the sequence proceeds to a step (2153), (2156) or (2159) in FIG. 27 to effect the image signal entry.

The "accumulation start" subroutine and the detailed method of the image signal entry will not be explained further, as they are already disclosed for example in the U.S. Pat. No. 5,126,777.

Reference is now again made to FIGS. 26A and 26B. The image signal entry is executed by the interruption procedure, it is preferentially executed at any time when the charge accumulation is completed, in the course of execution of steps (2114) to (2126) for focus detecting calculation etc.:

[Step (2114)] discriminates whether the focus detecting calculation of the paired sensor arrays SNS-1 has been completed, and, if completed or not, the sequence proceeds respectively to a step (2117) or (2115);

[Step (2115)] discriminates whether the interruption procedure for the image signal entry for the paired sensor arrays SNS-1 has been completed, and, if completed or not, the sequence proceeds respectively to a step (2016) or (2117);

[Step (2116)] executes the focus detecting calculation based on the image signals of the paired sensor arrays SNS-1. The detailed calculating method for detecting the defocus amount will not be explained as it is disclosed for example in the Japanese Patent Application No. 61-160824;

[Step (2117)] discriminates whether the focus detecting calculation of the paired sensor arrays SNS-2 has been completed, and, if completed or not, the sequence proceeds respectively to a step (2120) or (2118);

[Step (2118)] discriminates whether the interruption procedure for the image signal entry for the paired sensor arrays SNS-2 has been completed, and, if completed or not, the sequence proceeds respectively to a step (2019) or (2120);

[Step (2119)] executes the focus detecting calculation based on the image signals of the paired sensor arrays SNS-2;

[Step (2120)] discriminates whether the focus detecting calculation of the paired sensor arrays SNS-3 has been completed, and, if completed or not, the sequence proceeds respectively to a step (2123) or (2121);

[Step (2121)] discriminates whether the interruption procedure of the image signal entry for the paired sensor arrays SNS-3 has been completed, and, if completed or not, the sequence proceeds respectively to a step (2122) or (2123);

[Step (2122)] executes the focus detecting calculation based on the image signals of the paired sensor arrays SNS-3;

[Step (2123)] discriminates whether the focus detecting calculation of the paired sensor arrays SNS-4 has been completed, and if completed or not, the sequence proceeds respectively to a step (2126) or (2124);

[Step (2124)] discriminates whether the interruption procedure for the image signal entry for the paired sensor arrays SNS-4 has been completed, and, if completed or not, the sequence proceeds respectively to a step (2126) or (2125);

[Step (2125)] executes the focus detecting calculation based on the image signals of the paired sensor arrays SNS-4;

[Step (2126)] discriminates whether the focus detecting calculations corresponding to all the sensors have been completed, and, if not, the sequence returns to the step (2114), but, if completed, the sequence proceeds to a step (2127).

In summary, after the charge accumulation is started in the step (2113), the sequence repeatedly executes the steps (2114) to (2126), while awaiting the entry of the image signals of the sensors by interruption, and executes the focus detecting calculation in succession from the sensor of which image signal is entered;

[Step (2127)] selects a focus detecting point where the main object is assumed to be present, based on the results of focus detecting calculations of the sensors. The criterion therefor in this embodiment is the focus detecting point of the shortest object distance among those where the focus detection is possible.

After the determination of the focus detecting point, a step (2128) terminates this "focus detection" subroutine.

Figure 28:
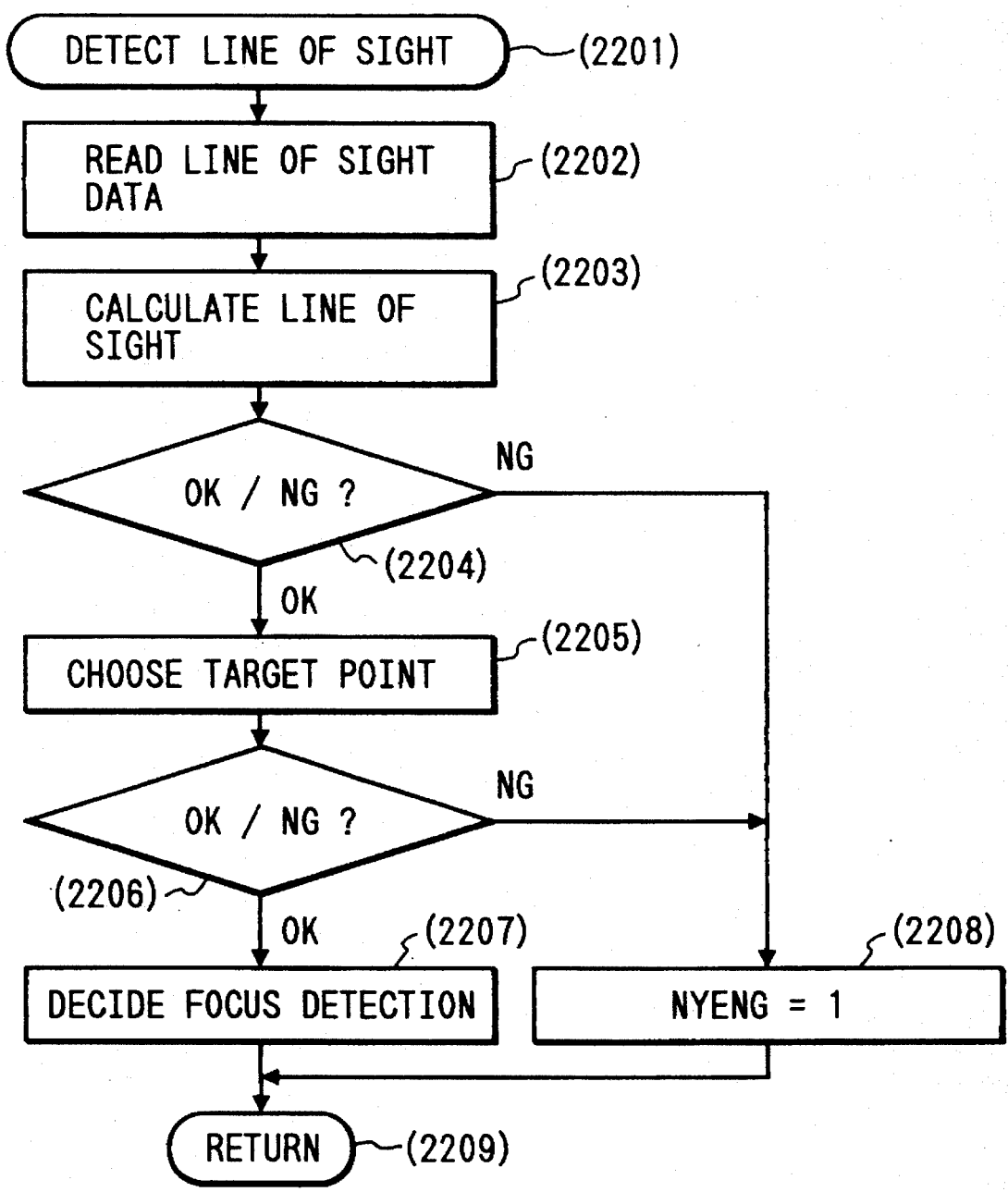
FIG. 28 is a flow chart of a sight line detecting subroutine in FIG. 25.

FIG. 28 shows the "sight line detection" subroutine to be executed in the step (2014).

When this subroutine is called, the microcomputer PRS proceeds to a step (2201) and starts execution from a step (2202):

[Step (2202)] executes signal accumulation and readout of the image sensor CCD for sight line detection, and collects sight line data;

[Step (2203)] determines the direction of the line of sight of the photographer by a predetermined calculation, based on the sight line data read in the step (2202);

[Step (2204)] judges whether the result of calculation of the direction of the line of sight determined in the step (2203) is unsatisfactory, and, if unsatisfactory or not, the sequence proceeds respectively to a step (2208) or (2205);

[Step (2205)] determines the watching point in the view finder, by a predetermined calculation, from the direction of the line of sight determined in the step (2203);

[Step (2206)] discriminates whether the result of calculation of the watching point, determined in the step (2205) is unsatisfactory, and, if unsatisfactory or not, the sequence proceeds respectively to a step (2208) or (2207);

[Step (2207)] determines a focus detecting point corresponding to the watching point determined in the step (2205), and the sequence then proceeds to a step (2209).

If the step (2204) or (2206) identifies an unsatisfactory result, the sequence proceeds to the step (2208) as mentioned above;

[Step (2208)] sets a sight line detection failure flag EYENG at "1", which is to be cleared in the foregoing step (2202), and the sequence proceeds to a step (2209);

[Step (2209)] terminates the "sight line detection" subroutine.

Figure 29:
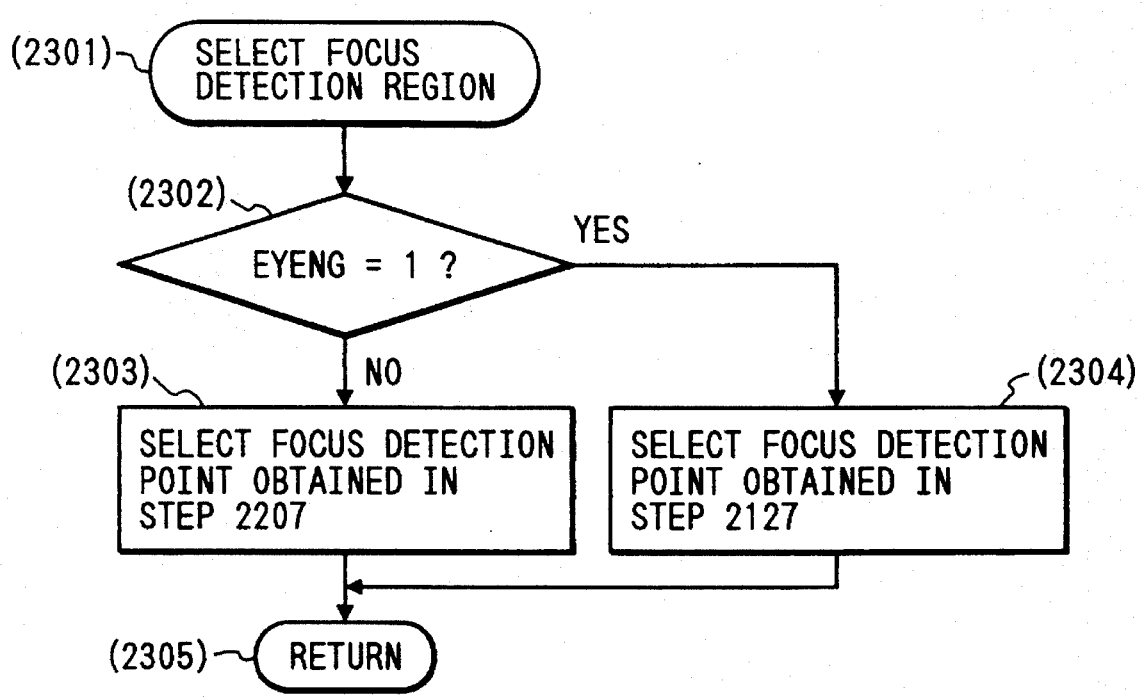
FIG. 29 is a flow chart of a subroutine for selecting the focus detecting area, in FIG. 25.

FIG. 29 is a flow chart of the "focus detecting area selection" subroutine to be executed in the step (2016).

When this subroutine is called, the microcomputer PRS proceeds to a step (2301) and starts execution from a step (2302);

[Step (2302)] discriminates whether the flag EYENG, indicating the failure of the detection of the line of sight, is "1". If EYENG=0, indicating the successful sight line detection, the sequence proceeds to a step (2203), but, if EYENG=1, indicating the failure of the sight line detection, the sequence proceeds to a step (2204);

[Step (2303)] selects the focus detecting point obtained in the step (2207), namely the point corresponding to the watching point of the photographer, as the sight line detection is successful in this case;

[Step (2304)] selects the focus detecting point obtained in the step (2127), namely the point of the shortest object distance among those where the focus detection is possible, as the sight line detection is unsuccessful in this case, and the sequence proceeds to a step (2305);

[Step (2305)] terminates this "focus detecting area selection" subroutine.

Figure 30:
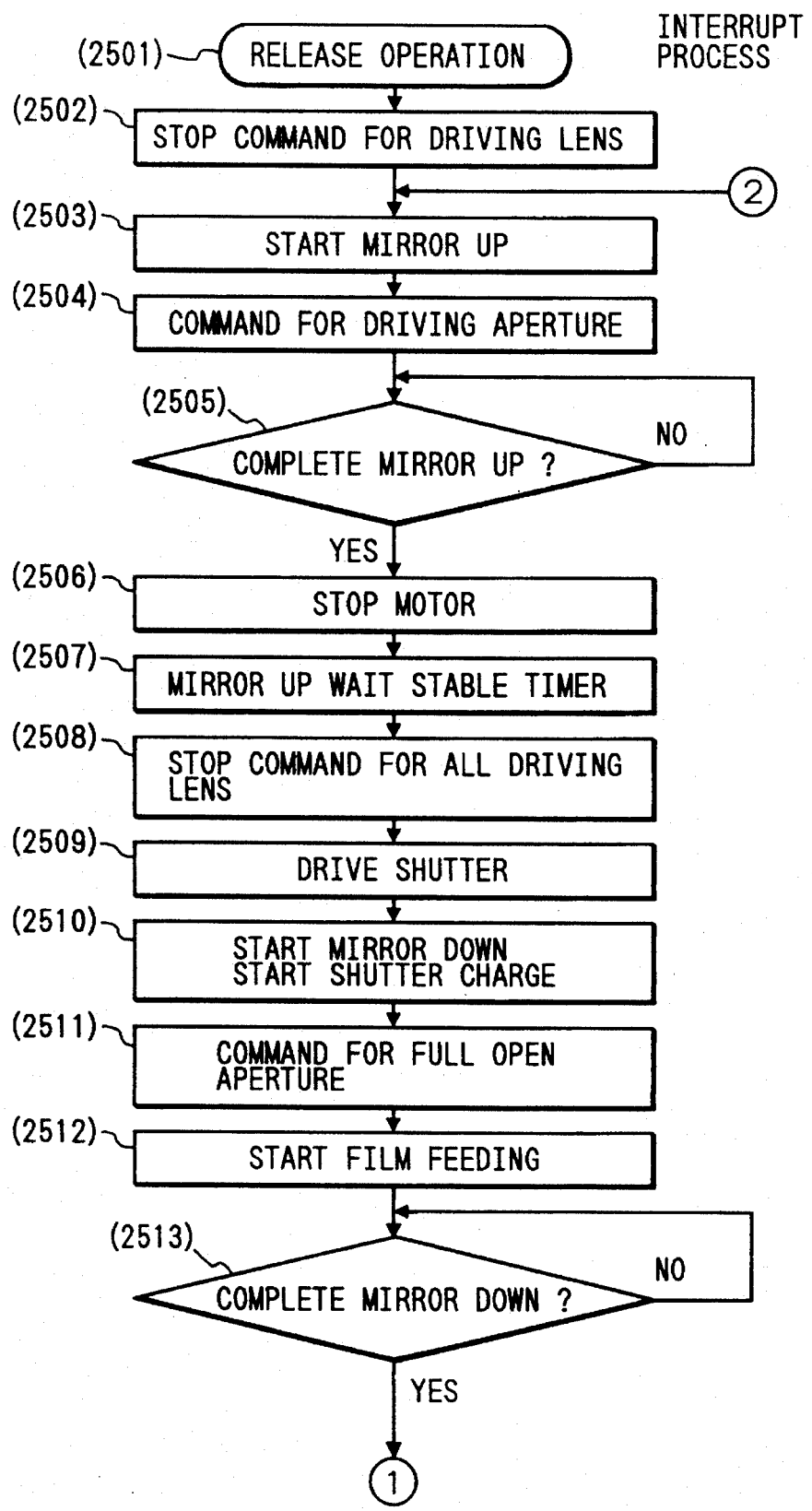
FIG. 30 is a flow chart of a shutter releasing subroutine when a switch SW2 is turned on in an embodiment 6 of the present invention.

FIG. 30 is a flow chart of a "shutter releasing" interruption routine to be executed when the switch SW2 is turned on.

When the interruption is applied, the microcomputer PRS proceeds to a step (2501) and starts execution from a step (2502):

[Step (2502)] sends a lens drive stop command to the phototaking lens LNS;

[Step (2503)] starts to drive the motor MTR2 in the forward direction, in order to lift the quick-return mirror QRM, by releasing a forward drive signal M2F;

[Step (2504)] sends a diaphragm drive command to the phototaking lens LNS, in order to close down the diaphragm;

[Step (2505)] waits until the mirror is lifted, and then the sequence proceeds to a step (2506) when the mirror has been lifted;

[Step (2506)] sends a braking signal to M2F, M2R thereby braking the motor MTR2 by shortcircuiting, in order to stop the motor MTR2 for mirror lifting;

[Step (2507)] waits for a predetermined time, until the mirror in the lifted state becomes stabilized;

[Step (2508)] sends a stop command for all the lens drive to the phototaking lens LNS, in order to avoid the lens movement at the shutter control, and also in order to terminate the energization of the stepping motor DMTR, started in the diaphragm control in the step (2504). Said command serves both to stop the lens drive and to terminate the energization of the diaphragm;

[Step (2509)] drives the shutter, with a shutter time controlled according to the Tv value obtained in the AE control in the step (2003);

[Step (2510)] releases a forward drive signal by M2F, M2R for starting to drive the motor MTR2 for lowering the mirror and charging the shutter spring. The completions of the mirror lowering and shutter charging are confirmed by unrepresented switches CMSP1 and CMSP2.

For controlling said mirror down operation and said shutter charging operation, in an interruption procedure executed every 1 msec, there are executed the discriminations whether the mirror down operation is completed, and whether the shutter charging operation is completed, and the motor stopping control. Said interruption procedure will be explained later in relation to FIG. 33. Also there are cleared a flag MRDNEND indicating the mirror-down position and a flag CGEND indicating the completion of the shutter charging;

[Step (2511)] sends a command to fully open the diaphragm to the phototaking lens LNS, in order to prepare for the next light metering, as the diaphragm is currently closed down;

[Step (2512)] sends a forward drive signal, in order to drive the motor MTR1 for advancing the film by a frame.

Said film advancement by a frame is executed in the following manner.

In order to detect the amount of advancement of the film, there is provided an unrepresented photoreflector, which counts the perforations of the film. Since a frame has 8 perforations, a frame advancement of the film can be achieved by continuing the film advancement until 8 output pulses are generated from said photoreflector. The output signal of said photoreflector is supplied to the interruption input port of the microcomputer PRS, and the interruption procedure is started at the upshift edge of said signal. The number of said interruptions is counted, and, when a predetermined number (8 times) is reached, a frame advancement is considered to have been completed and the film advancement is terminated. Said interruption procedure will be explained later with reference to FIG. 30. Also there is cleared a flag WINDEND indicating the completion of the film advancement;

[Step (2513)] discriminates whether the mirror is in the lowered position, and waits until the mirror reaches said position;

[Step (2514)] discriminates whether the switch SW2 is on, namely whether a continuous phototaking operation is selected, and, if said switch SW2 is on or off, namely if the continuous phototaking operation is selected or not, the sequence proceeds respectively to a step (2514) or (2521);

[Step (2515)] calls a "light metering" subroutine, as the light metering is needed also during the continuous phototaking operation.

Said light metering subroutine receives the light from the object with the light metering sensor SPC, effects A/D conversion of the output of said sensor SPC and calculates the diaphragm stop value Av and the shutter time Tv according to a predetermined program, for use in the auto exposure control;

[Step (2516)] calls the "focus detection" subroutine explained before, in order to effect focus detection also during the continuous phototaking operation;

[Step (2517)] discriminates whether the shutter spring charging and the film advancement have been completed, namely whether the lens driving is possible, and, if not, the sequence returns to the step (2516) to call again the "focus detection" subroutine. If the lens drive is possible, namely if the shutter spring charging and the film advancement have both been completed, the sequence proceeds to a step (2616);

[Step (2518)] sends, to the phototaking lens LNS, a command to drive the lens by a number of pulses corresponding to the defocus amount obtained in the step (2516), as the lens drive is now enabled;

[Step (2519)] calls the aforementioned "sight line detection" subroutine.

This is to determine in advance the watching point of the photographer in the finder viewing field and the focus detecting point, required for the next light metering and focus detection, during the waiting time until the completion of the lens drive, thereby minimizing the time loss and preventing the increase in time between the phototaking operations;

[Step (2520)] discriminates whether the lens drive has been completed, and, if not, the sequence returns to the step (2519) to call again the "sight line detection" subroutine. On the other hand, if the lens drive has been completed, the sequence proceeds to a step (2521);

[Step (2521)] discriminates whether the switch SW2 is turned on, namely whether the continuous phototaking operation is selected, and, if selected, the sequence returns to the step (2503) to again effect the shutter releasing operation. On the other hand, if the switch SW2 is off, namely if the continuous phototaking operation is not selected, the sequence proceeds to a step (2526).

Also if the step (2514) identifies that the switch SW2 is off, namely that the continuous phototaking operation is not selected, the sequence proceeds to a step (2522) as mentioned before;

[Step (2522)] discriminates whether the charging of the shutter spring has been completed, and, if completed or not, the sequence proceeds respectively to a step (2525) or (2523);

[Step (2523)] discriminates whether the film advancement has been completed, and, if completed or not, the sequence proceeds to a step (2524) or returns to the step (2522);

[Step (2524)] discriminates again whether the charging of the shutter spring has been completed, and, if completed, the sequence proceeds to a step (2526), but, if not, the sequence waits in this step until said charging becomes completed. Then the sequence proceeds to a step (2526);

[Step (2525)] discriminates, as in the step (2523), whether the film advancement has been completed, and, if completed, the sequence proceeds to a step (2526), but, if not, the sequence waits in this step until completion. Then the sequence proceeds to the step (2526).

In summary, the above-mentioned steps (2521) to (2524) wait until the charging of the shutter spring and the film advancement are both completed, and then the sequence proceeds to the step (2526);

[Step (2526)] executes processes and initialization of a part of the variables and flags, for terminating the interruption procedure, and then the sequence returns to the step (2001) shown in FIG. 24.

In the following there will be explained the interruption procedure generated at the upshift edge of the output signal of the unrepresented photoreflector, at the film advancement control.

Figure 32:
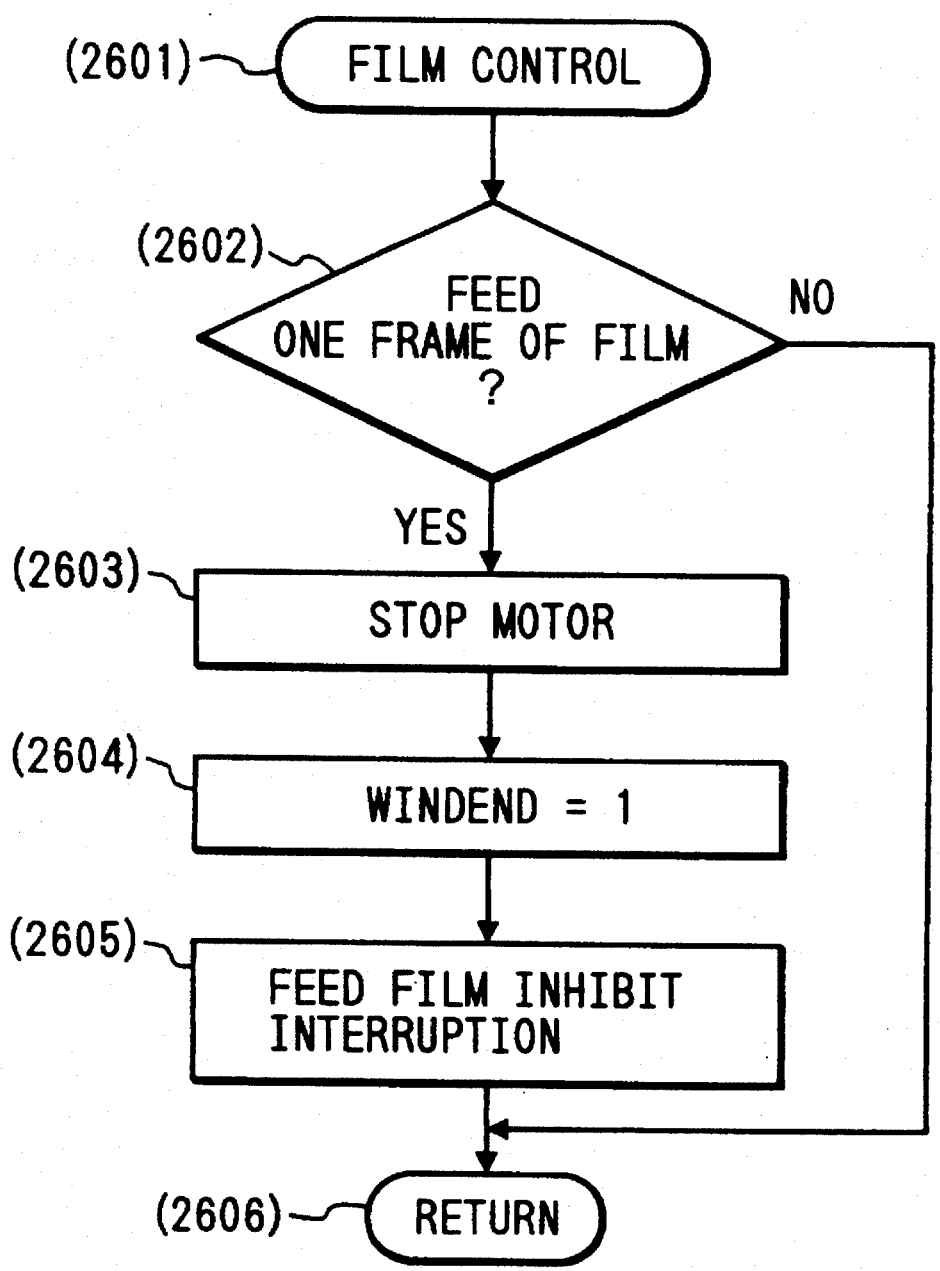
FIG. 32 is a flow chart of a film controlling interruption subroutine in the embodiment 6 of the present invention.

FIG. 32 is a flow chart of the "film control" interruption sequence.

When the interruption is generated, the microcomputer PRS proceeds to a step (2601) and starts execution from a step (2602):

[Step (2602)] discriminates whether the amount of film advancement has reached a frame, namely whether the interruption is the 8th time, and, respectively if a frame amount has been reached or not, the sequence proceeds to a step (2606) or (2603);

[Step (2603)] releases a braking signal by the signals M1F, M1R, in order to promptly terminate the film advancement;

[Step (2604)] sets a flap WINDEND, indicating the completion of the film advancement by a frame, at "1", thereby memorizing the completion of the film advancement;

[Step (2605)] inhibits the interruption for film advancement, generated stably at the upshift of the output signal of the photoreflector, in order to terminate the film advancement control;

[Step (2606)] terminates the "film control" interruption routine.

In the following there will be explained the interruption sequence generated at every 1 ms at the shutter spring charging control.

Figure 33:
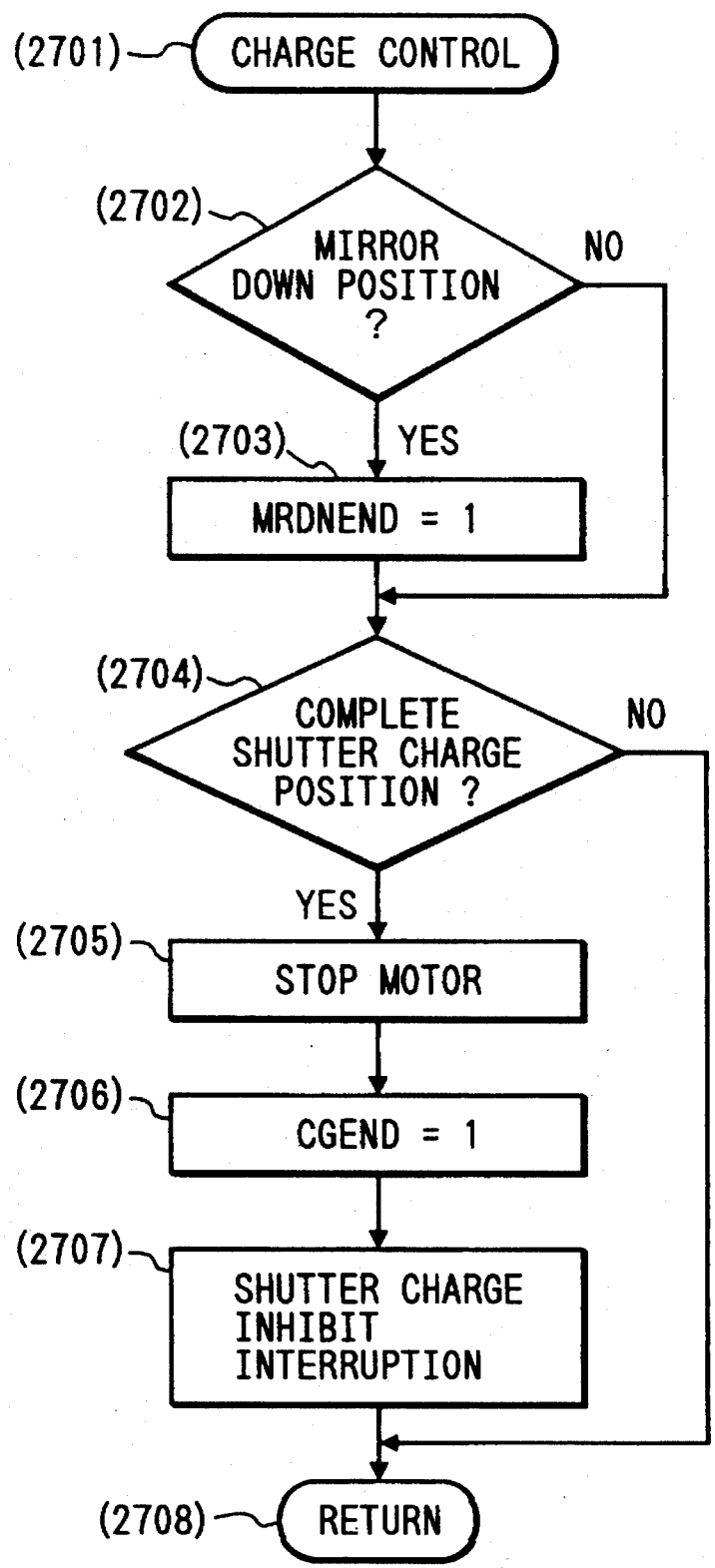
FIG. 33 is a flow chart of a chart controlling interruption subroutine in the embodiment 6 of the present invention.

FIG. 33 is a flow chart showing the "charging control" interruption sequence.

When the interruption is generated, the microcomputer PRS proceeds to a step (2701) and starts execution from a step (2702):

[Step (2702)] discriminates whether the mirror is in the lowered position, and, respectively if in said position or not, the sequence proceeds to a step (2703) or (2704);

[Step (2703)] sets a flag MRDNEND indicating the lowered mirror position at "1" thereby memorizing this state;

[Step (2704)] discriminates whether the shutter spring is in the charged position, and, respectively if in said position or not, the sequence proceeds to a step (2705) or (2708);

[Step (2705)] releases a braking signal by signals M2F, M2R, in order to promptly stop the motor;

[Step (2706)] sets a flag CGEND, indicating the completion of the charging of the shutter spring, at "1", thereby memorizing the completion of said charging;

[Step (2707)] inhibits the interruption procedure generated at every 1 ms in the foregoing step (2509), in order to terminate the shutter charging control and the mirror down control;

[Step (2708)] terminates this "charging control" interruption routine.

When the continuous phototaking operation is selected, the present embodiment activates the sight line detecting means again to effect the detection of the line of sight during the waiting time in preparation for a phototaking operation of the 2nd or subsequent frame, such as the waiting time for completion of the lens drive, film advancement or mirror lifting, thereby allowing to use the latest sight line information for the focusing and preventing the loss in number of phototaken frames per unit time, in the continuous phototaking operation. Thus the photographer can be relieved from losing good timing of phototaking.

As explained in the foregoing, the embodiment 6 is provided with sight detecting means for detecting the direction of the line of sight of the photographer looking into the view finder; focus detection means for repeatedly detecting the focus state of the plural object areas in the image frame; selection means for selecting at least a focus signal from plural focus signals obtained from said focus detection means, based on the sight line information obtained by said sight line detecting means; lens drive means for driving the phototaking lens, based on the focus signal selected by said selection means; and sight line detection control means for causing said sight line detection means to effect at least a sight line detecting operation, in case of a continuous phototaking operation, during the waiting time for the completion of the preparatory operation for phototaking, and, in such continuous phototaking operation, this embodiment causes the sight line detection means to effect at least a sight line detecting operation during the waiting time in said phototaking operation, for the completion of the preparatory operation for the 2nd or subsequent frame, such as the waiting time for the completion of lens drive or film advancement.

It is thus possible to select the focus signal with the latest sight line information, while avoiding the loss in the phototaking speed in the continuous photo-taking operation.

What is claimed is:

1. A camera comprising:

sight line detection means for detecting a line of sight of an observer;

camera operation means controlled by the line of sight detected by said sight line detection means;

continuous exposure operation means for performing a continuous exposure operation while an operation element for starting an exposure operation is activated;

exposure preparation operation means for performing an exposure preparation operation between a first exposure operation and a second exposure operation during the continuous exposure operation; and sight line operation control means for causing said sight line detection means to effect a sight line detecting operation during the functioning of said exposure preparation operation means.

2. A camera according to claim 1, wherein said exposure preparation means is lens drive means, and said sight line operation control means is adapted to cause to effect a sight line detecting operation during a lens driving operation of said lens drive means.

3. A camera according to claim 1, wherein said exposure preparation means is film advancing means, and said sight line operation control means is adapted to cause to effect a sight line detecting operation during a film advancement by said film advancement means.

4. A camera according to claim 1, wherein said exposure prepraration means is mirror drive means, and said sight line operation control means is adapted to cause to effect a sight line detecting operation during a mirror drive by said mirror drive means.

5. A camera according to claim 1, wherein said camera operation means is drive means for an optical member, and said optical member is driven by the information on the line of sight detected by said sight line detection means.

6. A camera according to claim 2, wherein said camera operation means is drive means for an optical member, and said optical member is driven by the information on the line of sight detected by said sight line detection means.

7. A camera according to claim 3, wherein said camera operation means is drive means for an optical member, and said optical member is driven by the information on the line of sight detected by said sight line detection means.

8. A camera according to claim 4, wherein said camera operation means is drive means for an optical member, and said optical member is driven by the information on the line of sight detected by said sight line detection means.

9. A camera according to claim 1, wherein said sight line operation control means controls said sight line detection means in order not to perform the detection operation during the exposure operation.

10. A camera according to claim 1, further comprising a microcomputer that cooperates with said sight line detection means, said camera operation means, said continuous exposure means, said exposure preparation means and said sight line operation control means to perform a predetermined algorithm of processes.

11. A camera according to claim 2, further comprising a microcomputer that cooperates with said sight line detection means, said camera operation means, said continuous exposure means, said exposure preparation means and said sight line operation control means to perform a predetermined algorithm of processes.

12. A camera according to claim 9, further comprising a microcomputer that cooperates with said sight line detection means, said camera operation means, said continuous exposure means, said exposure preparation means and said sight line operation control means to perform a predetermined algorithm of processes.

13. A camera comprising:

sight line detection means for detecting the line of sight of an observer;

focus detection means having plural focus detection areas and being capable of focus detection in each focus detecting area;

mode selecting means having a first operation mode and a second operation mode, wherein in the first operation mode a focusing operation is not performed after said focus detection means detects an in-focus state, and wherein in the second operation mode the focusing operation is continued after said focus detection means detects an in-focus state;

first selection means for selecting at least one of the plural focus detecting areas, based on the information of the line of sight detected by said sight line detection means;

determination means for determining whether the line of sight detected by said sight line detection means is proper based on a predetermined criterion, the predetermined criterion of said determination means in the first operation mode being different from the predetermined criterion of said determination means in the second operation mode; and second selection means for selecting at least one of the plural focus detecting areas based on information different from the line of sight when said determination means determines that the line of sight is improper.

14. A camera according to claim 13, wherein said determination means determines that the line of sight detected by said line of sight detection means is improper when line of sight detection by said sight line detection means is not correctly performed in a predetermined time, and the predetermined time in the first operation mode is different from the predetermined time in the second operation mode.

15. A camera according to claim 13, wherein said second selection means selects at least one of the plural focus detecting areas in accordance with a state of an object.

16. A camera according to claim 13, wherein said second selection means selects a focus detecting area allowing focusing to a shortest object distance from the plural focus detecting areas.

17. A camera according to claim 14, wherein said second selection means selects a focus detecting area allowing focusing to a shortest object distance from the plural focus detecting areas.

18. A camera according to claim 13, wherein said second selection means selects a focus detecting area positioned at the center of the plural focusing detecting area.

19. A camera according to claim 13, wherein when said mode selection means selects the second operation mode, said determination means determines that the line of sight is improper when the line of sight detected by said sight line detection means is positioned at a specified area.

20. A camera according to claim 13, wherein when said mode selection means selects the second operation mode, said determination means determines that the line of sight is improper when the line of sight detected by said sight line detection means is not maintained over a predetermined time.

21. A camera according to claim 15, wherein said second selection means selects a focus detecting area positioned at the center of the plural focusing detecting areas.

22. A camera according to claim 15, wherein when said mode selection means selects the second operation mode, said determination means determines that the line of sight is improper when the line of sight detected by said sight line detection means is positioned at a specified area.

23. A camera according to claim 13, wherein when said mode selection means selects the second operation mode, said determination means determines that the line of sight is improper when the line of sight detected by said sight line detection means is positioned close to a focus detection area where focus detection by said focus detection means cannot be performed.

24. A camera according to claim 13, wherein when said mode selection means selects the second operation mode, said determination means determines that the line of sight is improper when the line of sight detected by said sight line detection means is not positioned close to a focus detection area allowing focusing to a shortest object distance by said focus detection means.

25. A camera according to claim 15, wherein when said mode selection means selects the second operation mode, said determination means determines that the line of sight is improper when the line of sight detected by said sight line detection means is positioned close to a focus detection area where focus detection by said focus detection means cannot be performed.

26. A camera according to claim 15, wherein when said mode selection means selects the second operation mode, said determination means determines that the line of sight is improper when the line of sight detected by said sight line detection means is not positioned close to a focus detection area allowing focusing to a shortest object distance by said focus detection means.

27. A camera according to claim 13, further comprising a microcomputer that cooperates with said sight line detection means, said focus detection means, said mode selection means, said first selection means, said determination means, and said second selection means to perform a predetermined algorithm of processes.

* * * * *

UNITED STATES PATENT AND TRADEMARK OFFICE
CERTIFICATE OF CORRECTION

PATENT NO. : 5,614,985

DATED : March 25, 1997

INVENTOR(S) : YUKIO ODAKA

It is certified that error appears in the above-indentified patent and that said Letters Patent is hereby corrected as shown below:

SHEET 11

Figure 10, "MEAREST" should read --NEAREST--, and "RELI-ABILATY" should read --RELI-ABILITY--.

COLUMN 5

Line 6, "it" should read --it is--.

COLUMN 8

Line 43, "coversion" should read --conversion--.

COLUMN 11

Line 5, "executes" should read --execute--.

UNITED STATES PATENT AND TRADEMARK OFFICE
CERTIFICATE OF CORRECTION

PATENT NO. : 5,614,985                       Page 2 of 3
DATED      : March 25, 1997
INVENTOR(S) :
             YUKIO ODAKA It is certified that error appears in the above-identified patent and that said Letters Patent is hereby corrected as shown below:

COLUMN 14

Line 10, "same" should read --the same--.
    Line 11, "same," should read --the same,--.

COLUMN 17

Line 28, "sufficient" should read --sufficiently--.
    Line 29, "hand, the" should read --hand, if the--.

COLUMN 20

Line 44, "No. 003,954." should read --No. 003,954--.

COLUMN 22

Line 52, "subroutined" should read --subroutine--.

COLUMN 25

Line 14, "turend" should read --turned--.

UNITED STATES PATENT AND TRADEMARK OFFICE
CERTIFICATE OF CORRECTION

PATENT NO. : 5,614,985

DATED : March 25, 1997

INVENTOR(S) : YUKIO ODAKA

It is certified that error appears in the above-identified patent and that said Letters Patent is hereby corrected as shown below:

COLUMN 26

Line 33, "executes" should read --execute--.

COLUMN 33

Line 5, "to cause" should be deleted.
    Line 9, "to cause" should be deleted.
    Line 13, "prepraration" should read --preparation--.
    Line 14, "to cause" should be deleted.

Signed and Sealed this

Thirtieth Day of September, 1997

Attest:

BRUCE LEHMAN

Attesting Officer      Commissioner of Patents and Trademarks